US012730848B2

(12) United States Patent
Lynch et al.

(10) Patent No.: US 12,730,848 B2
(45) Date of Patent: Sep. 8, 2026

(54) CONTENT SNIPPET GENERATION AND STORAGE WITH GENERATIVE MODEL CONTENT GROUPING

(71) Applicant: Google LLC, Mountain View, CA (US)

(72) Inventors: Erin Shea Lynch, Belmont, MA (US); Clement Dickinson Wright, Los Angeles, CA (US); Rosemary Margaret La Prairie, London (GB)

(73) Assignee: GOOGLE LLC, Mountain View, CA (US)

( * ) Notice: Subject to any disclaimer, the term of this patent is extended or adjusted under 35 U.S.C. 154(b) by 153 days.

(21) Appl. No.: 18/591,514

(22) Filed: Feb. 29, 2024

(65) Prior Publication Data

US 2025/0278443 A1 Sep. 4, 2025

(51) Int. Cl.
*G06F 16/9535* (2019.01)
*G06F 3/04883* (2022.01)

(52) U.S. Cl.
CPC ...... *G06F 16/9535* (2019.01); *G06F 3/04883* (2013.01)

(58) Field of Classification Search
CPC ......................... G06F 16/9535; G06F 3/04883
USPC .......................................................... 707/722
See application file for complete search history.

(56) References Cited

U.S. PATENT DOCUMENTS 9,418,118 B2 8/2016 Haveliwala et al.
10,503,803 B2 12/2019 Saikia et al.
2010/0082685 A1 4/2010 Hoisman et al.
2011/0128288 A1 6/2011 Petrou et al.
2012/0240037 A1* 9/2012 Migos ................... G06F 3/0483 715/255
2016/0149956 A1 5/2016 Birnbaum et al.
2016/0283519 A1 9/2016 Glasgow et al.
2017/0249339 A1* 8/2017 Lester ...................... G06F 16/56
2017/0289624 A1* 10/2017 Avila ..................... G06V 20/49
2018/0089199 A1 3/2018 Frumkin et al.
2018/0108066 A1* 4/2018 Kale ................. G06F 16/24522
2019/0079934 A1* 3/2019 Liao ....................... G06F 16/248
2020/0159373 A1* 5/2020 Bakker ............... G06F 16/9535
2021/0224312 A1* 7/2021 Harikumar ............ G06F 16/532
2022/0365831 A1* 11/2022 Weskamp ............... G06F 9/546
2023/0047383 A1* 2/2023 Yushkina ............ G06F 16/9535
2023/0237040 A1* 7/2023 Thompson ........... G06V 30/414 382/159
2024/0037905 A1* 2/2024 Hamedi ............... G06V 10/761
(Continued)

OTHER PUBLICATIONS

International Search Report and Written Opinion for Application No. PCT/US2023/019750, mailed Jul. 13, 2023, 13 pages.
(Continued)

*Primary Examiner* — Mohammad Ali
(74) *Attorney, Agent, or Firm* — DORITY & MANNING P.A.

(57) ABSTRACT

Systems and methods for content snippet generation, storage, and suggestion can include obtaining a user input, segmenting a sub-portion of displayed content based on the user input, and generating a content snippet that includes the segmented content and source data associated with the displayed content. A generative model can be leveraged to categorize the content snippet, determine similar content, and determine when to surface the content snippet to a user.

20 Claims, 39 Drawing Sheets

(56) References Cited

U.S. PATENT DOCUMENTS

2024/0107118 A1* 3/2024 Ellingford ............. G06F 3/0488

OTHER PUBLICATIONS

Chen et al., "Towards More Usable Dataset Search: From Query Characterization to Snippet Generation", arXiv:1908.11146v1, Aug. 29, 2019, 4 pages.
International Search Report and Written Opinion for Application No. PCT/US2025/011764, mailed May 2, 2025, 13 pages.
Jain et al., "Comparative Snippet Generation", arXiv:2206.05473v1, Jun. 11, 2022, 9 pages.

* cited by examiner

370

372 PROVIDE CONTENT FOR DISPLAY

374 OBTAIN A USER INPUT

376 GENERATE A SELECTED CONTENT DATASET

378 OBTAIN A PLURALITY OF OTHER CONTENT SNIPPETS ASSOCIATED WITH A USER

380 PROCESS THE SELECTED CONTENT DATASET AND THE PLURALITY OF OTHER CONTENT SNIPPETS WITH A GENERATIVE MODEL TO GENERATE A CONTENT GROUPING

382 STORE THE CONTENT GROUPING INCLUDING THE SELECTED CONTENT DATASET AND THE ONE OR MORE ADDITIONAL CONTENT SNIPPETS

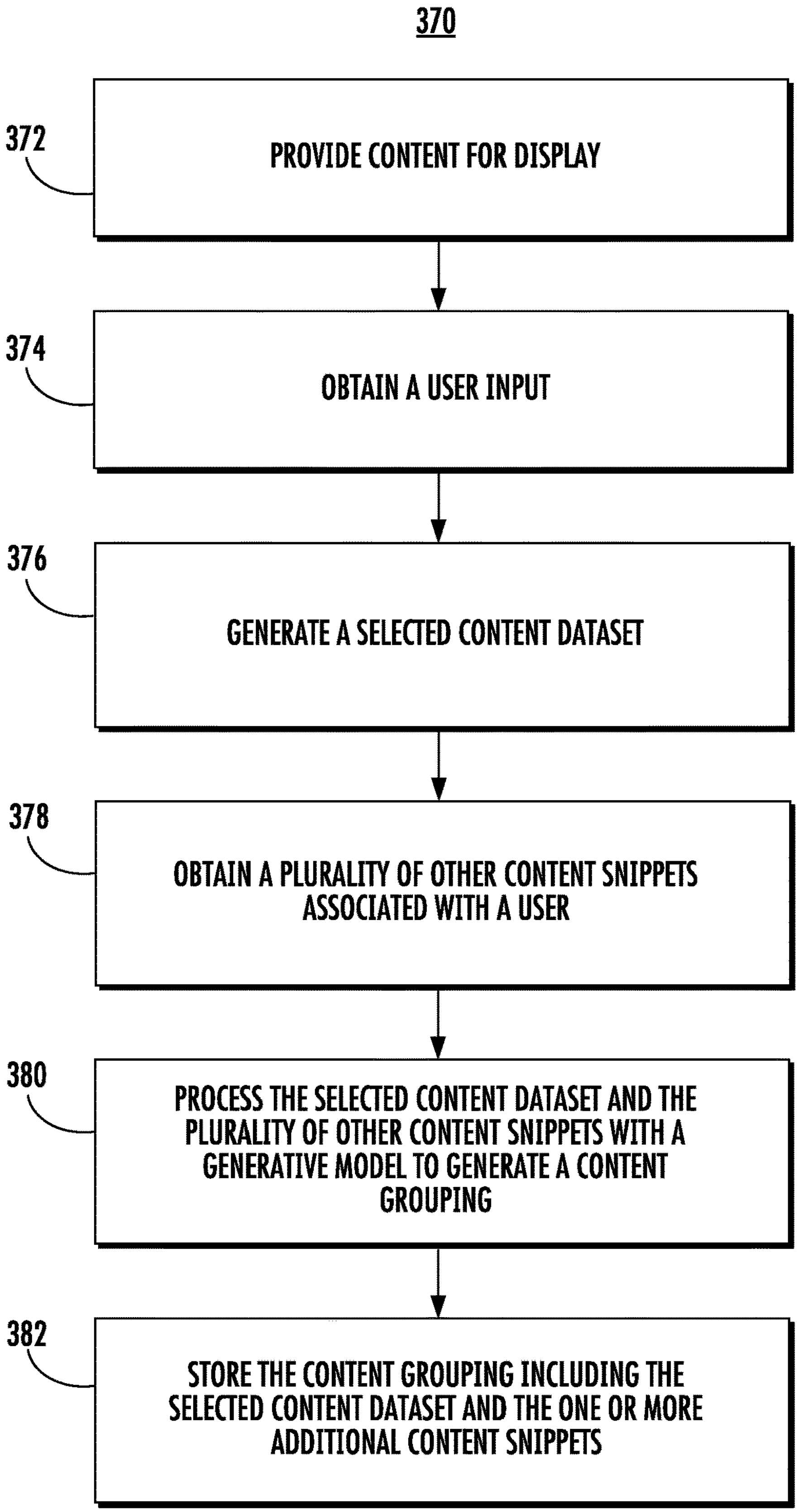

FIG. 3C

9:30
Assistant
Anything I can help you with Minjoon?
Ask anything...
602
Can you be my shopping planner and pull items from my email to Eunsil? I need to buy some things for my guest room in preparation for mom's visit. I'd like to keep my budget under $5000.
604
English (US)
606
Sure, I'll create a shopping plan from your email to Eunsil and help you with your budget.
Mail Connecting to mail...
608
Can you be my shopping planner and pull items from my email to Eunsil? I need to buy some things for my guest..
Items
$5808.00
Multifunction Sofa with 82" Italian...
$2170.00 + 587.18 est. tax
Suggested Sofas
TV Frame 65' Transform...
$2170.00 + 301.29 est. tax
Suggested TVs
75A Pendant La.. 1951
$359.66 + 18.11
610
612

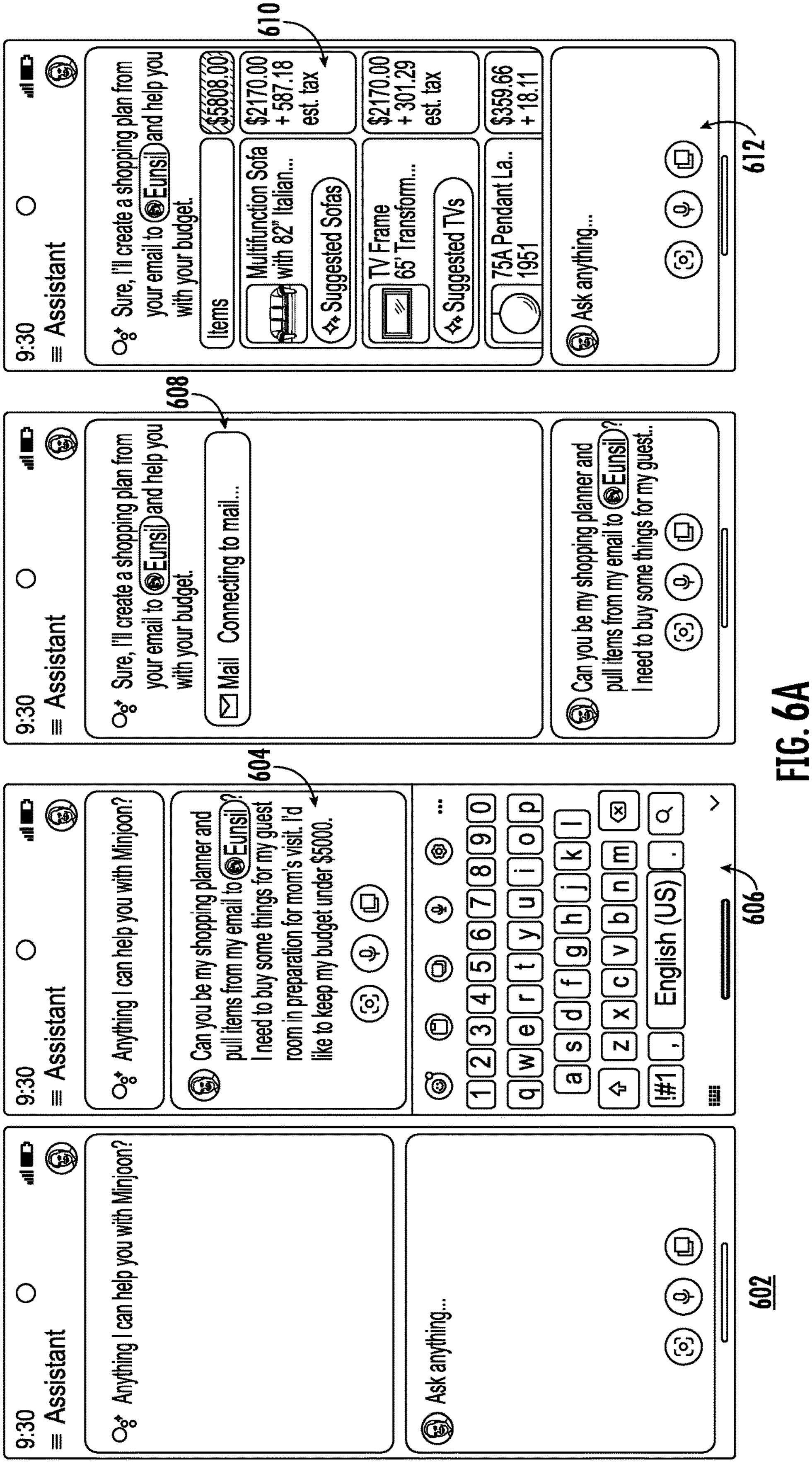

FIG. 6A

1602 — PROVIDING FOR DISPLAY AN IMAGE THAT DEPICTS ONE OR MORE SUBJECTS

1604 — RECEIVING A FREE FORM USER INPUT TO THE USER INTERFACE THAT SELECTS A PARTICULAR SUB-PORTION OF THE ONE OR MORE OBJECTS DEPICTED BY THE IMAGE, WHEREIN THE PARTICULAR SUB-PORTION COMPRISES ONE OR MORE VISUAL FEATURES

1606 — PROVIDING A VISUAL SEARCH QUERY THAT COMPRISES THE PARTICULAR SUB-PORTION OF THE OBJECT SELECTED BY THE FREE FORM USER INPUT

1608 — IN RESPONSE TO THE VISUAL SEARCH QUERY, RECEIVING FROM THE VISUAL SEARCH SYSTEM A SET OF VISUAL SEARCH RESULTS RESPONSIVE TO VISUAL FEATURES INCLUDED IN THE PARTICULAR SUB-PORTION OF THE ONE OR MORE OBJECTS

1610 — PROVIDING ONE OR MORE OF THE SET OF VISUAL SEARCH RESULTS TO A USER

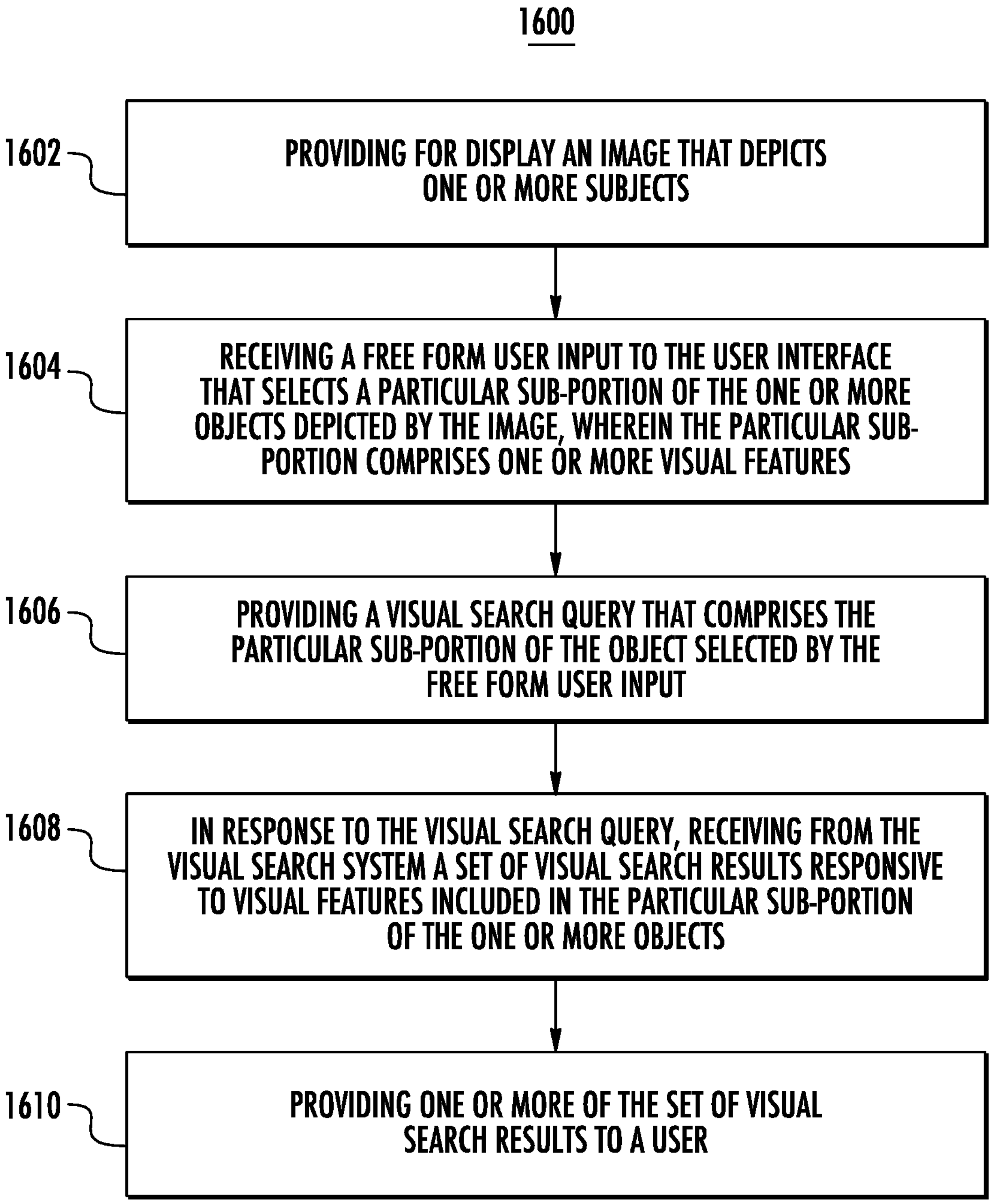

CONTENT SNIPPET GENERATION AND STORAGE WITH GENERATIVE MODEL CONTENT GROUPING

FIELD

The present disclosure relates generally to generating and storing content snippets. More particularly, the present disclosure relates to generating a content snippet by isolating selected sub-portions of the content provided for display and then leveraging a generative model for content grouping, content snippet categorization, and/or content snippet suggestion.

BACKGROUND

Understanding the world at large can be difficult. Whether an individual is trying to understand what the object in front of them is, trying to determine where else the object can be found, and/or trying to determine where an image on the internet was captured from, text searching alone can be difficult. In particular, users may struggle to determine which words to use. Additionally, the words may not be descriptive enough and/or abundant enough to generate desired results.

Saving text, images, and/or audio from a web page can allow a user to locally experience the text, images, and/or audio again without having a connection to the internet. However, the saving process can provide limited context to where the data came from, and in the instance that a user wishes to view the context of the saved data, a user has to either use the data as a search query, navigate through their browsing history, or try to remember how they got to the content in the first place. Additionally, when the web page source is found, the user may still have to review large portions of the web page and/or application interface to find where exactly in the web page and/or application interface the saved data is originally from.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining content provided for display. The content can include a plurality of different visual features. The operations can include obtaining a user input. The user input can be descriptive of a selection of a sub-portion of the content. In some implementations, the sub-portion of the content can include at least a subset of visual features of the plurality of visual features. The operations can include generating a selected content dataset. The selected content dataset can include visual data and source data. In some implementations, the visual data can be descriptive of particular visual features associated with the sub-portion of the content. The source data can be descriptive of a source of the content. The operations can include processing the selected content dataset with a generative model to determine a content grouping for the selected content dataset. The content grouping can be descriptive of one or more other content snippets determined to be associated with the selected content dataset. The operations can include storing the selected content dataset with the content grouping.

In some implementations, the user input can include a gesture input associated with a region of the content provided for display. The operation can include processing the region of the content provided for display to determine the gesture input is associated with a selection of the sub-portion of the content. The sub-portion of the content can include a set of visual features of interest. In some implementations, the sub-portion can be determined based on a semantic understanding of the region. The set of visual features of interest can be associated with an object within the region. The gesture input can include a lasso gesture that encloses sub-portion of the content. In some implementations, the gesture input can include a scribble gesture that covers at least a subset of the sub-portion of the content.

In some implementations, generating the selected content dataset can include processing the content with a segmentation model to generate segmented image data descriptive of the sub-portion of the content, obtaining source information associated with an application provided for display and the content source, and generating the selected content dataset that includes the segmented image data, the source information, and metadata associated with a user context. In some implementations, the user context can be descriptive of a particular user associated with the user input, a time of dataset generation, and user viewing history associated with the content. Storing the selected content dataset with the content grouping can include storing the selected content dataset with user search history data. In some implementations, the operations can include tuning a machine-learned personalization model based on the content grouping and the user search history data. The machine-learned personalization model can be associated with a particular user. The operations further can include determining, with the machine-learned personalization model, a suggested content item based on the content grouping and providing the suggested content item for display. In some implementations, the visual data can include a bitmap associated with at least a subset of the sub-portion of the content.

Another example aspect of the present disclosure is directed to a computer-implemented method. The method can include obtaining, by a computing system including one or more processors, contextual data associated with a user. The contextual data can be descriptive of a context associated with a user computing device. The method can include processing, by the computing system, the contextual data with a generative model to determine a particular content snippet is associated with the context. The particular content snippet may have been generated by obtaining, by the computing system, a user input. In some implementations, the user input can be descriptive of a selection of a sub-portion of content provided for display. The sub-portion of the content can include at least a subset of visual features of the content provided for display. The particular content snippet may have been generated by generating, by the computing system, a selected content dataset. The selected content dataset can include visual data and source data. In some implementations, the visual data can be descriptive of particular visual features associated with the sub-portion of the content. The source data can be descriptive of a source of the content. The method can include providing, by the computing system, the particular content snippet for display.

In some implementations, processing, by the computing system, the contextual data with the generative model to determine the particular content snippet of a plurality of content snippets associated with the context can include determining, by the computing system and with the generative model, a proactive candidate search intent associated with the context and determining, by the computing system, a content grouping includes content responsive to the proactive candidate search intent. The proactive candidate search intent can be descriptive of a suggested search that is predicted to be relevant to the user based on the contextual data. The content grouping can include the particular content snippet.

In some implementations, the content grouping may have been generated by obtaining, by the computing system, a plurality of content snippets associated with the user, processing, by the computing system, the plurality of content snippets with the generative model to determine the particular content snippet and one or more additional content snippets are associated with a shared topic, and generating, by the computing system, the content grouping including the particular content snippet and the one or more additional content snippets based on the shared topic. The shared topic can be determined based on determining the particular content snippet and the one or more additional content snippets includes content are associated with a particular entity. In some implementations, the contextual data can include search history data associated with the user.

In some implementations, the method can include obtaining, by the computing system, a search query. The method can include processing, by the computing system, the search query and the contextual data with the generative model to determine the particular content snippet and to generate a model-generated response. The method can include processing, by the computing system, the search query and the contextual data with a search engine to determine a plurality of web search results. The method can include providing, by the computing system, a search results interface for display. The search results interface can include the model-generated response to the search query, the particular content snippet, and at least a subset of the plurality of web search results.

Another example aspect of the present disclosure is directed to one or more non-transitory computer-readable media that collectively store instructions that, when executed by one or more computing devices, cause the one or more computing devices to perform operations. The operations can include providing content for display. The content can include a plurality of different visual features. The operations can include obtaining a user input. The user input can be descriptive of a selection of a sub-portion of the content. The sub-portion of the content can include at least a subset of visual features of the plurality of visual features. The operations can include generating a selected content dataset. The selected content dataset can include visual data and source data. In some implementations, the visual data can be descriptive of particular visual features associated with the sub-portion of the content. The source data can be descriptive of a source of the content. The operations can include obtaining a plurality of other content snippets associated with a user and processing the selected content dataset and the plurality of other content snippets with a generative model to generate a content grouping. The content grouping can include the selected content dataset and one or more additional content snippets of the plurality of other content snippets. The operations can include storing the content grouping comprising the selected content dataset and the one or more additional content snippets.

In some implementations, the operations can include obtaining interface invocation input before obtaining the user input. The interface invocation input can be associated with a request to invoke an overlay interface. The interface invocation input can include a long press gesture input. In some implementations, the overlay interface can include a user interface for segmenting and processing visual content provided for display across a plurality of different applications.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 3C depicts a flow chart diagram of an example method to perform content snippet grouping according to example embodiments of the present disclosure.

FIGS. 6A-6E depict illustrations of an example data call interface according to example embodiments of the present disclosure.

FIG. 16 depicts a flow chart diagram of an example method to perform a more personalized and/or intelligent visual search leveraging free-form user input according to example embodiments of the present disclosure.

Figure 1A:
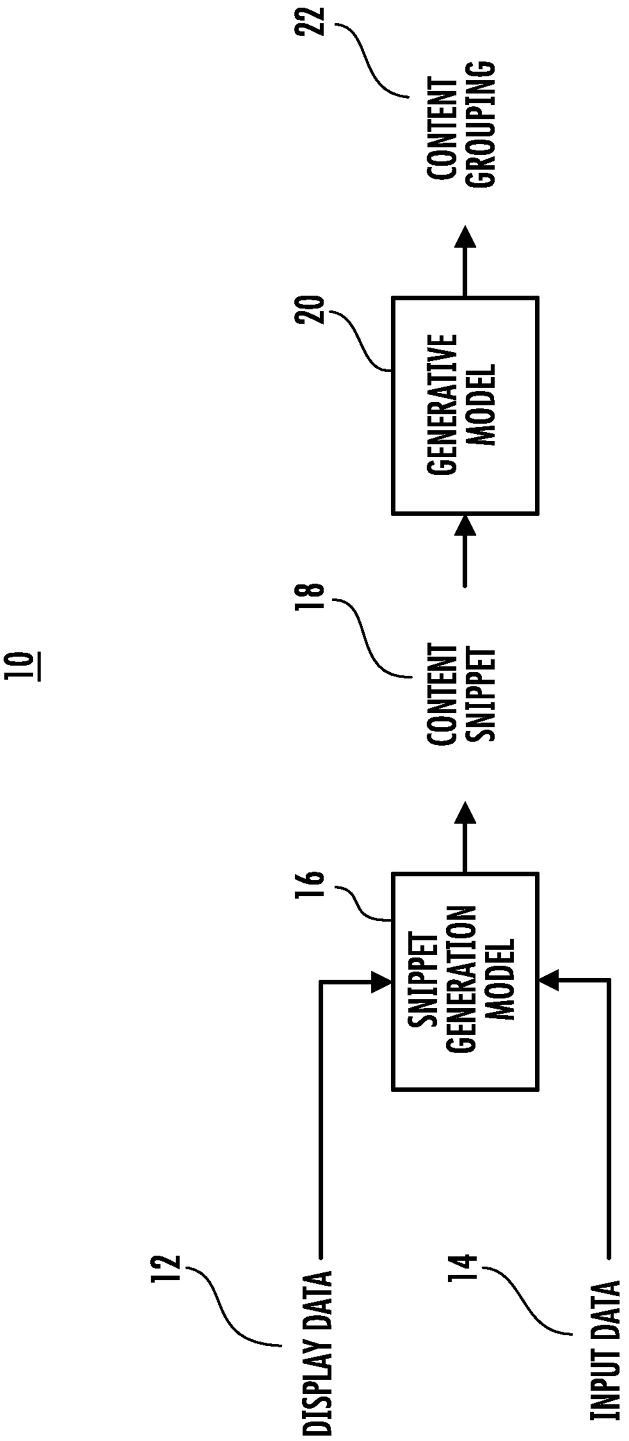
FIG. 1A depicts a block diagram of an example content snippet system according to example embodiments of the present disclosure.

Reference numerals that are repeated across plural figures are intended to identify the same features in various implementations.

DETAILED DESCRIPTION

Generally, the present disclosure is directed to systems and methods for generating and managing content snippets. In particular, the systems and methods disclosed herein can leverage user-input based content segmentation, context data determination, and/or a generative model to generate content-rich content snippets that can be categorized, grouped, and/or utilized for personalizing suggestions for a user. For example, a user may be viewing content, which may include browsing a web page via a browser application, viewing images in an image gallery, viewing social media posts via a social media application, viewing streaming content via a streaming application, and/or viewing other applications. The user may see an object of interest that they want to learn more information about, store the sub-portion of the content for later viewing, and/or share with other users. The user may invoke an overlay application. The overlay interface can be interacted with to segment the sub-portion of content provided for display based on a user input (e.g., an object selection tap, a lasso gesture, a scribble-over gesture, and/or other input). The segmented sub-portion can then be saved with source data (e.g., a URL, an application source application programming interface, and/or other source information) and/or other context data to generate a content snippet for the selected content. The content snippet may be stored in a user-specific collection, may be shareable to other users (e.g., via a text, email, Bluetooth transmission, and/or other transmission), may be processed by a search engine and/or machine-learned models to determine additional information about the content of interest, and/or utilized to determine suggested content for the user.

The content snippet may include visual search result data generated by a visual search interface of the overlay interface by processing the segmented sub-portion of the content with a search engine and/or one or more machine-learned models. The visual search result data can include an object classification, visual search results associated with the segmented content (e.g., an image search result, web resource, product search result, and/or other search result), a content grouping (e.g., a grouping association with one or more related content snippets/content item), and/or a model-generated response to a prompt that includes the segmented content and/or user input data (e.g., an input question). The content snippet may be processed with a generative model (e.g., a large language model (e.g., a vision language model)) to determine one or more labels for the content snippet. Additionally and/or alternatively, the content snippet and one or more other content snippets may be processed with the generative model to generate content groupings that include grouping content snippets based on determined semantic relationships and/or other shared topics. In some implementations, the generative model may be utilized to process user context data to determine when to suggest one or more content snippets to a user.

Content snippet generation, sharing, and/or saving can be implemented via an overlay interface, which may include an overlay interface for visual search at the operating system level. For example, a user computing device (e.g., a mobile computing device) may include an overlay interface that may be part of a device operating system and/or may be a third party application that may interface with the device operating system to provide the overlay interface across a plurality of different applications provided by the user computing device. The content snippet generation, sharing, and/or storing interface can be implemented and/or provided as part of the overlay application to provide accessibility across the plurality of different applications and/or types of content. The overlay interface may include a visual search functionality, a content snippet generation functionality, and/or one or more other functionalities for aiding a user with interacting with and/or understanding the content being provided for display.

Saving and/or sharing content provided for display can be difficult. In particular, screenshots and/or links can provide limited information and/or may lack specificity associated with a user intent. Additionally, taking a screenshot or saving a link may include a plurality of inputs for data that may be lost in the plurality of other datasets within an image gallery of the device and/or in a notes app. Taking the screenshot and/or saving the link may also redirect the user out of the current application they are utilizing. Moreover, the features of interest the user wants to capture may be limited to only a small portion of the displayed content, which may rely on screenshot cropping for more tailored capture. Furthermore, utilization of the screenshot and/or link may be limited.

An overlay application and/or an interface implemented at an operating system level of a computing device can be utilized to allow users to generate content snippets that isolate regions of content of interest and store the isolated content portions with source data and/or other context data without navigating away from the application and/or content currently provided for display. The content snippets can provide more immersive and/or more contextually-aware data packets for searching, storing, and/or sharing. The content snippets may be processed to generate content groupings that can then be utilized for categorizing content snippets, for determining content suggestions, and/or for providing content snippets as search results. A large language model (LLM) and/or other generative model may be utilized for determining the content groupings and/or for determining when to provide a particular content snippet to a user.

The content snippets and/or content groupings can be utilized for isolating data of interest to a user, which can then be utilized for determining user interests and/or providing search suggestions and/or content suggestions. For example, a personalization model may be tuned and/or trained on the content snippets, content labels, and/or content groupings. In some implementations, content groupings may be utilized to determine user interests, which may be leveraged by a generative model for generating suggested queries, which may then be proactively searched to obtain, determine, and/or provide resource suggestions (e.g., content item suggestions) to a user based on the determined interests. In some implementations, the proactively determined and/or obtained content items may be added to the content grouping. The content snippets may be utilized with visual search techniques to generate content rich user-specific collections. In some implementations, the content snippets may be provided in a snippet-specific interface for viewing, managing, and/or interacting with the content snippets. Additionally and/or alternatively, the content snippets may be provided for display as search results, provided as suggested content in a discover feed, and/or one or more other interfaces.

The systems and methods of the present disclosure provide a number of technical effects and benefits. As one example, the system and methods can generate and store content snippets. In particular, the systems and methods disclosed herein can obtain input data, determine a content item (e.g., text, image, video, and/or audio) associated with the input data, generate a content snippet, and store the content snippet. The content snippet can include a graphical representation (e.g., an image (e.g., a bitmap)) of the selected content that when selected can direct the user to a portion of a web page and/or a location within an application that the selected content originates from. The content snippet generation and saving can enable easy access to saved content while maintaining a link and/or other details associated with a context for the content item.

Another technical benefit of the systems and methods of the present disclosure is the ability to leverage the content snippet to share layered levels of information with relatively little transmission cost. For example, the systems and methods can generate a content snippet. The content snippet can be shared with a second user, who can initially view the graphical representation (e.g., the visual data). The second user can then select the graphical representation of the content snippet to navigate to a web page (and/or application) and be routed to the particular portion of the web page (and/or application) the content item originates from, which can allow the second user to obtain more context on the isolated content. The providing of layered information can be completed with relatively low transmission cost as the content item, the source data, and/or other context data may be transmitted. The second user can interact with the content snippet, view the content item in isolation, can then select the content snippet to use the source data and/or other context data to navigate to a portion of the web page (and/or source application) with the content item highlighted or otherwise indicated. Sending the whole web page file with highlighting may include much more upload and download during transmission.

Another technical benefit of the systems and methods of the present disclosure is the ability to leverage a generative model to categorize selected content of a content snippet, determine related content snippets, label content snippets, and/or determine when to surface the content snippets. Additionally and/or alternatively, the generative model may process the content snippet to determine and/or facilitate the searching of suggested content items to provide to the user. The generative model can identify semantic relationships, which may be utilized for determining user interests, similar content snippets/content items, and/or suggested searches.

The systems and methods disclosed herein can be leveraged to better disambiguate and/or understand the object and/or entity of focus. In particular, the entity may then be highlighted/selected, possibly annotated, and/or stored. In some implementations, the systems and methods can include utilizing a generative model (e.g., a large language model (LLM)) to help auto organize these stored ideas.

Another example of technical effect and benefit relates to improved computational efficiency and improvements in the functioning of a computing system. For example, the systems and methods disclosed herein can leverage the content snippet to mitigate the amount of data stored in order to save sub-portions of content of interest to the user with relevant context data. In particular, the content snippet may include a compressed version of the isolated content item, source information, and/or other context data in place of saving a compressed version of the full web page and/or application thread, which may include a large quantity of content items and embedded data. Additionally, searching through a collection of content snippets can be computationally less expensive than searching through a plurality of compressed web pages.

With reference now to the Figures, example embodiments of the present disclosure will be discussed in further detail.

FIG. 1A depicts a block diagram of an example content snippet system 10 according to example embodiments of the present disclosure. In particular, the content snippet system 10 can be leveraged to generate a content snippet 18 based on display data 12 and input data 14. The content snippet 18 may then be processed with a generative model 20 (e.g., a large language model) to generate tags and/or content groupings 22 for organizing the generated content snippets 18.

For example, a user may be viewing content via one or more applications. The user may see an object and/or entity of interest. The user may then wish to search, store, and/or share the object and/or entity of interest. The content snippet system 10 can be leveraged to isolate then search, store, and/or share the object and/or entity of interest.

The content snippet system 10 may receive input data 14 from the user of the user computing device. The input data 14 can be descriptive of a user input selecting the object and/or entity of interest (e.g., a tap of the object/entity, a highlight of text, a circling of the object/entity, a squiggle over the object/entity, etc.).

Based on the input data 14, the content snippet system 10 can obtain and/or generate display data 12 based on the content currently provided for display. The display data 12 can be descriptive of an application interface with information provided by the application. In some implementations, the display data 12 can be associated with a region of the displayed content that is proximate to the user input.

A snippet generation model 16 can then process the display data 12 and/or the input data 14 to generate a content snippet 18. The snippet generation model 16 can leverage one or more machine-learned models, one or more deterministic functions, and/or heuristics to generate the content snippet 18. In some implementations, the snippet generation model 16 can isolate the object and/or entity associated with the user input, determine and/or generate source information, determine a context, and/or generate a data packet descriptive of the object and/or entity of interest and the source of the displayed content. The content snippet 18 may include visual data descriptive of the selected sub-portion of the displayed content (e.g., image data (e.g., a bitmap)) and source data descriptive of a uniform resource locator, application origin, content author, content publisher, and/or other source information.

A generative model 20 can then process the content snippet 18 to generate a content grouping 22. The content grouping 22 may be descriptive of the content snippet 18 being associated with one or more other user content snippets. The content grouping 22 may include a tag descriptive of the determined association (e.g., a determined semantic relationship) between the content snippets and/or other content within the content grouping 22. The content snippet 18 and the content grouping 22 may then be stored.

Figure 1B:
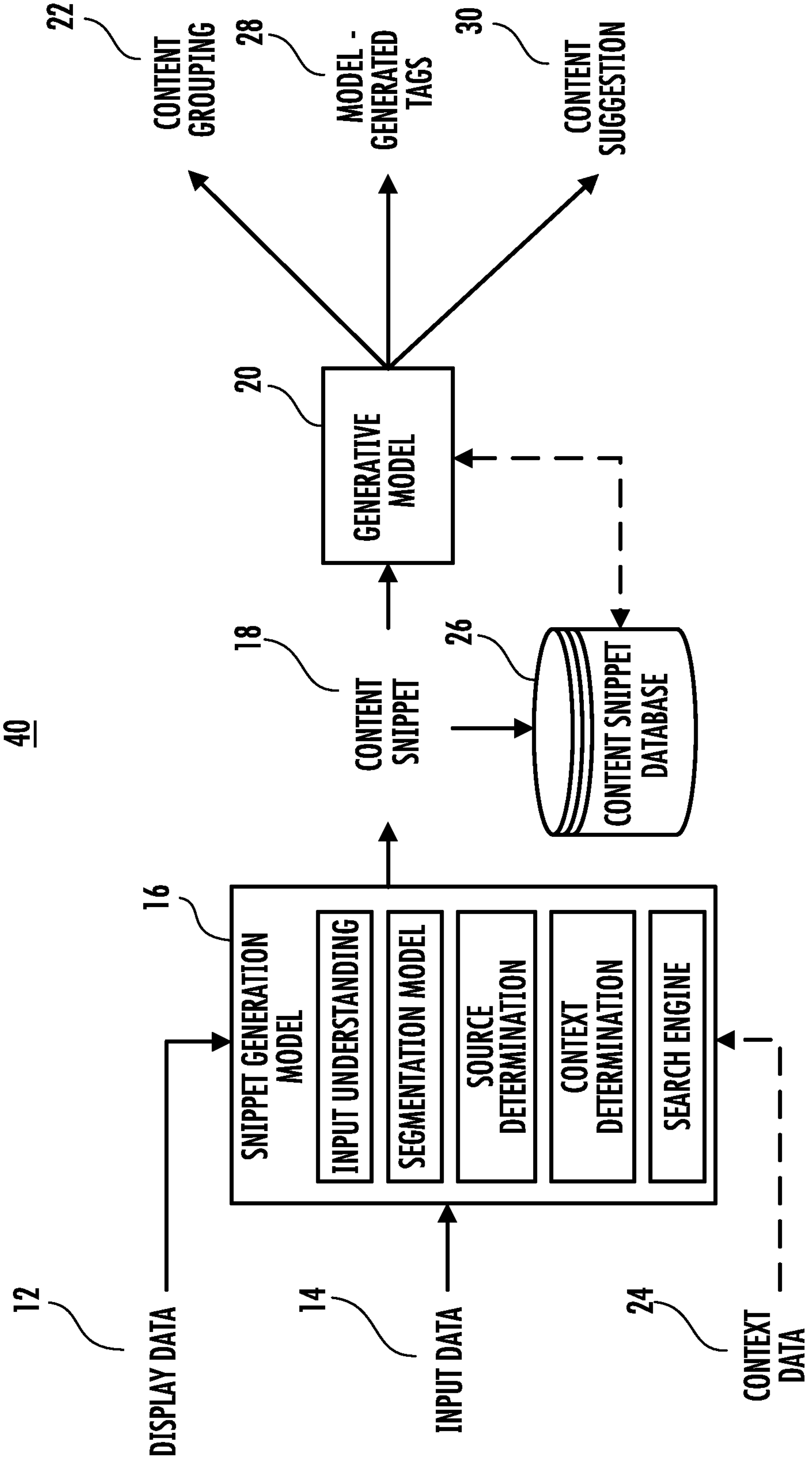
FIG. 1B depicts a block diagram of an example content snippet overlay system according to example embodiments of the present disclosure.

FIG. 1B depicts a block diagram of an example content snippet overlay system 40 according to example embodiments of the present disclosure. In particular, the content snippet overlay system 40 can be leveraged to generate a content snippet 18 that can then be searched, categorized, grouped, stored, tagged, and/or shared. The content snippet 18 may then be processed with a generative model 20 (e.g., a vision language model) to generate tags and/or content groupings 22 for organizing the generated content snippet 18. The content snippet overlay system 40 can be leveraged to isolate then search, store, and/or share an object and/or entity of interest and/or context information associated with the displayed content, which can then be utilized for determining user interests for further content suggestion.

The content snippet overlay system 40 may receive input data 14 from the user of the user computing device. The input data 14 can be descriptive of a user input selecting the object and/or entity of interest (e.g., a tap of the object/entity, a highlight of text, a circling of the object/entity, a squiggle over the object/entity, etc.). The input data 14 may include a tap input, a gesture input, a button press, a voice command, sensor data, and/or other input data. The input data 14 may include an interface invocation input (e.g., a long press of a Home button and/or navigation bar, a diagonal swipe from a corner, a voice command, and/or other input) to request the overlay interface be invoked. The input data 14 may include inputs that interact with the invoked overlay interface, which may include selecting a sub-portion of the content provided for display.

Based on the input data 14, the content snippet overlay system 40 can obtain and/or generate display data 12 based on the content currently provided for display (e.g., an article provided for display, a social media post provided for display, a video provided for display, and/or other displayed content). The display data 12 can be descriptive of an application interface with information provided by the application. In some implementations, the display data 12 can be associated with a region of the displayed content that is proximate to the user input.

Additionally and/or alternatively, the content snippet overlay system 40 can obtain and/or generate context data 24 associated with the user, the user input, and/or the displayed content. The context data 24 can include a user search history (e.g., search queries preceding the viewing of the displayed content), a user browser history (e.g., content previously provided for display), a time of day/week/month/year, a user computing device location, previous content isolated and stored, other content provided for display, an application type, user profile information, links associated with the displayed content, and/or other context data.

A snippet generation model 16 can then process the display data 12, the input data 14, and/or the context data 24 to generate a content snippet 18. The snippet generation model 16 can leverage one or more machine-learned models, one or more deterministic functions, and/or heuristics to generate the content snippet 18. In some implementations, the snippet generation model 16 can isolate the object and/or entity associated with the user input, determine and/or generate source information, determine a context, and/or generate a data packet descriptive of the object and/or entity of interest and the source of the displayed content.

For example, the snippet generation block 16 may include an input understanding model, a detection model, a segmentation model, a classification model, an augmentation model, a source determination model, a context determination model, and/or a search engine. The input understanding model can process the display data 12 and the input data 14 to determine the visual features associated with the user input. The input understanding model may determine the visual features based on input location, learned user-specific selection mapping, learned user interests, display data semantics, gaze data, and/or other data. The detection model may be utilized to detect objects and/or entities within the display data, which may include processing the display data 12 (e.g., image data descriptive of the displayed content) to generate one or more bounding boxes descriptive of the positions of one or more detected object/entities. The segmentation model may process the display data 12, input data 14, an input understanding model output, and/or one or more bounding boxes to segment a particular object and/or entity of interest from the display data 12. The segmentation model may perform the segmentation by generating one or more segmentation masks that can then be leveraged to isolate the pixels associated with the object and/or entity. The classification model may be utilized to generate a classification of one or more objects, one or more entities, one or more images, and/or one or more text strings of the display data. The augmentation model may be leveraged to augment one or more portions of the display data 12 based on the user input, which may then be utilized for content snippet generation and/or providing the user with input feedback.

The source determination model can be leveraged to determine the source of the displayed content and then generate source data descriptive of the source. The source determination model can determine an application source, a web page source, a publisher source, an author source, and/or other source. The source determination model may generate source data that may include a uniform resource locator, navigation directions, a hot link to the source, and/or other source data. The source determination model may generate an application programming interface (API) and/or an API call for navigating back to the source, which can be embedded in the source data.

The context determination model can be utilized to determine a context associated with user input and/or the source. The context determination model may determine which portions of the context data is relevant for content snippet indexing.

The search engine can be utilized to determine one or more search results responsive to the segmented display data. The one or more search results may be processed to generate search result data that may summarize and/or include the one or more search results.

The content snippet 18 may include visual data descriptive of the selected sub-portion of the displayed content (e.g., image data (e.g., a bitmap)) and source data descriptive of a uniform resource locator, application origin, content author, content publisher, an API call, and/or other source information. The content snippet 18 may include one or more machine-learned model outputs (e.g., a classification label, augmented display data, etc.) and/or search result data responsive to the segmented display data.

The content snippet 18 can be stored in a content snippet database 26. The content snippet database 26 may store the content snippet 18 with other content snippets generated by the user. In some implementations, the content snippet may be stored with search history data and/or browsing history data associated with the user.

A generative model 20 can then process the content snippet 18 to generate one or more content groupings 22, one or more model-generated tags 28, and/or one or more content suggestions 30. The content grouping 22 may be descriptive of the content snippet 18 being associated with one or more other user content snippets and/or one or more other content items. The content grouping 22 may include a tag (e.g., a model-generated tag 28) descriptive of the determined association (e.g., a determined semantic relationship) between the content snippets and/or other content within the content grouping 22.

The one or more model-generated tags 28 can be descriptive of a classification of the segmented object/entity, a semantic understanding output, a predicted caption, a generative completion output, a categorization, and/or other generative model 20 generated tags.

The generative model 20 may determine one or more content suggestions 30 based on the content snippet 18. The one or more content suggestions may include suggesting one or more previously generated content snippets, one or more previously viewed content items, one or more web resources, one or more generative model generated search queries, one or more generative model generated content items, and/or one or more action suggestions.

The content snippet 18, the content groupings 22, the model-generated tags 28, and/or the content suggestions 30 may then be stored in the content snippet database 26.

The generative model 20 may interface with the content snippet database 26 to organize the content snippets, supplement content groupings with determined and/or obtained content items, and/or determine when and/or how to provide the content snippets to a user.

The user may interact with the content snippet 18 and/or the content snippet database 26 to view and/or share the content snippets and/or content groupings.

Figure 2A:
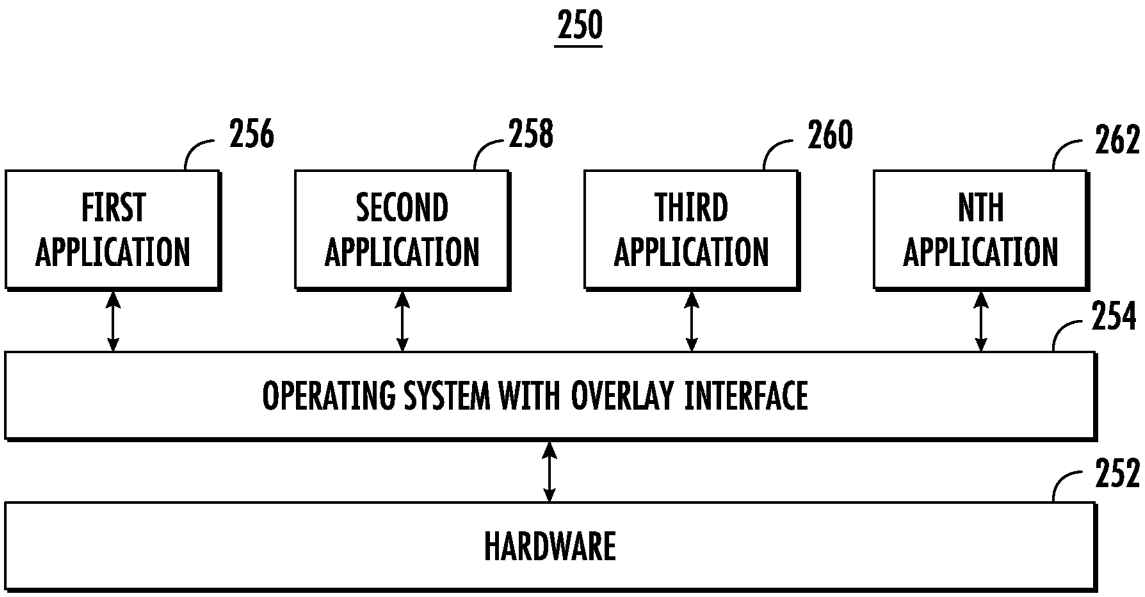
FIG. 2A depicts a block diagram of an example artificial intelligence overlay system according to example embodiments of the present disclosure.

FIG. 2A depicts a block diagram of an example artificial intelligence overlay system 250 according to example embodiments of the present disclosure. In particular, an overlay interface 254 can be implemented at an operating system level to provide the overlay interface 254 across applications and throughout the operating system of a computing device. FIG. 2A depicts a block diagram that illustrates that the overlay interface 254 can leverage the computational resources of the computing device hardware 252 to provide visual search, content snippet generation, and other data processing techniques across a plurality of applications, which can include a first application 256, a second application 258, a third application 260, and/or an nth application 262.

For example, the overlay interface 254 can include a display capture component, one or more on-device machine-learned models, and a transmission component that can leverage the hardware 252 of the computing device to perform display capture, object detection, optical character recognition, image segmentation, image augmentation, and/or data transmission. The overlay interface 254 can provide an overlay interface that can be accessed and utilized regardless of the application currently being utilized and/or displayed. The overlay interface 254 can be implemented in a kernel of the operating system.

In some implementations, the first application 256 can be a social media application, the second application 258 can be a web browser application, the third application 260 can be a media gallery application, and/or the nth application 262 can be a game application. The overlay interface 264 (e.g., an overlay visual search interface) can be utilized to obtain and process data displayed in the social media application to identify a location, detect and search an object for a shopping task, and/or one or more other tasks. Additionally and/or alternatively, the overlay interface 254 can be utilized to process web information displayed in a viewing window of the second application 258 to generate image annotations, provide suggested searches, provide additional information, generate a snippet to share and/or store, and/or suggest actions. The overlay interface 254 may be utilized to detect, segment, and search data viewed in the media gallery viewing window of the third application 260. In some implementations, the overlay interface 254 can be utilized to detect and search data associated with a game of the nth application 262 to obtain tutorials, determine progress, and/or find additional information on the game and/or features of the game.

The systems and methods disclosed herein can include an overlay interface at an operating system level. In particular, the operating system can include a kernel that utilizes a plurality of on-device machine-learned models, interfaces, and/or components to provide a visual search interface across applications and virtual environments accessed by the computing device.

Figure 2B:
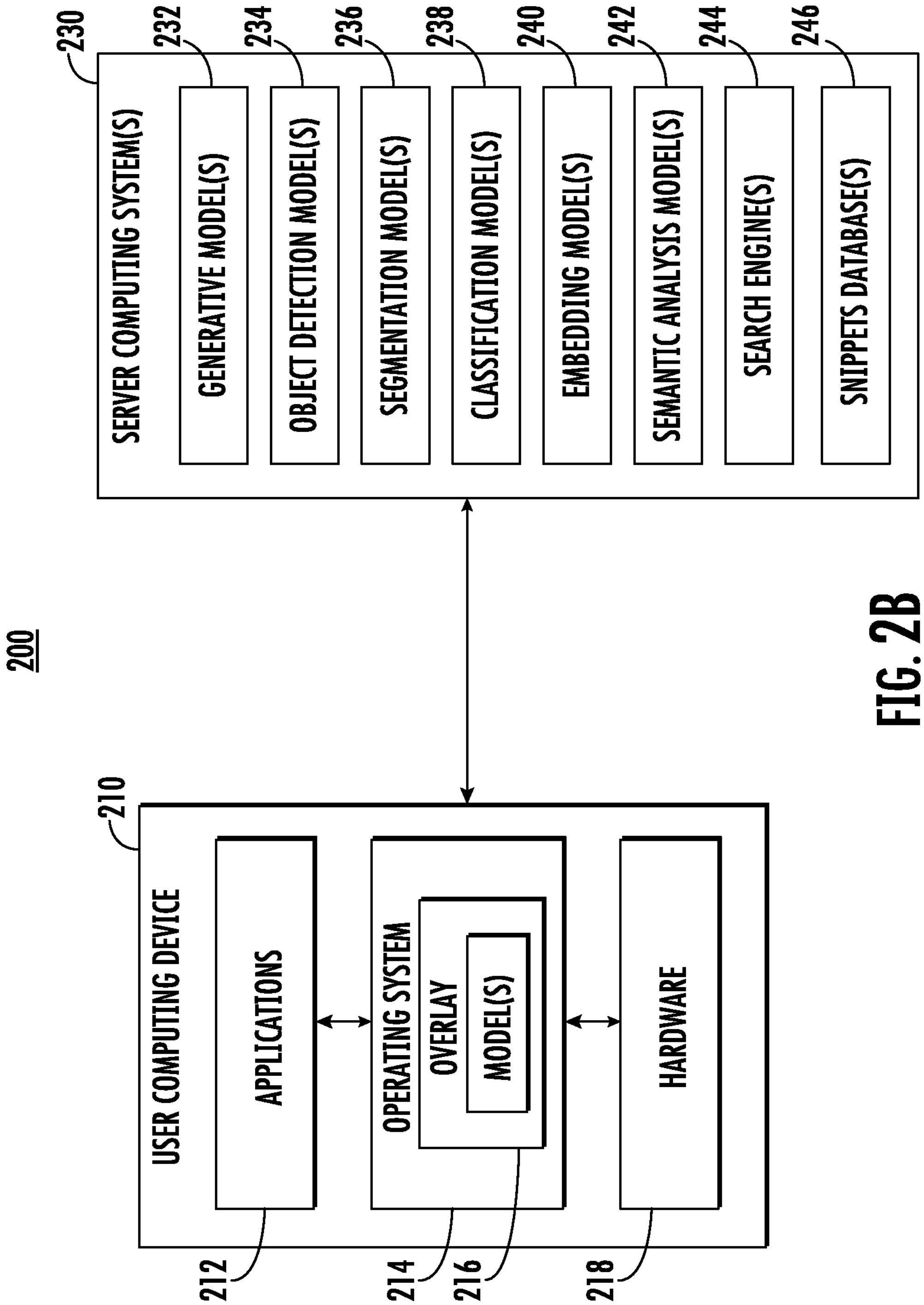
FIG. 2B depicts a block diagram of an example visual search in an operating system according to example embodiments of the present disclosure.

FIG. 2B depicts a block diagram of an example visual search interface system 200 according to example embodiments of the present disclosure. In particular, a user computing device 210 can include an overlay interface 216 in the operating system 214 that can leverage resources of the hardware 218 to provide visual search and/or content snippet generation across a plurality of different applications 212. The overlay interface 216 can communicate with a server computing system 230 to obtain search results and/or perform one or more other processing tasks.

The user computing device 210 can include a visual display. The visual display can display a plurality of pixels. The plurality of pixels can be configured to display content associated with one or more applications 212. The visual display can include an organic light-emitting diode display, a liquid crystal display, an active-matrix organic light-emitting diode display, and/or another type of display. In some implementations, the user computing device 210 can include one or more additional output components. The one or more additional output components can include a haptic feedback component, one or more speakers, a secondary visual display (e.g., a projector and/or a second display on an adjacent side of the user computing device 210), and/or other output components.

The user computing device 210 can include an operating system 214 that includes an overlay interface 216. The overlay interface 216 can include a visual search interface at an operating system level. The kernel can obtain display data associated with content currently provided for display by the visual display of the user computing device 210 and can transmit the display data and/or data associated with the display data (e.g., one or more machine-learned model outputs) to a server computing system 230. Additionally and/or alternatively, the overlay interface 216 can include a content snippet generation interface at an operating system level. The kernel can obtain display data associated with content currently provided for display by the visual display of the user computing device 210 and can generate a snippet packet that includes segmented content, source data, and/or context data.

The overlay interface 216 can include one or more machine-learned models stored on the user computing device 210. The one or more machine-learned models may have been trained to detect features in image data. The one or more on-device machine-learned models may have been trained to process image data to generate one or more machine-learned outputs based on detected features in the display data. The user computing device 210 can store a plurality of on-device machine-learned models. The plurality of on-device machine-learned models may be utilized to perform object recognition, optical character recognition, input recognition, query suggestion, and/or image segmentation.

The overlay interface 216 can include a visual search interface and/or a content snippet generation interface. The overlay interface 216 can obtain display data associated with content currently provided for display by the visual display in response to receiving a user input. The overlay interface 216 can include a transmission component. The transmission component can transmit data descriptive of the display data and the one or more machine-learned outputs to a server computing system.

The overlay interface 216 can include a display capture component. The display capture component can obtain the display data associated with the content currently provided for display by the visual display. The display capture component may generate a screenshot that can then be processed by one or more machine-learned models. Alternatively and/or additionally, a data packet can be generated based on the content being provided for display.

Additionally and/or alternatively, the overlay interface 216 can include an object detection model. The object detection model can process the display data to determine one or more objects are depicted. The object detection model can be trained to identify features descriptive of one or more objects associated with one or more object classes. In some implementations, the object detection model may process a screenshot (and/or script descriptive of the displayed content) to generate one or more bounding boxes associated with the location of one or more detected objects in the screenshot.

The overlay interface 216 can include an optical character recognition model. The optical character recognition model can process the display data to determine features descriptive of text and can classify (e.g., transcribe) the text. The optical character recognition can generate text data based on image data. The optical character recognition model may detect script in the display data. The script may be transcribed and/or translated. Different machine-learned models may be utilized for different content types, different languages, different locations, and/or other different context types.

In some implementations, the overlay interface 216 can include a segmentation model. The segmentation model can segment a region depicting the one or more objects to generate an image segment. The segmentation model may have been trained to generate segmentation masks that are descriptive of a silhouette of a depicted object. The segmentation model can determine the outline pixels for the detected objects, which can then be utilized to generate one or more indicators for the location and outline of the detected object. In some implementations, the segmentation model may be trained to parse through detected text to isolate the text from the display data. The segmentation model may segment text from other text in the display data based on semantics and/or entity determination. The segmentation masks may be utilized to provide snap-to indicators and/or segmentation, which may aid in input determination. In some implementations, the segmentation model may be utilized to generate the visual data of the content snippet.

In some implementations, the overlay interface 216 can include one or more classification models. The one or more classification models can process the display data to generate one or more classifications. The one or more classifications can include image classification, object classifications, scene classifications, and/or one or more other classifications.

Additionally and/or alternatively, the overlay interface 216 can include a machine-learned region-of-interest model. The machine-learned region of interest model may have been trained to predict a region of an image that a user is requesting to be searched. The machine-learned region of interest model may have been trained to determine a saliency of an object depicted in an image based on size, location, and/or other features in the image. In some implementations, the machine-learned region of interest model may have been trained to update one or more predictions based on processing one or more user inputs. One or more user interface elements may be provided based on objects, text, and/or regions determined to be of interest.

The overlay interface 216 can include a suggestion model. The suggestion model can process the display data to determine one or more query suggestions. Alternatively and/or additionally, the machine-learned suggestion model can process an output of at least one of the object detection model or the segmentation model to generate the one or more query suggestions. The one or more query suggestions can include a query to transmit to the server computing system 230. The query can include a multimodal query that includes a portion of the display data and a text segment. The display data can be processed with one or more on-device machine-learned models to generate the text segment. The suggestion model may process the display data to determine one or more action suggestions. The one or more action suggestions can be provided as selectable graphical user interface elements. In some implementations, the one or more action suggestions can be selectable to navigate to a second application and perform one or more model-determined actions within the second application. The second application can differ from a first application that is associated with the display data. The query suggestions and/or the action suggestions can be determined based on one or more detected objects and/or based on one or more entity classifications. The suggestions may be based on determining the display data and/or the visual search data is associated with a particular topic, a particular entity, and/or a particular task. Entities can be associated with individuals, groups, companies, countries, and/or products.

Additionally and/or alternatively, the overlay interface 216 can include a server interface. The server interface can transmit data associated with the display data to a server computing system. The server interface can transmit the query to a server computing system to perform a search based on the query.

The user computing device 210 can include a wireless network component. The wireless network component can include a communication interface for communicating with one or more other computing devices. The user computing device 210 can include one or more processors and one or more non-transitory computer-readable media that collectively store instructions that, when executed by the one or more processors, cause the computing device to perform operations.

FIG. 2B can depict an example visual search interface system 200 that includes a user computing device 210 that communicates with one or more server computing systems 230 to perform one or more processing tasks across a plurality of different applications 212. The user computing device 210 can include hardware 218, an operating system 214, and a plurality of applications 212.

The hardware 218 can include physical parts of the user computing device 210, which can include a central processing unit, a graphics processing unit, random access memory, speakers, a sound card, computer data storage, input components, physical display components (e.g., a visual display), and/or other hardware components.

The operating system 214 can include software for managing the computer resources of the hardware 218 and can be utilized to manage and operate a plurality of applications 212 and/or other computer software run on the user computing device 210. The operating system 214 can include an overlay interface 216 that can be utilized as an overlay visual search interface at the operating system level. The overlay interface 216 can include a plurality of machine-learned models, heuristics, and/or deterministic functions for providing data processing services across a plurality of different applications 212. The data processing services can include, image classification, object detection, object classification, image segmentation, data augmentation, data annotation, visual search, optical character recognition, input recognition, query prediction, action prediction, and/or other data processing tasks.

The overlay interface 216 can obtain display data associated with content currently provided for display, process the display data to generate one or more processing outputs, generating one or more graphical user interface elements that provide additional information to the user, transmit the one or more processing outputs and/or the display data to a server computing system 230, receive data from the server computing system 230, and provide the data for display. The overlay interface 216 can include a display capture component that can generate a screenshot, parse through displayed data, and/or generate a data packet descriptive of the displayed content. The display data can be processed with one or more machine-learned models to perform object detection and/or optical character recognition. Masks can be generated for each detected object, which can be utilized to indicate to the user objects identified in the displayed content. Additionally and/or alternatively, the text and/or the objects identified can be processed to determine entities associated with the content, which can then be annotated in the display interface. The display data, detected object, and/or detected text can be processed to provide one or more suggestions (e.g., one or more query suggestions and/or one or more action suggestions).

The overlay interface 216 can include, provide, and/or generate plurality of different user interface elements that can provide additional information, options, and/or indicators to a user. The user interface elements can include indicators of detected objects and/or text that can be selected to perform one or more additional actions, which may include transmitting the selected data for processing with a search engine and/or a generative model. Additionally, user interface elements may provide users with the option of gesture selection. In some implementations, selectable suggestions can be provided that can be selected to perform a search (e.g., a search with a suggested query) and/or one or more other actions (e.g., send an email, open map application, color correction, auto focus, and/or data augmentation).

The overlay interface 216 can obtain data from a plurality of different applications 212 and can transmit data from a plurality of different applications to provide an overlay interface for determining and providing additional information to the user along with providing compiled and transmittable data.

The overlay interface 216 can include an input understanding model. The input understanding model can be trained to determine the relevancy and/or saliency of a plurality of different features in display data. The relevancy and/or saliency can be determined based on object and/or character size, location, and/or cohesiveness with other objects and/or characters in the display data. Additionally and/or alternatively, the input understanding model may be trained and/or conditioned on previous user interactions. For example, the input understanding model may be conditioned on previously viewed data to adjust saliency and/or relevancy based on recently viewed content. Additionally and/or alternatively, the input understanding model may be trained on previous inputs and/or gestures to understand deviances from ground truth when receiving inputs from the user. The training can configure the model to understand which element is being selected and/or when a gesture is received. The input determination model may be personalized for a particular user based on previous user interactions. Alternatively and/or additionally, the input determination model may be uniform for a plurality of users. The input determination model can be trained to determine whether a gesture is associated with invocation of the visual search interface or an interaction with a displayed application. Additionally and/or alternatively, the input determination model may be trained to determine when an input is a gesture to select a particular object for search and/or when another input is received. In some implementations, the input understanding model may generate a polygon associated with a user input and determine an overlap between the polygon and the detected objects. The object(s) overlapped by the polygon may be determined to be selected. The input understanding model may leverage heuristics, deterministic functions, and/or learned weights.

The overlay interface 216 can communicate over a network with a server computing system 230 to provide a plurality of additional processing services. The server computing system 230 can include one or more generative models 232, one or more object detection models 234, one or more segmentation models 236, one or more classification models 238, one or more embedding models 240, one or more semantic analysis models 242, one or more search engines 244, and/or one or more content snippet databases 246.

The one or more generative models 232 can be utilized to process the display data and/or one or more processing outputs to generate a natural language output (e.g., a natural language output that includes additional information on the display data and/or entities associated with data depicted in the displayed content), a generative image, and/or other model-generated media content items. For example, one or more web resources can be accessed and processed to generate a summary for a particular topic. The one or more object detection models 234 can be utilized to perform object detection in the display data. The one or more segmentation models 236 can be utilized to segment objects and/or text segments from the displayed content. The one or more classification models 238 can be utilized to perform object classification, image classification, entity classification, format classification, sentiment classification, and/or other classification tasks. The one or more embedding models 240 can be utilized to embed portions of and/or all of the display data. The embeddings can then be utilized for searching for similar objects and/or text, classification, grouping, and/or compression. The semantic analysis model 242 can be utilized to process the display data to generate a semantic output descriptive of an understanding of the display data with regards to topic understanding, scene understanding, a focal point, pattern recognition, application understanding, and/or one or more other semantic outputs.

The one or more search engines 244 can process the display data, portions of the display data, and/or one or more machine-learned model outputs to determine one or more search results. The one or more search results can include web pages, images, text, video, and/or other data. The search results may be determined based on feature mapping, feature matching, embedding search, metadata search, label search, clustering, and/or other search techniques. The search results may be determined based on a query intent classification, a search result classification, and/or an entity classification. The outputs of the models and/or the search results can be transmitted back to the user computing device to be provided to the user via one or more user interface elements generated and provided by the visual search interface 216.

The one or more content snippet databases 246 can include a plurality of user-specific content snippet collections. For example, the content snippet collections may be user-specific, group specific (e.g., a shared collection), and/or a public collection. Each user may be able to generate a plurality of different content snippet collections that may be generated based on user selections and/or automatic generation. The collections may include content groupings that may be determined based on content snippet processing with a generative model (e.g., a large language model (LLM)).

Figure 3A:
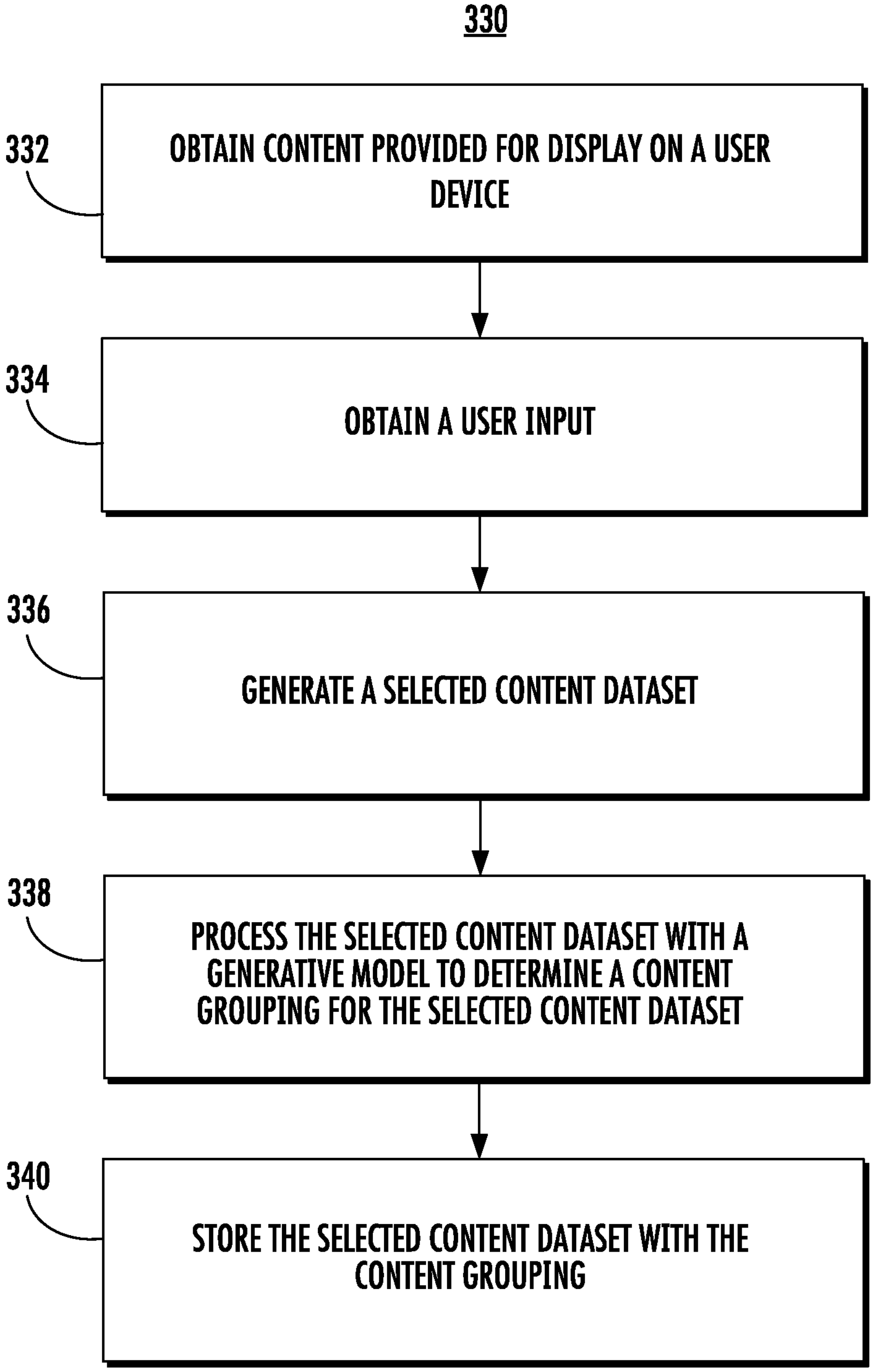
FIG. 3A depicts a flow chart diagram of an example method to perform content snippet generation according to example embodiments of the present disclosure.

FIG. 3A depicts a flow chart diagram of an example method to perform according to example embodiments of the present disclosure. Although FIG. 3A depicts steps performed in a particular order for purposes of illustration and discussion, the methods of the present disclosure are not limited to the particularly illustrated order or arrangement. The various steps of the method 330 can be omitted, rearranged, combined, and/or adapted in various ways without deviating from the scope of the present disclosure.

At 332, a computing system can obtain content provided for display on a user device. The content can include a plurality of different visual features. The content can include content items provided via one or more applications. The content may be obtained from applications that differ from the overlay interface that obtains the content. The content can include social media posts, messages, product listings, a book passage, a movie, and/or other content. The content can include image data descriptive of an application interface and/or one or more content items hosted and/or provided by the application.

At 334, the computing system can obtain a user input. The user input can be descriptive of a selection of a sub-portion of the content. The sub-portion of the content can include at least a subset of visual features of the plurality of visual features. The user input may be obtained after invoking an overlay interface. The overlay interface may be associated with an application associated with an operating system of a user device. The user input may be obtained as part of a visual search interface accessible via a plurality of applications provided by a user device.

In some implementations, the user input can include a gesture input associated with a region of the content provided for display. The computing system can process the region of the content provided for display to determine the gesture input is associated with a selection of the sub-portion of the content. The sub-portion of the content can include a set of visual features of interest. In some implementations, the sub-portion can be determined based on a semantic understanding of the region. The set of visual features of interest can be associated with an object within the region. In some implementations, the gesture input can include a lasso gesture that encloses a sub-portion of the content. Alternatively and/or additionally, the gesture input can include a scribble gesture that covers at least a subset of the sub-portion of the content. The sub-portion may be segmented from the other content via a segmentation model and/or one or more other machine-learned models.

At 336, the computing system can generate a selected content dataset. The selected content dataset can include visual data and source data. The visual data can be descriptive of particular visual features associated with the sub-portion of the content. In some implementations, the source data can be descriptive of a source of the content. The visual data can include a bitmap associated with at least a subset of the sub-portion of the content. The visual data may include image data descriptive of a plurality of pixels associated with the content. The selected content dataset may include visual search data determined by processing at least the portion of the content with a search engine and/or one or more machine-learned models.

In some implementations, generating the selected content dataset can include processing the content with a segmentation model to generate segmented image data descriptive of the sub-portion of the content, obtaining source information associated with an application provided for display and the content source, and generating the selected content dataset that can include the segmented image data, the source information, and metadata associated with a user context. The user context can be descriptive of a particular user associated with the user input, a time of dataset generation, and user viewing history associated with the content.

At 338, the computing system can process the selected content dataset with a generative model to determine a content grouping for the selected content dataset. The content grouping can be descriptive of one or more other content snippets determined to be associated with the selected content dataset. In some implementations, the content grouping can be associated with a determined task association, a determined entity association, a determined context association, and/or a determined semantic relationship.

At 340, the computing system can store the selected content dataset with the content grouping. Storing the selected content dataset with the content grouping can include indexing the selected content dataset with a content grouping label. In some implementations, a database collection may be generated. The collection may include a content grouping tag, the selected content dataset, and/or the one or more other content snippets. The computing system may perform one or more proactive searches based on the determined content grouping. Search results for the proactive searches may be obtained, stored, and/or provided to the user as suggested content items.

In some implementations, storing the selected content dataset with the content grouping can include storing the selected content dataset with user search history data (e.g., the content snippets may be saved in a user's search history and/or browsing history). The computing system can tune a machine-learned personalization model based on the content grouping and the user search history data. The machine-learned personalization model can be associated with a particular user. In some implementations, the computing system can determine, with the machine-learned personalization model, a suggested content item based on the content grouping and provide the suggested content item for display.

Figure 3B:
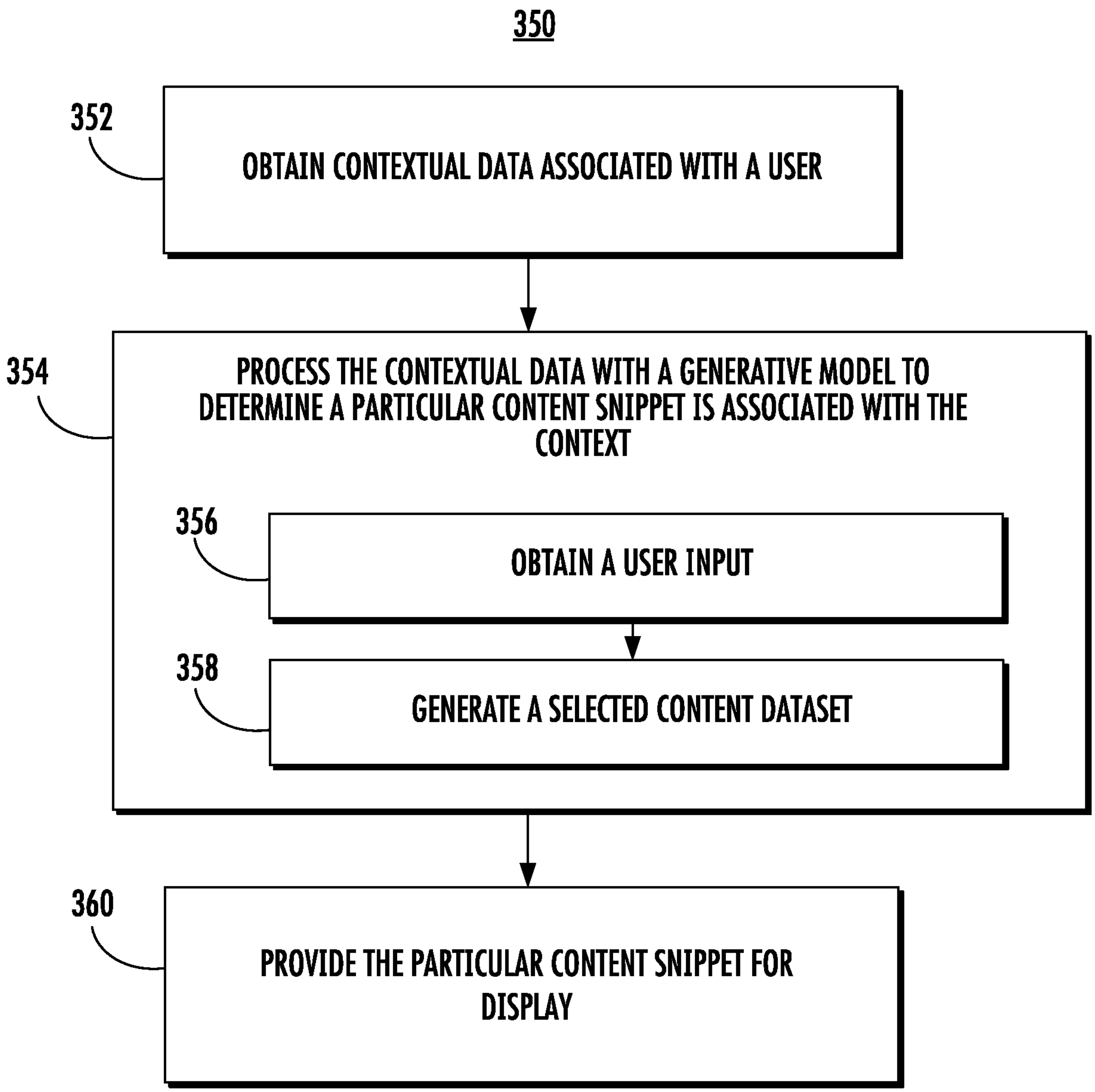
FIG. 3B depicts a flow chart diagram of an example method to perform content snippet suggestion according to example embodiments of the present disclosure.

FIG. 3B depicts a flow chart diagram of an example method to perform according to example embodiments of the present disclosure. Although FIG. 3B depicts steps performed in a particular order for purposes of illustration and discussion, the methods of the present disclosure are not limited to the particularly illustrated order or arrangement. The various steps of the method 350 can be omitted, rearranged, combined, and/or adapted in various ways without deviating from the scope of the present disclosure.

At 352, a computing system can obtain contextual data associated with a user. The contextual data can be descriptive of a context associated with a user computing device. In some implementations, the contextual data can include search history data associated with the user. The contextual data can include a time, a location, currently displayed data, recently viewed content, recent searches, a search progression, and/or other contexts. The contextual data may include determining a particular event of note to a user is occurring (e.g., a sporting event, an awards show, a ticket sale, a calendar event, etc.). The contextual data may include data associated with a search query.

At 354, the computing system can process the contextual data with a generative model to determine a particular content snippet is associated with the context. The particular content snippet may include visual data and source data. The content snippet may have been generated with an overlay interface for segmenting, saving, sharing, and/or searching content provided for display on a user computing device. The particular content snippet may have been generated by obtaining a user input and generating a selected content dataset.

At 356, the computing system can obtain a user input. The user input can be descriptive of a selection of a sub-portion of content provided for display. In some implementations, the sub-portion of the content can include at least a subset of visual features of the content provided for display. The user input may include a gesture that circles around a particular object, scribbles over a particular object, highlights (or strikes-through) text, and/or other gestures to indicate a selection request for a particular sub-portion of the content.

At 358, the computing system can generate a selected content dataset. The selected content dataset can include visual data and source data. In some implementations, the visual data can be descriptive of particular visual features associated with the sub-portion of the content. The source data can be descriptive of a source of the content. The visual data may include image data, text data, and/or other data. The visual data and/or the source data may be processed with a search engine and/or one or more machine-learned models to generate search result data. The search result data may then be stored with the selected content dataset.

In some implementations, processing the contextual data with the generative model to determine the particular content snippet of a plurality of content snippets associated with the context can include determining, with the generative model, a proactive candidate search intent associated with the context. The proactive candidate search intent can be descriptive of a suggested search that is predicted to be relevant to the user based on the contextual data. Processing the contextual data with the generative model to determine the particular content snippet of a plurality of content snippets associated with the context can include determining a content grouping includes content responsive to the proactive candidate search intent. The content grouping can include the particular content snippet.

In some implementations, the content grouping may have been generated by obtaining a plurality of content snippets associated with the user, processing the plurality of content snippets with the generative model to determine the particular content snippet and one or more additional content snippets are associated with a shared topic, and generating the content grouping including the particular content snippet and the one or more additional content snippets based on the shared topic. In some implementations, the shared topic can be determined based on determining the particular content snippet and the one or more additional content snippets include content are associated with a particular entity.

At 360, the computing system can provide the particular content snippet for display. The particular content snippet may be provided for display in a discover feed that provides a plurality of suggested content items, resources, and/or snippets. Alternatively and/or additionally, the particular content snippet may be provided in a search results interface and/or a snippets collection interface.

In some implementations, the computing system can obtain a search query. The computing system can process the search query and the contextual data with the generative model to determine the particular content snippet and to generate a model-generated response and process the search query and the contextual data with a search engine to determine a plurality of web search results. The computing system can then provide a search results interface for display. The search results interface can include the model-generated response to the search query, the particular content snippet, and at least a subset of the plurality of web search results.

FIG. 3C depicts a flow chart diagram of an example method to perform according to example embodiments of the present disclosure. Although FIG. 3C depicts steps performed in a particular order for purposes of illustration and discussion, the methods of the present disclosure are not limited to the particularly illustrated order or arrangement. The various steps of the method 370 can be omitted, rearranged, combined, and/or adapted in various ways without deviating from the scope of the present disclosure.

At 372, a computing system can provide content for display. The content can include a plurality of different visual features. The content can include an application interface that provides media content items for display as part of a social media interface, a shopping interface, a search interface, a media gallery, a content streaming platform, a news interface, browser interface, and/or other interface. The content may be associated with a third-party application.

At 374, the computing system can obtain a user input. The user input can be descriptive of a selection of a sub-portion of the content. The sub-portion of the content can include at least a subset of visual features of the plurality of visual features. The user input may include a gesture input that may be processed to determine the sub-portion of interest to the user. The sub-portion may include an object, text, a pattern, a structure, a location, and/or other features.

In some implementations, the computing system can obtain an interface invocation input before obtaining the user input. The interface invocation input can be associated with a request to invoke an overlay interface. In some implementations, the interface invocation input can include a long press gesture input (e.g., a long press of a Home button). The overlay interface can include a user interface for segmenting and processing visual content provided for display across a plurality of different applications.

At 376, the computing system can generate a selected content dataset. The selected content dataset can include visual data and source data. The visual data can be descriptive of particular visual features associated with the sub-portion of the content. In some implementations, the source data can be descriptive of a source of the content. The selected content dataset can include image data, text data, and/or metadata. The metadata can include content labels, source data, context data, search result data, and/or other data.

At 378, the computing system can obtain a plurality of other content snippets associated with a user. The plurality of other content snippets may be obtained from a collection of other content snippets generated based on past user inputs. The collection may be user-specific. The content snippets may be stored with search history data and/or browser history data.

At 380, the computing system can process the selected content dataset and the plurality of other content snippets with a generative model to generate a content grouping. The content grouping can include the selected content dataset and one or more additional content snippets of the plurality of other content snippets. The content grouping may be determined based on determining a semantic relationship between two or more content snippets. The semantic relationship may be determined based on a shared task, a shared entity, and/or other shared/linking topic.

At 382, the computing system can store the content grouping including the selected content dataset and the one or more additional content snippets. The content grouping may be indexed. The content grouping may be stored with user search history data, user browsing history data, and/or other user-specific data.

In some implementations, the systems and methods disclosed herein can leverage a visual search interface in an operating system of a computing device. The visual search interface can generate display data descriptive of content provided for display on the computing device and can process the display content to determine information associated with the displayed content. The visual search interface can include a display capture component for generating the display data, one or more on-device machine-learned models for processing the display data, and/or a transmission component for interfacing with one or more other computing systems.

Visual search in the operating system can include an interface at the operating system level that users can leverage to process visual data across applications executed by a computing device. The visual search interface can be invoked via a user input, which can include a voice command, a touch gesture (e.g., a long press, a swipe (e.g., a diagonal swipe), a lasso, a squiggle, etc.), and/or one or more other user inputs. The visual search in the operating system can be included in mobile computing devices (e.g., a smartphone, a tablet, and/or a smart wearable), a smart television, a smart appliance, and/or a desktop computing device. In some implementations, a visual search interface may be implemented as an extension and/or an overlay interface for a web browser.

Obtaining additional information associated with information provided for display across different applications and/or media files can be difficult when the data is visual, niche, and/or not selectable in a current native form. Therefore, a user may struggle in attempting to construct a search query to search for additional information. In some instances, a user may capture a screenshot and utilize the screenshot as a query image. However, the search may lead to irrelevant search results associated with items not of interest to the user. Additionally, screenshot capture and/or screenshot cropping can rely on several user inputs being provided that may still fail to provide desired results.

An overlay visual search application at the operating system level can be leveraged to perform visual search across different applications, which may include social media applications, browser applications, media content viewing applications, map applications, and/or a viewfinder application. The visual search can be implemented via a kernel of an operating system installed on a computing device. The operating system can obtain and/or process data being received from one or more applications to then be transmitted to one or more server computing systems to perform one or more artificial intelligence techniques for object classification, object recognition, optical character recognition, image captioning, image-to-text summarization, text summarization, query suggestion, and/or web search based on image and/or text processing. The overlay interface can generate display data, detect objects, and provide detection indicators in a singular interface and can then transmit data for further processing based on a user selection.

Visual search in an operating system can be included in computing devices to provide a readily available interface for users to access a plurality of artificial intelligence processing systems for object classification, image captioning, image-to-text summarization, response generation, web search, and/or one or more other artificial intelligence techniques. Smart phone and smart wearable manufacturers in general may implement visual search in the operating system to leverage the utility of machine-learned models and/or search engines across different applications. The visual search in the operating system can then be utilized to determine secondary applications associated with the visual search data to provide suggestions to transmit (or share) visual search data across applications on the device.

The systems and methods disclosed herein can leverage a visual search application in the operating system to provide an overlay visual search interface that can interface with a plurality of different applications on the computing device without the computational cost and/or privacy concerns of traditional visual search techniques. For example, the visual search interface can generate display data based on content currently and/or previously provided for display and can process the display data to perform object detection, optical character recognition, segmentation, and/or other techniques on the computing device without the upload and/or download costs of interfacing with server computing systems. Additionally and/or alternatively, the display data may be generated and temporarily stored during the visual search process, then deleted to save on storage space and free up resources for future visual search instances. The data generation and processing on-device can reduce the data transmitted to server computing systems and can increase privacy.

The visual search interface may include and/or utilize a plurality of on-device machine-learned models. The on-device machine-learned models can include an object detection model, an optical character recognition model, a segmentation model, a language model, a vision language model, an embedding model, an input determination model (e.g., a gesture recognition model), a speech-to-text model, an augmentation model, a suggestion model, and/or other machine-learned models. The on-device machine-learned models can be utilized for on-device processing. Additionally and/or alternatively, a portion and/or all of the display data may be transmitted to a server computing system to perform additional processing tasks, which can include search result determination with a search engine, content generation with a generative model, and/or other processing tasks.

The visual search data generated and/or determined based on on-device and/or on-server processing may provide additional information to a user that may have been previously unobtainable by the user (and/or traditionally more tedious and computationally expensive to obtain). The visual search data may be further processed to generate application suggestions to interact with and/or leverage the additional information. The application suggestions can be based on data types associated with the determined visual search results and/or based on topics, tasks, and/or entities associated with the visual search results. The application suggestions may be selectable to navigate to and/or transmit visual search data to one or more applications on the computing device. The transmission can be performed at the operating system level and may be facilitated via one or more application programming interfaces. A model-generated content item may be generated based on the visual search data and/or based on a selected application.

A user may struggle in applying the additional knowledge to other tasks, such as informing others and/or acting on the additional information (e.g., generating lists, messaging others, writing a social media post, and/or interacting with the display data). An overlay visual search application at the operating system level can be leveraged to perform visual search across different applications, and the visual search data can be transmitted to other applications on the device. The operating system can obtain and/or process data being received from one or more applications to then be processed to perform one or more artificial intelligence techniques to generate outputs that may then be processed to suggest second applications to transmit the visual search data for actionable use of the visual search data.

Additionally and/or alternatively, the visual search interface in the operating system can be configured to obtain prompt inputs from the user to aggregate data from a plurality of different applications on the computing device and/or the web. The prompt can be processed to determine one or more applications on the computing device are associated with a topic, task, and/or content type associated with the request of the prompt. An application call can then be generated and performed based on the application determination. The application call can access the one or more particular applications, search for relevant content items, and obtain content items associated with the prompt. The obtained content items may be provided for display. Alternatively and/or additionally, the content items can be processed with a generative model to generate a structured output that includes the information from the content items that are responsive to the prompt, and the information can be formatted in a digestible format, which can include a graphic, a story, an article, an image, a poem, a web page, a widget, a game, and/or other data formats.

The visual search interface may include an audio search interface, a multimodal search interface, and/or other data processing interfaces implemented at the operating system level to process data associated with a plurality of different data types. Therefore, a user may invoke an overlay interface to process image data, video data, audio data, text data, statistical data, latent encoding data, and/or multimodal data across a plurality of different applications.

The systems and methods of the present disclosure provide a number of technical effects and benefits. As one example, the systems and methods can provide visual search across a plurality of different surfaces provided by a computing device. In particular, the systems and methods disclosed herein can utilize a visual search interface in an operating system of a computing device to provide an overlay interface for data processing across a plurality of different surfaces (e.g., a plurality of different applications). The visual search interface can provide an overlay interface at the operating system level that can obtain and process data from a plurality of different applications, which may include generating and processing a screenshot of currently (and/or previously) displayed content. The visual search interface can include on-device machine-learned models that can perform object detection, optical character recognition, segmentation, query suggestion, action suggestion, and/or other data processing tasks on-device without transmitting data to a server computing system. The on-device machine-learned models can provide privacy and can provide data processing services even when network access is limited and/or unavailable. The visual search interface can be implemented in a kernel of the operating system. Additionally and/or alternatively, the visual search kernel may include an interface (e.g., an application programming interface) for communicating with a server computing system to perform one or more additional data processing tasks (e.g., search engine processing, generative model media content generation, etc.).

Another technical benefit of the systems and methods of the present disclosure is the ability to leverage a visual search system that includes one or more communication interfaces for transmitting and obtaining data to a plurality of different applications. For example, the systems and methods disclosed herein can include application programming interfaces and/or other communicative interfaces to perform data packet generation and transmittal and/or data calls. The systems and methods can process display data, generate one or more data processing outputs, and transmit data to a secondary application to perform one or more actions. Additionally and/or alternatively, data can be obtained from one or more secondary applications to generate one or more additional information content items. The operating system level system can leverage communicative interfaces to provide seamless use of data across different applications that may be utilized to transmit data packets to other users and/or generate (and/or aggregate) information for the user of the computing device. The operating system level implementation can be utilized to reduce upload and download instances and cost for a plurality of different processing tasks. Additionally and/or alternatively, temporary files and/or embeddings can be generated and processed to reduce storage usage and increase privacy budgeting.

Another example of technical effect and benefit relates to improved computational efficiency and improvements in the functioning of a computing system. For example, the systems and methods disclosed herein can leverage a visual search interface in the operating system to reduce the inputs and operations necessitated for performing particular data processing tasks across different applications. The reduction of inputs and operations can reduce the computational resources utilized to perform visual search, feature detection, and/or query and/or action suggestion based on processing display data. Additionally and/or alternatively, the operating system level visual processing system can utilize communicative interfaces to transmit and/or obtain data from secondary application(s), which can reduce the manual navigation, storage, and/or selection of a user.

Figure 4A:
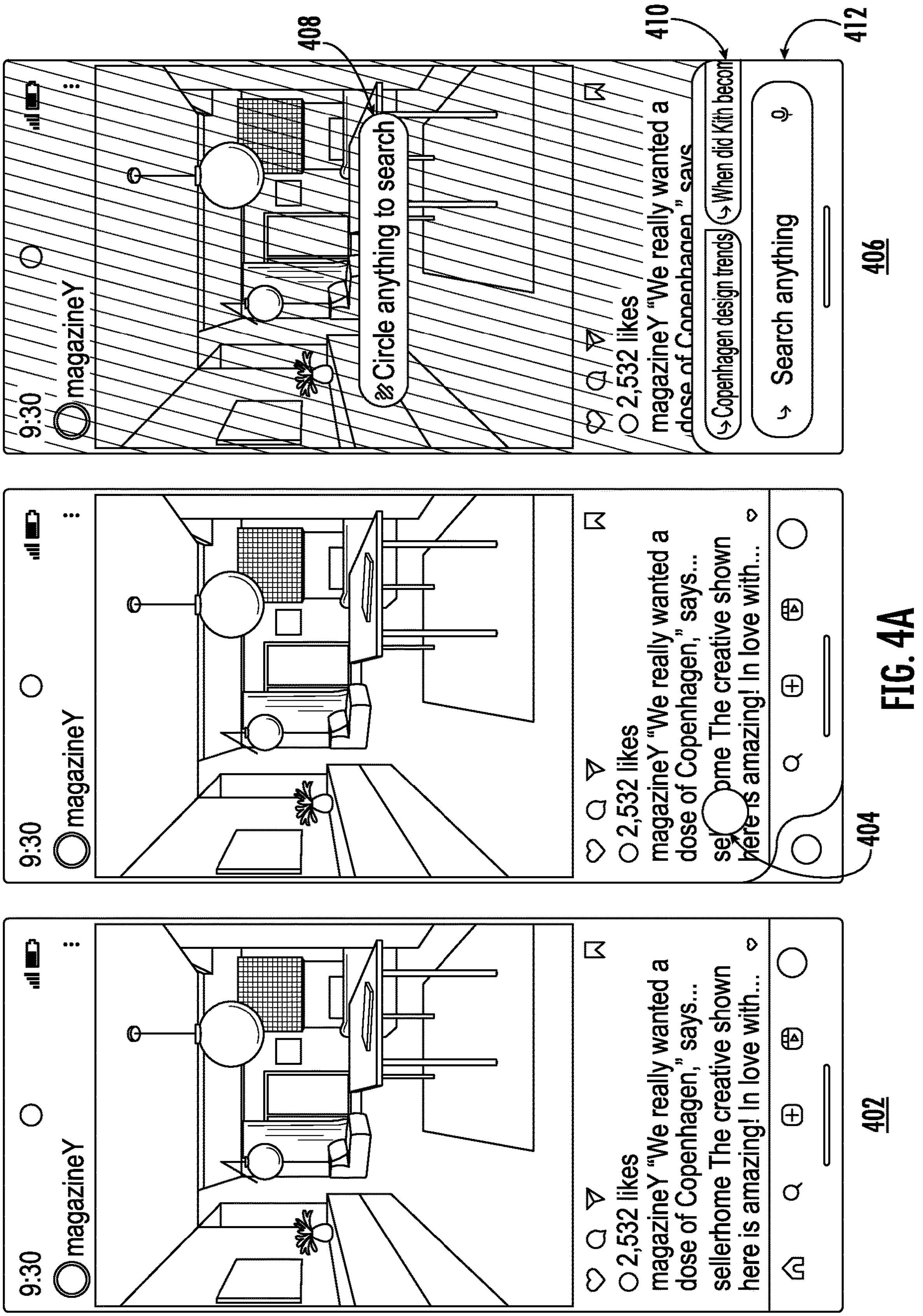
FIGS. 4A-4D depict illustrations of an example visual search interface according to example embodiments of the present disclosure.

FIGS. 4A-4D depict illustrations of an example visual search interface according to example embodiments of the present disclosure. In particular, FIG. 4A depicts an illustration of the visual search interface being opened and utilized to perform display data processing and annotation.

For example, a user may be viewing a content item in a first application 402 that may include a first application interface. The first application 402 may include a social media application that displays one or more content items. The content item may be a social media post posted by a user and/or entity that the user follows on the particular social media platform.

The computing device may provide the content item in a first application 402 and may receive an input 404 to open the visual search interface. The input 404 may include a gesture input (e.g., a swipe from the corner to a middle of the interface). The visual search interface may be an overlay interface implemented at the operating system level of the computing device.

Display data descriptive of the content item in a first application 402 can be generated and processed based on the visual search interface being opened. An input screen 406 can then be provided for display to indicate to the user that the visual search interface is being provided. The input screen 406 can include a filter (e.g., a pixy dust filter) over the display data, input instructions 408 for how to provide an input, query suggestions 410 based on the preliminary processing of the display data, and/or a query input box 412.

The filter can include tinting of the displayed content. The input instructions 408 may include text, an icon, and/or an animation that instructs a user how to select portions of the display content for search. For example, a user interface element can indicate that a circling gesture can be utilized to select objects and/or display regions. The query suggestions 410 can include query suggestions determined based on processing an entirety of the display data (e.g., an entire screenshot of the displayed content). Alternatively and/or additionally, the query suggestions 410 may be determined based on on-device object detection, on-device object segmentation, on-device optical character recognition, on-device classification, context data processing, and/or other processing techniques. The query suggestions 410 may be provided on a scrollable carousel and may be selectable to perform the search. In some implementations, a language model may be utilized to generate natural language query suggestions. The query input box 412 can be configured to receive text inputs, image inputs, audio inputs, video inputs, and/or other inputs to then be processed to perform a search locally and/or on the web.

Figure 4B:
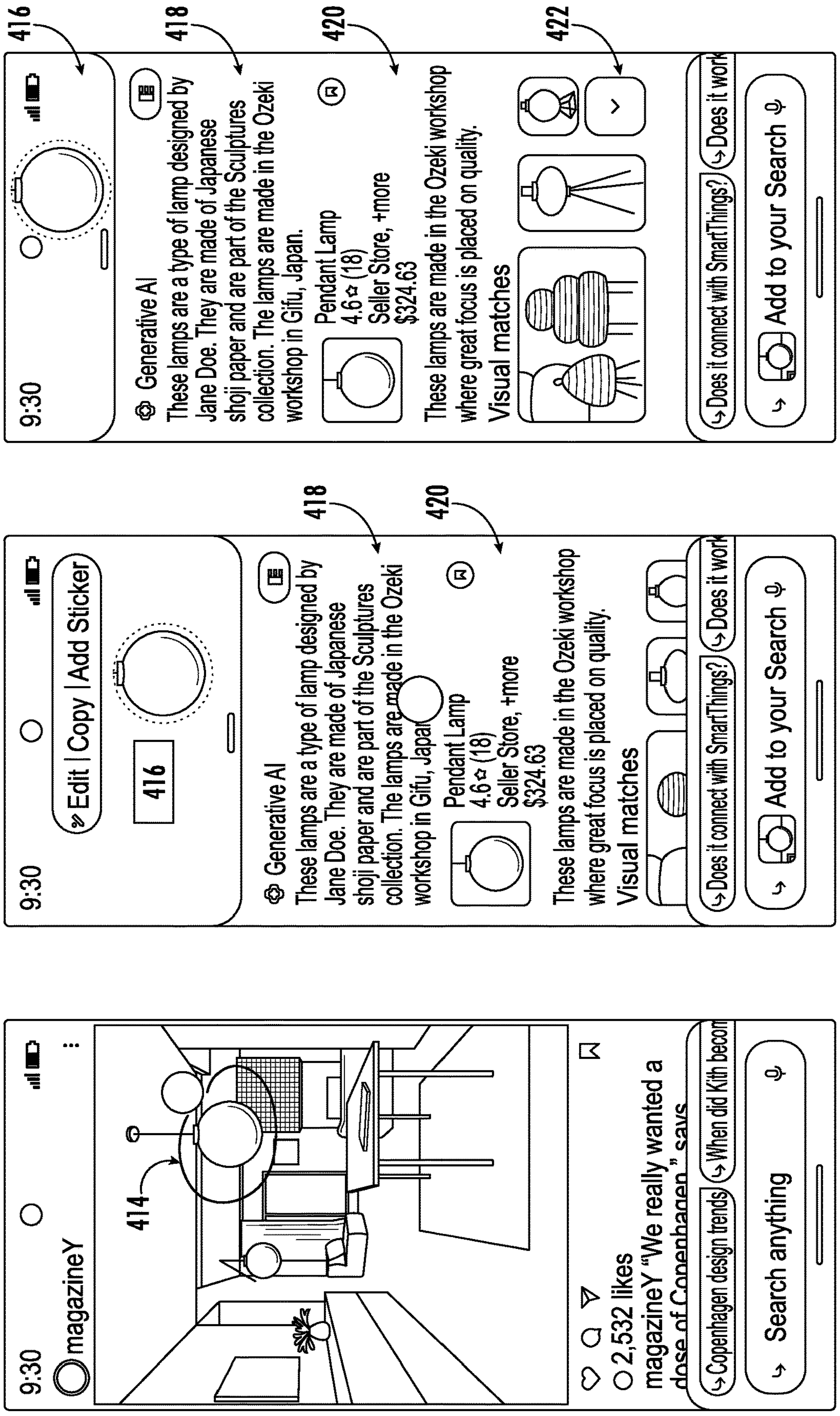

FIG. 4B depicts an illustration of object selection and processing within the visual search interface. For example, a circling gesture 414 can be received that selects a particular object depicted in the displayed content. The visual search interface may process a region associated with the gesture to determine an object and/or a set of objects selected by the circling gesture 414. The visual search interface can process the region with one or more on-device machine-learned models (e.g., an object detection model and a segmentation model) to identify an outline of the object. A graphical indicator 416 of the object and its respective outlines can be provided for display.

Pixels descriptive of the object may be segmented and searched. In some implementations, the image segment can be processed with a generative model (e.g., a vision language model and/or a large language model) to generate a model-generated response 418 to the query. The model-generated response 418 can include a natural language response that summarizes one or more web resources determined to be associated with the segmented object. Additionally and/or alternatively, the segmented image can be processed to determine one or more visual search results 420. The one or more visual search results 420 may be determined based on classification label matching, embedding search, feature matching, clustering, and/or image matching. The one or more visual search results 420 may include product listings, articles, and/or other web resources. The one or more visual search results 420 may be provided with visual matches 422 that include images that depict objects that match the segmented object. The search results interface can include search results of a plurality of different types and may be displayed in a plurality of different formats in a plurality of different panels.

In some implementations, follow-up query suggestions may be determined and provided for display in a suggestion panel adjacent to the query input box 412.

Figure 4C:
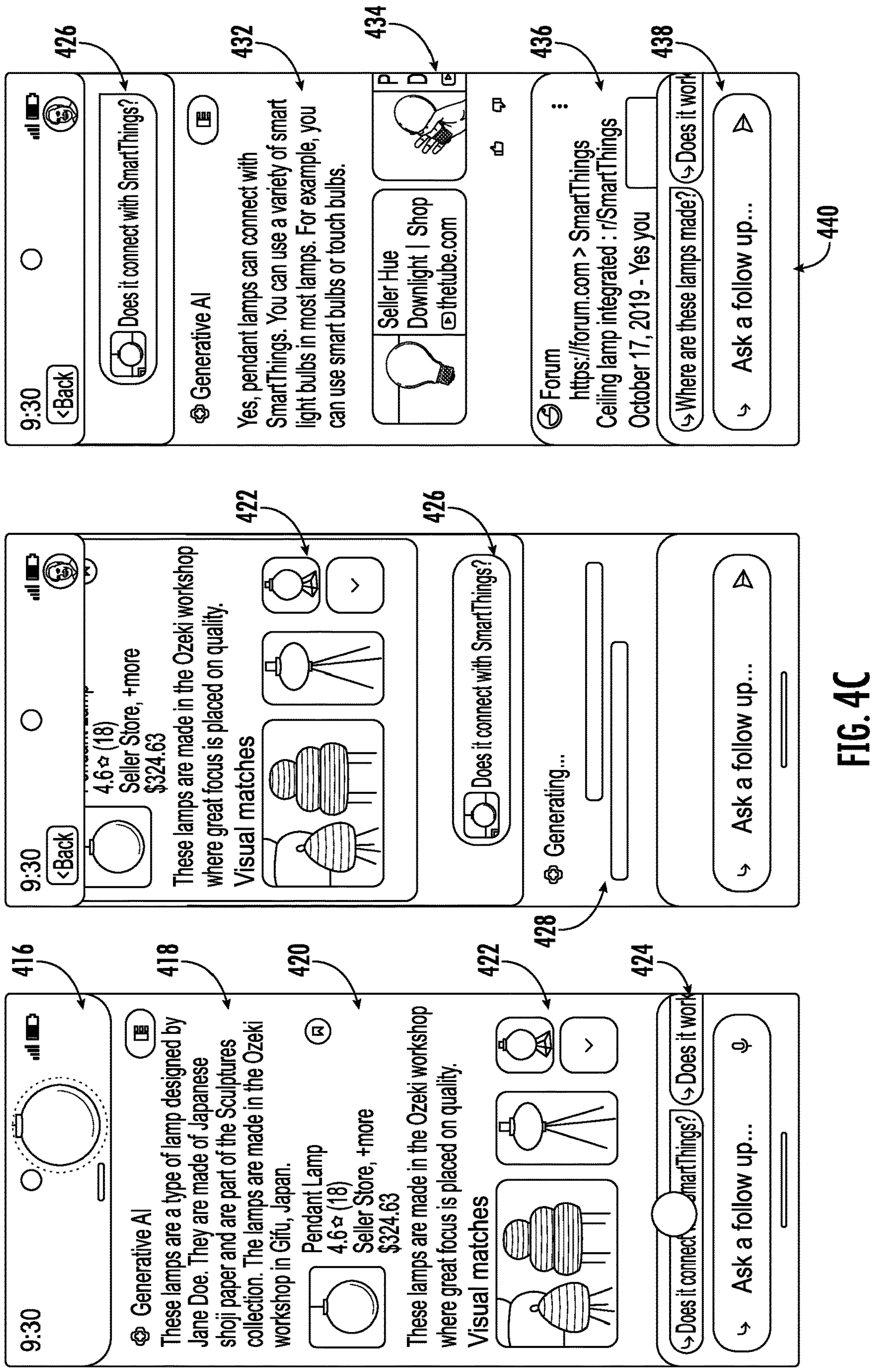
Figure 4D:
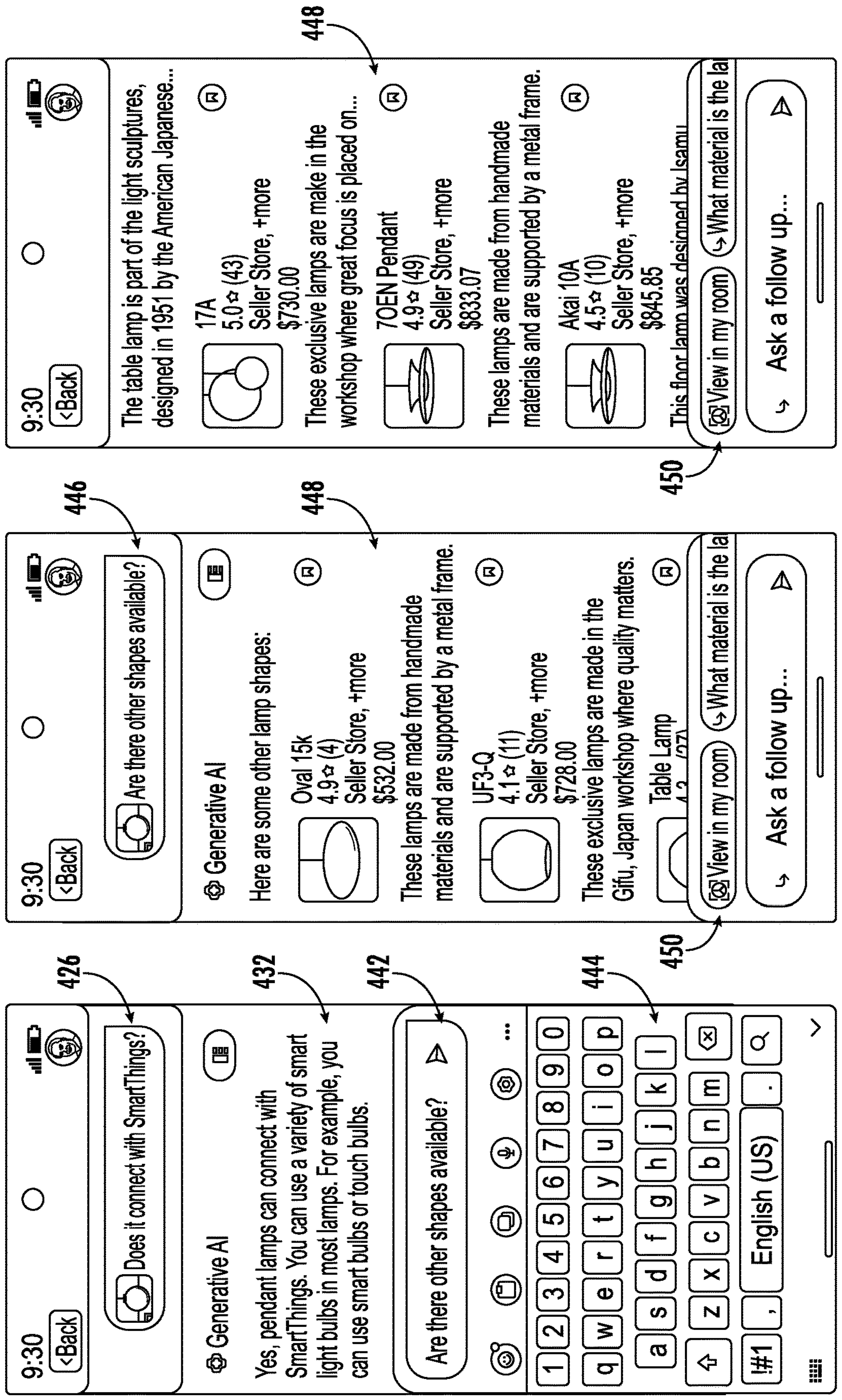

FIG. 4C depicts an illustration of an example follow-up search in the visual search interface. For example, a follow-up query suggestion 424 can be selected and processed. The processed follow-up query 426 can be provided for display as the follow-up visual search results are determined 428 and provided for display. The follow-up visual search results can include a model-generated response 432 to the processed follow-up query 426. The model-generated response 432 can include a natural language response generated with a generative model (e.g., a large language model). The model-generated response 432 may be generated based on and/or provided with one or more follow-up visual search results 434 that are responsive to the processed follow-up query 426. In some implementations, additional follow-up search results 436 can be determined and provided for display.

The query suggestions 438 can be once again updated to reflect further follow-up predictions. The query suggestions 438 can be provided with a follow-up input box 440.

FIG. 4C depicts an illustration of text input retrieval and processing with the visual search interface. For example, a graphical keyboard interface 444 can be utilized to receive a follow-up text input 442 (e.g., "Are there other shapes available?"). The input can be obtained and provided as an updated query 446, which can include the text of the input and a thumbnail depicting the image segment. The updated query 446 can be processed to determine a plurality of updated search results 448. The plurality of updated search results 448 may be formatted by processing the web resource search results with a generative model to include natural language sentences, uniform structure and style, and/or model-determined user interface elements.

In some implementations, the visual search interface may include an action suggestion and one or more query suggestions in a suggestion panel. The action suggestion can be determined and provided based on the plurality of updated search results 448. The action suggestion can include utilizing an augmented-reality experience to view one or more products in a user environment. The one or more products can be associated with a search result. The action suggestion may include interfacing with and/or navigating to another application on the computing device.

Figure 5A:
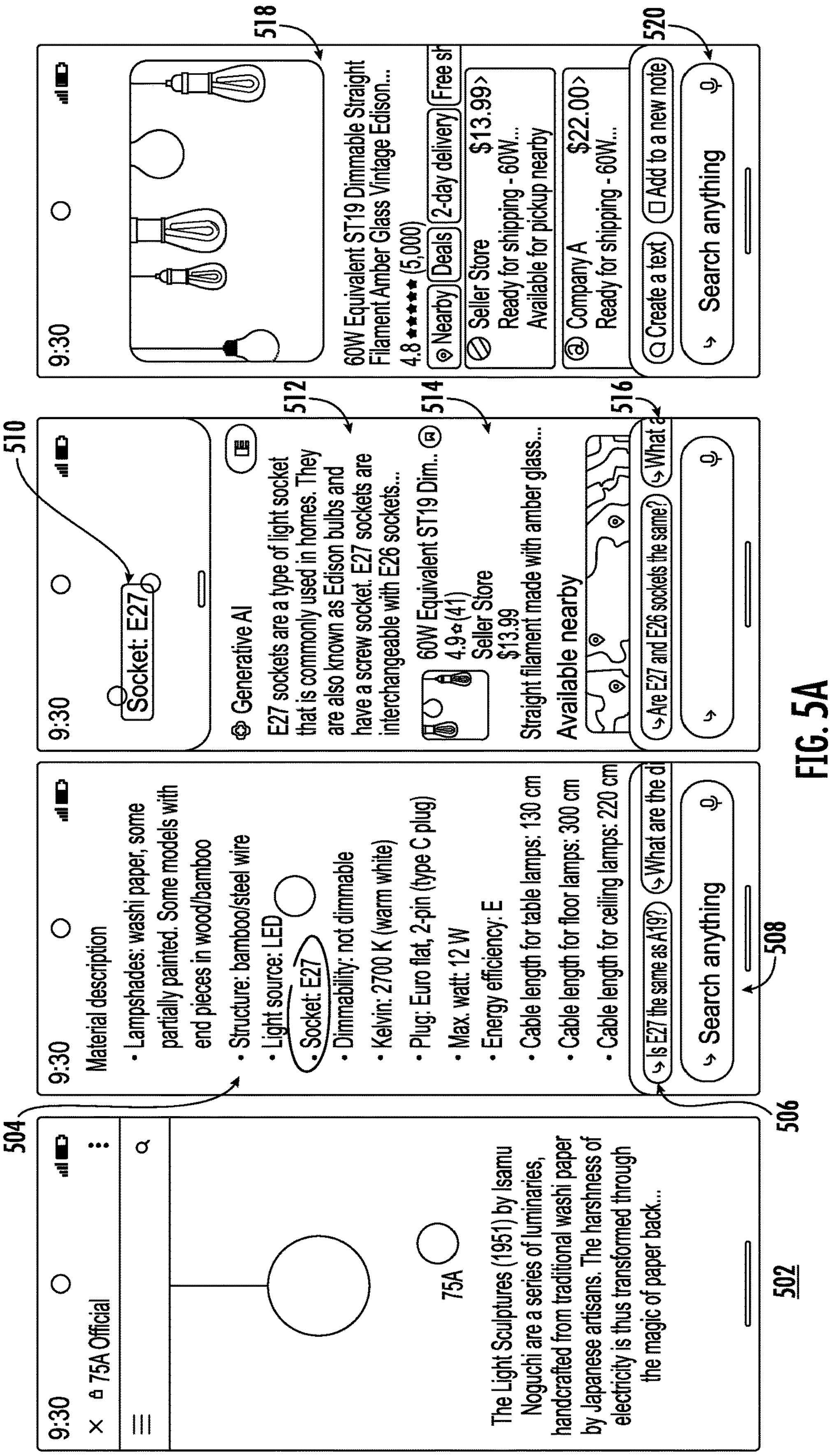
FIGS. 5A-5D depict illustrations of an example data transmittal interface according to example embodiments of the present disclosure.

FIGS. 5A-5D depict illustrations of an example data transmittal interface according to example embodiments of the present disclosure. FIG. 5A depicts an illustration of display data generation and processing with the overlay visual search interface.

For example, a user may be viewing a web page 502 in a browser application. The user may provide an input to utilize the visual search interface. A gesture input 504 can then be obtained by the visual search interface, which can select a portion of the text in the web page 502. The input screen can be provided with a plurality of preliminary query suggestions 506 that can be determined by performing optical character recognition on the web page, parsing the text, and predicting candidate queries a user may request. Additionally and/or alternatively, the input screen can include a query input box 508 for receiving text and/or other inputs from the user to be processed with the display data.

The selected text 510 can be indicated via one or more user interface elements (e.g., highlighting, selective filters, etc.). The selected text 510 can be processed to determine one or more search results 514. The selected text 510 and/or the one or more search results 514 can be processed with a generative model to generate model-generated response 512 to the query. The model-generated response 512 may be a summarization of at least a portion of the one or more search results 514. The search results interface may include a plurality of different search result types (e.g., model-generated responses, web search results, map search results, etc.). The search results interface may be provided with a plurality of updated query suggestions 516.

A search result may be selected to view a web page 518 associated with the search result. The web page 518 may be provided for display with a plurality of application suggestions 520. The plurality of application suggestions 520 may be determined based on processing the web page 518, the selected text 510, and/or the contents of the search results interface to determine predicted actions associated with the processed data. For example, a topic, entity, and/or task may be determined to be associated with the processed data. One or more actions can be determined to be associated with the topic, entity, and/or task. Applications associated with the actions can be determined to be on the device. The plurality of application suggestions 520 can then be determined and provided with an application icon and an action suggestion.

Figure 5B:
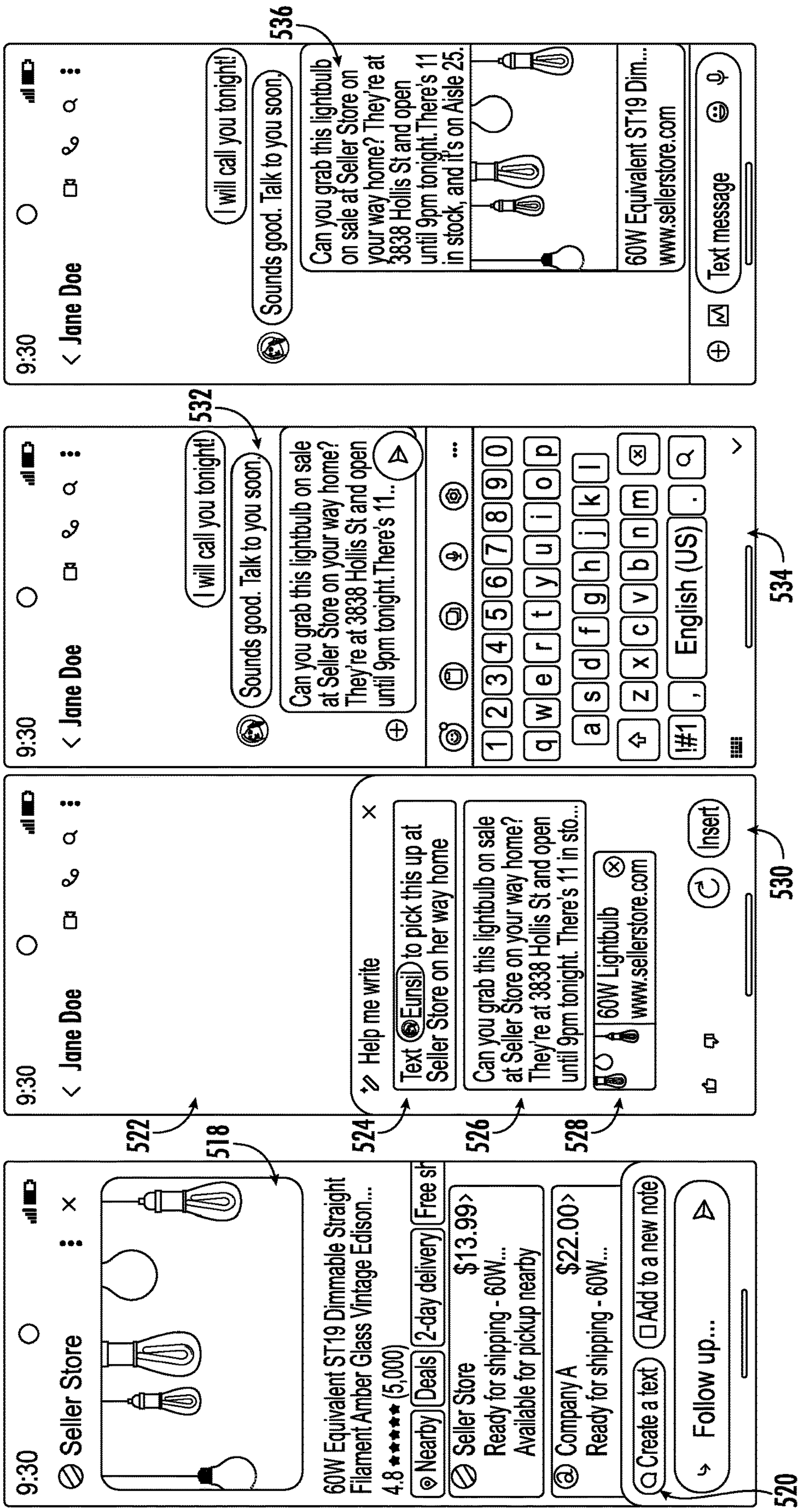

FIG. 5B depicts an illustration of an example application data push with the visual search interface. For example, a create-a-text suggestion can be selected. The create-a-text suggestion can be a particular application suggestion of the plurality of application suggestions 520. A text message application of the computing device can then be opened. The text composing interface can include a sent and received messages viewing panel 522. An overlay interface 524 can be provided to aid with composing a message. The overlay interface 524 can depict a model-generated prompt (and/or a user input prompt) that can be processed to generate a model-generated message 526. The model-generated prompt may be generated based on the visual search data and/or the selection of the particular application suggestion. The model-generated message 526 can be sent with a data packet 528 with the web page 518.

An "insert" user interface element 530 may be selected to insert the model-generated message 526 and the data packet 528 to text message application (e.g., inserted into an input text box 532 of the messaging application), which may be supplemented via inputs to a graphical keyboard interface 534. The model-generated message 526 and data packet 528 can then be sent as a text 536 to a second user.

Figure 5C:
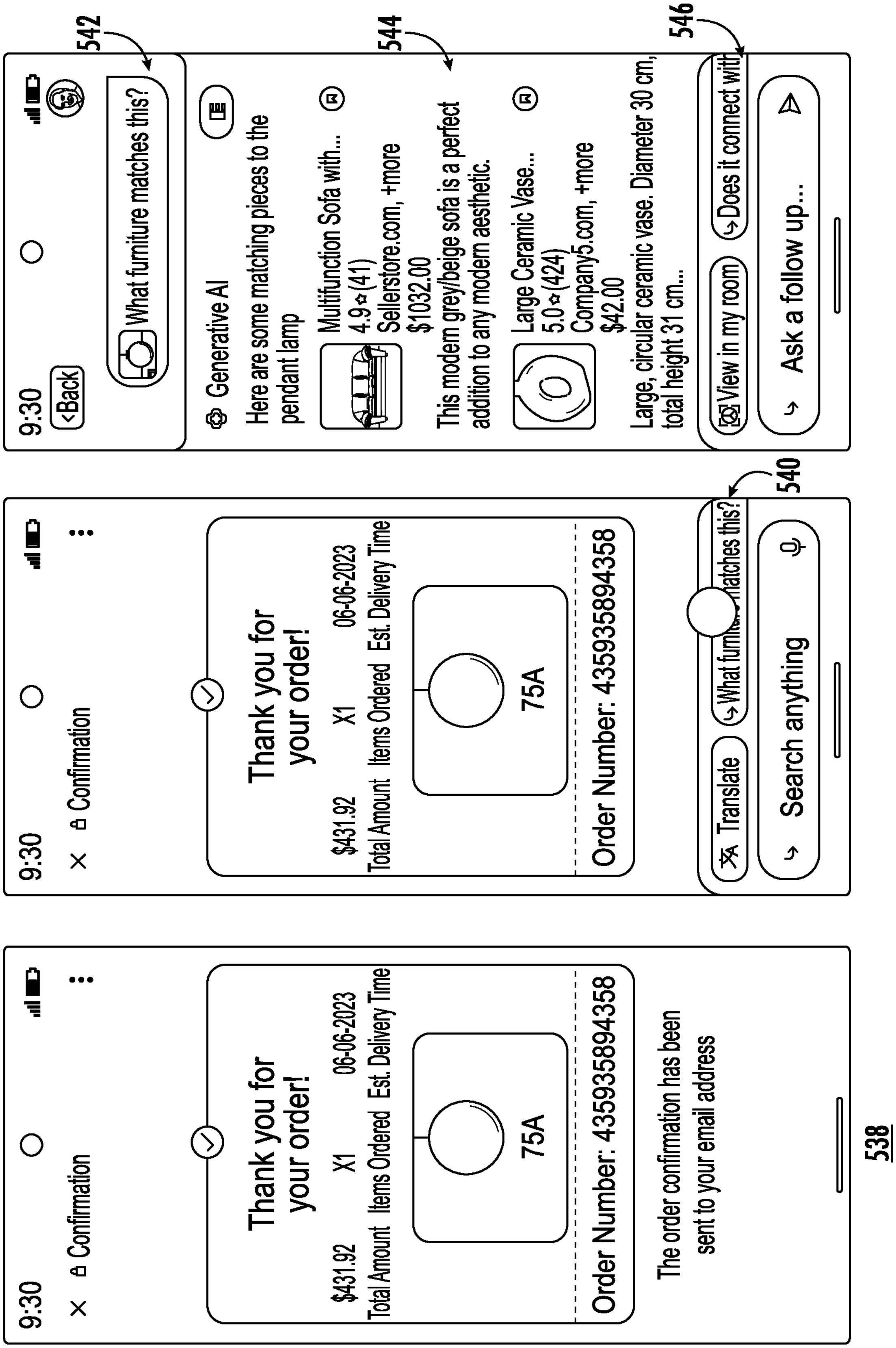

FIG. 5C depicts an illustration of an example visual search of an order confirmation page 538. The order confirmation page 538 may be processed to determine an action suggestion and one or more query suggestions 540. A particular query suggestion (e.g., "What furniture matches this?") of the one or more query suggestions 540 may be selected. The selected query suggestion and a screenshot of the order confirmation page 538 can be utilized as a multimodal query 542. The multimodal query 542 may be processed with a search engine and/or one or more machine-learned models. A plurality of search results 544 may be determined based on the multimodal query 542, In some implementations, the plurality of search results 544 may be formatted and/or augmented based on processing the web resource data with a generative model. The plurality of search results 544 can be associated with furniture that matches the color, style, and/or aesthetic of the recently ordered lamp. In some implementations, the plurality of search results 544 may be formatted such that only one furniture item from a particular class may be provided for each class. The search result products may be filtered and/or determined based on user location, user budget, user preferences, and/or other context data.

The plurality of search results 544 can be provided for display with a suggestion carousel 546 that includes an application suggestion and one or more updated query suggestions. The application suggestion and the one or more updated query suggestions may be determined based on the plurality of search results 544. The application suggestion may be selectable to navigate to an augmented-reality application that can be utilized to render one or more of the search result products into a user environment.

Figure 5D:
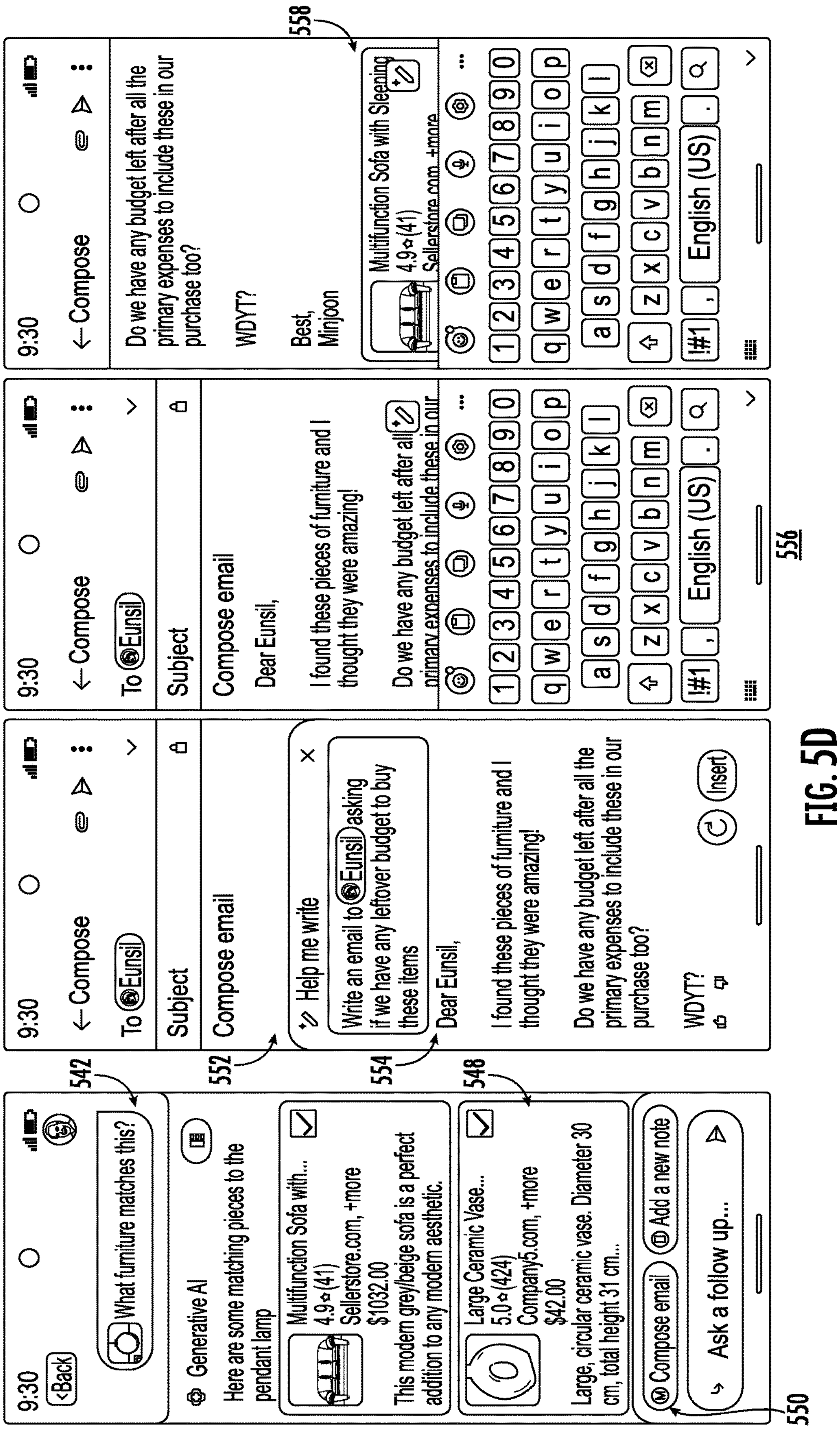

FIG. 5D depicts an illustration of an example data transmission to an application on the computing device. For example, a subset 548 of the plurality of search results 544 may be selected. Based on the selected subset 548, the suggestion panel 550 may be updated to include a plurality of different application suggestions. An email application suggestion may be selected, which can cause an email application 552 to be opened with an overlay message composing interface. A prompt may be generated based on the selected subset 548 and/or based on one or more user inputs. The prompt can be processed to generate a model-generated message 554, which can then be added to a draft email message 556 in the email application 552. The draft email message 556 can be sent with a data packet 558 descriptive of the selected subset 548. The data packet 558 may include a model-generated content item that includes details associated with the selected subset 548.

Figure 6B:
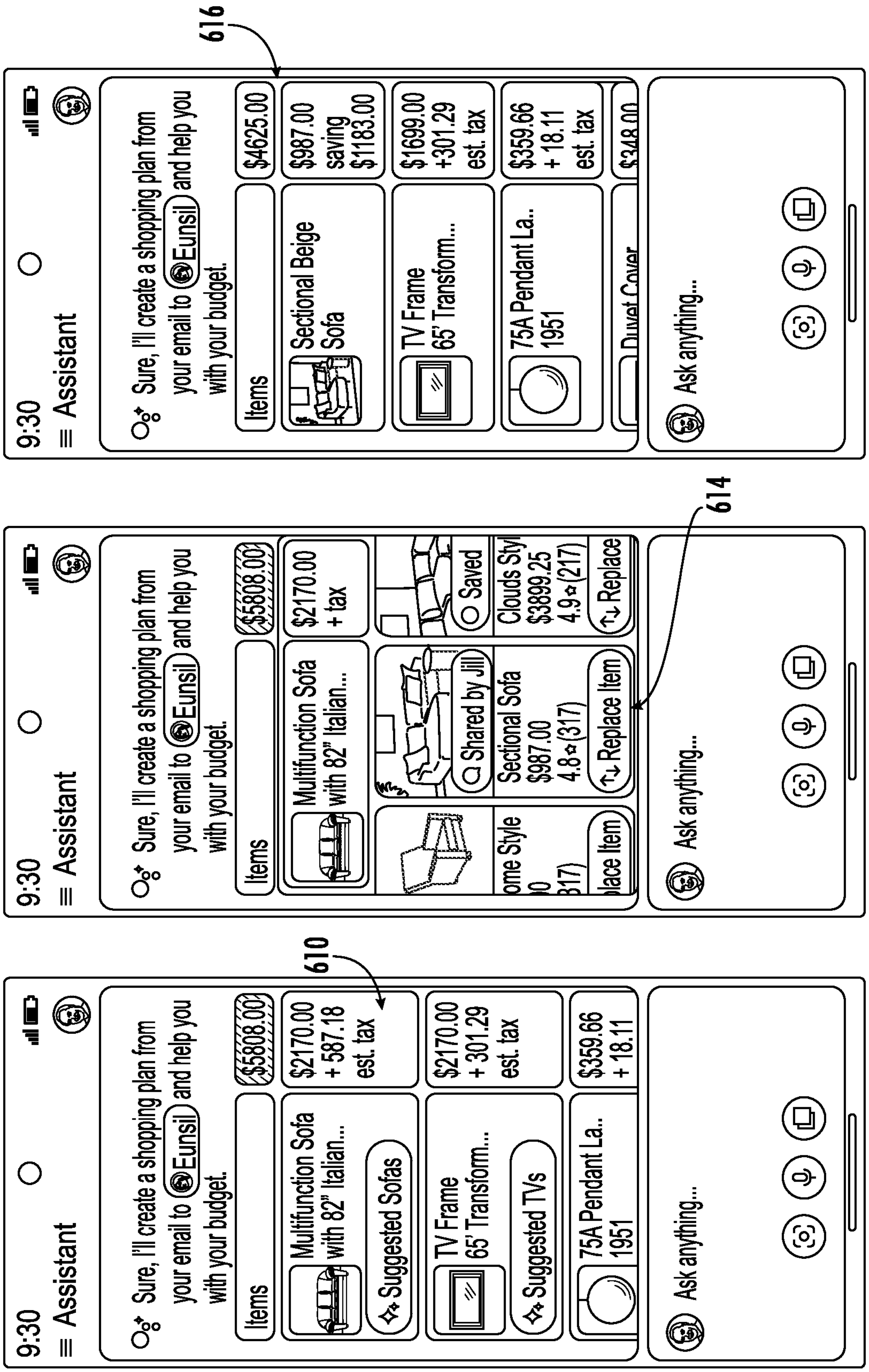

FIGS. 6A-6E depict illustrations of an example data call interface according to example embodiments of the present disclosure. FIG. 6A depicts an illustration of prompt generation and processing.

For example, a data call interface 602 can be opened and provided for display. The data call interface 602 can be part of a visual search interface that is implemented via an operating system of a computing device. A graphical keyboard interface 606 can be utilized to obtain inputs from a user to generate (or compose) the prompt 604. The prompt 604 can include a request for information from one or more particular applications. The prompt can be processed to determine the particular application. The particular application can then be accessed 608 and searched based on an application call generated based on the prompt 604. A status response may be provided as data is obtained from the one or more particular applications.

A plurality of content items can be obtained from the one or more particular applications based on the prompt 604. The plurality of content items can be processed with a machine-learned model to generate a structured output 610 that provides information from the plurality of content items in an organized format. A freeform input box 612 may be provided to obtain follow-up inputs to augment, supplement, and/or perform actions based on the structured output 610 (e.g., perform a search based on the structured output 610).

FIG. 6B depicts an illustration of structured output augmentation. The user may be budget conscious, and the structured output 610 may indicate that a current model-generated wish list is above budget. A user may select a particular item on the wish list to replace to (a) meet a budget and/or (b) replace the item with a different product based on one or more user preferences. The system can process a selection of a "suggest sofas" option to determine products of the particular product type that match a style, aesthetic, price range, and/or other preferences for the user. A plurality of product alternatives can then be provided for display in a carousel interface 614 for a user to view and select to augment the structured output. The plurality of product alternatives may be obtained from one or more applications and/or from the web. A particular alternative may be selected by the user and may be processed to generate an augmented structured output 616 that updates at least a portion of the structured output 610.

Figure 6C:
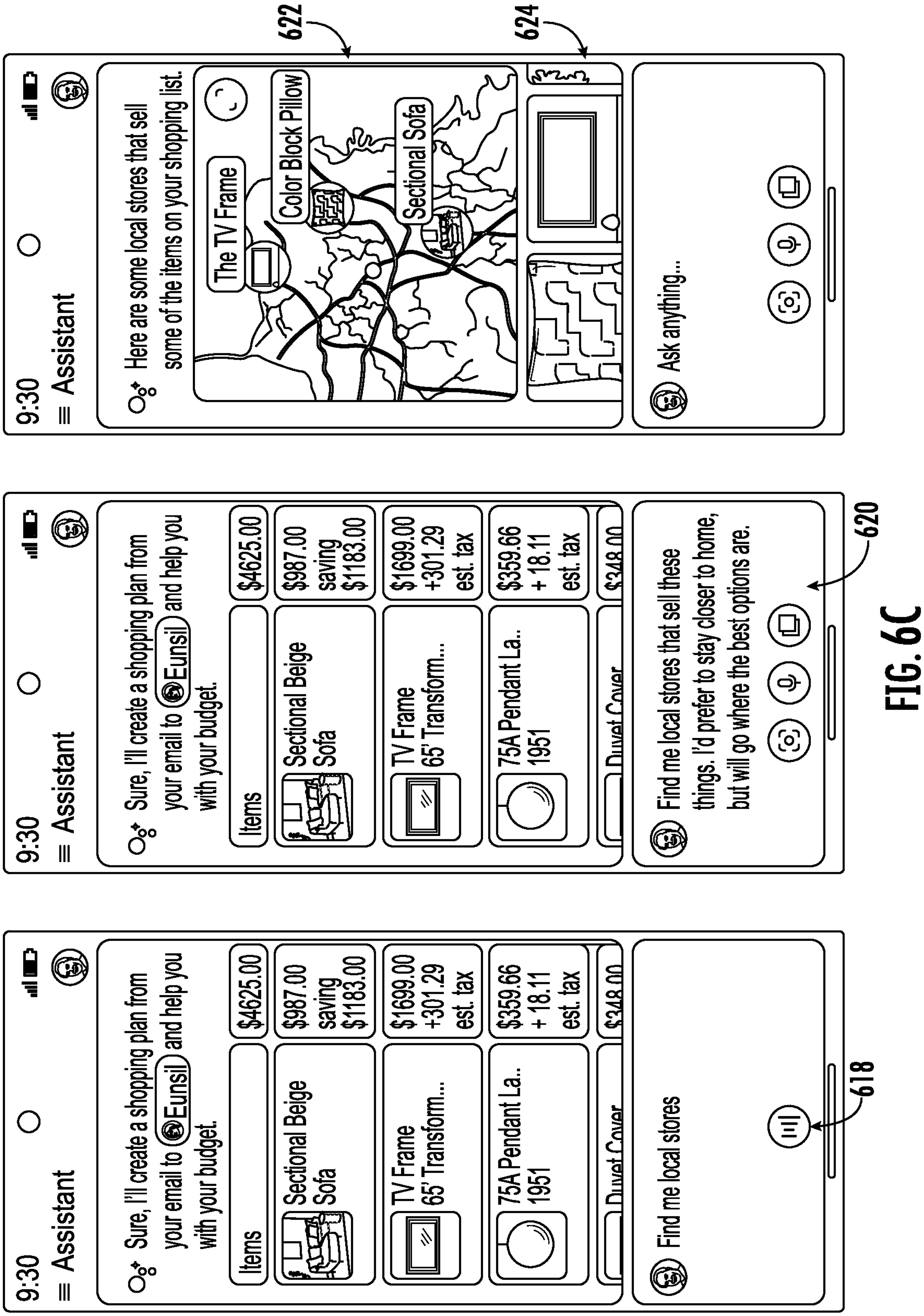

FIG. 6C depicts an illustration of follow-up prompt generation and processing. The user may provide a voice command input 618 that may be transcribed to generate a second prompt 620. The second prompt 620 and the augmented structured output 616 can be processed to generate a graphical representation 622. The graphical representation 622 can include a map graphic with one or more indicators of locations that carry one or more products from the augmented structured output 616. Additionally and/or alternatively, images 624 and/or other content items can be provided for display with the graphical representation 622.

Figure 6D:
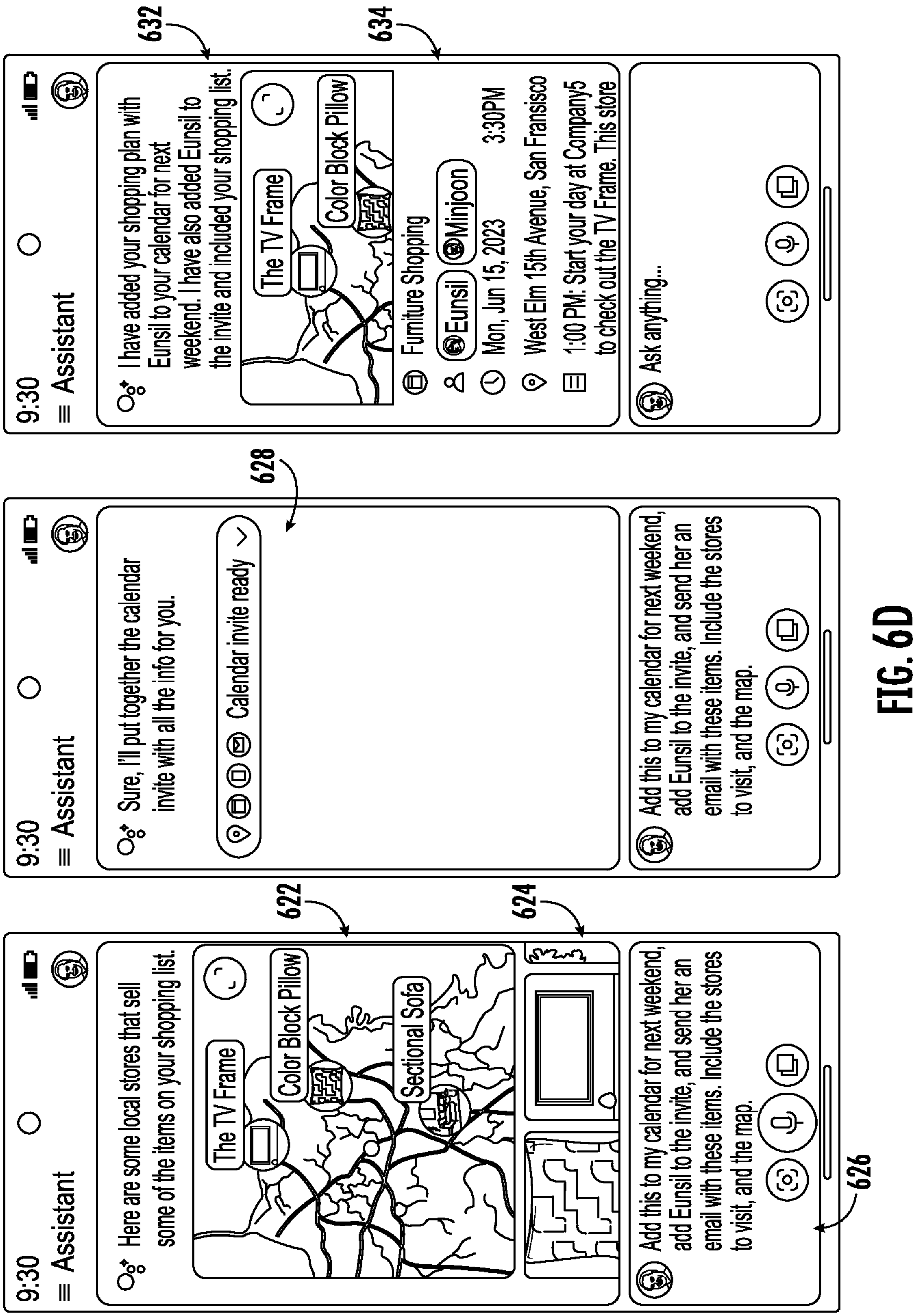

FIG. 6D depicts an illustration of calendar invite generation. For example, a user can provide a third prompt 626 that can be processed 628 by the system to generate a calendar invite 634. The calendar invite 634 can include information associated with the third prompt 626 and the graphical representation 622. The calendar invite 634 can be displayed with a model-generated natural language response 632 to the third prompt 626. The calendar invite 634 can include a title, the graphical representation 622 with a suggested route, a date, one or more locations, and/or a proposed itinerary 636.

Figure 6E:
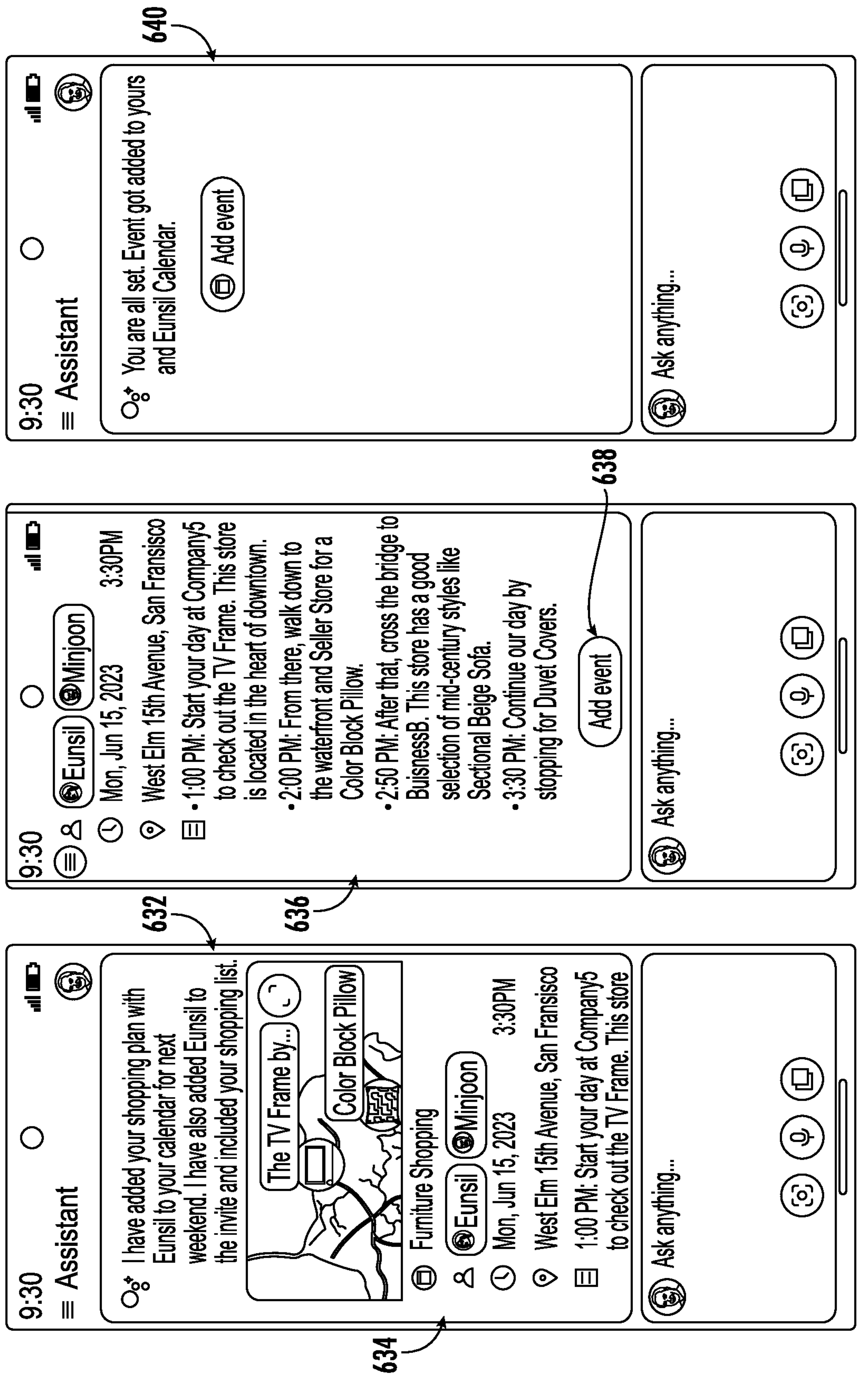

FIG. 6E depicts an illustration of the calendar invite transmission to a calendar application. The calendar invite 634 may include an option to add the event 638 to a calendar. The calendar invite 634 may then be added and can then be viewed 640 in the calendar application on the device.

Figure 7A:
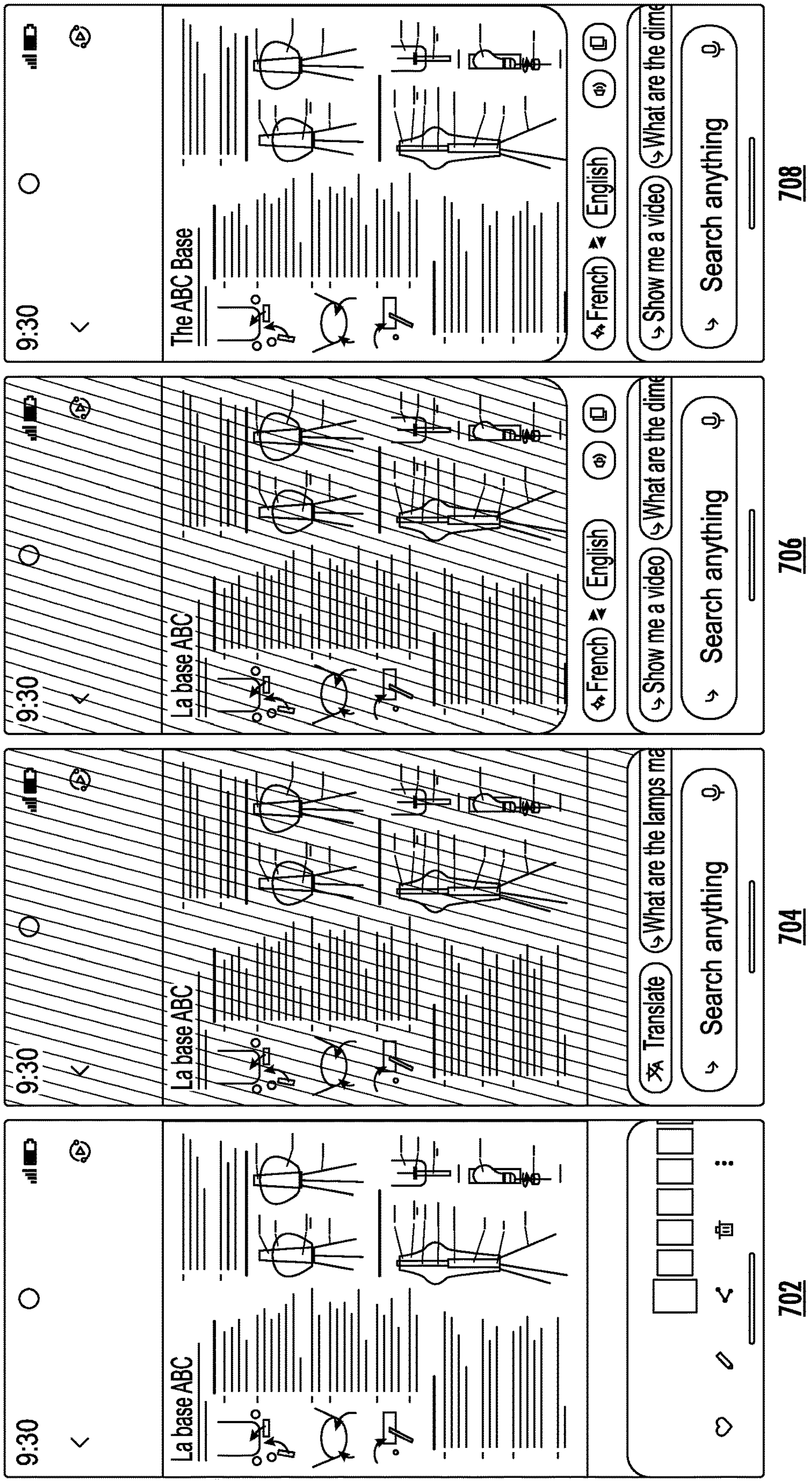
FIGS. 7A-7B depict illustrations of an example on-device display data processing interface according to example embodiments of the present disclosure.
Figure 7B:
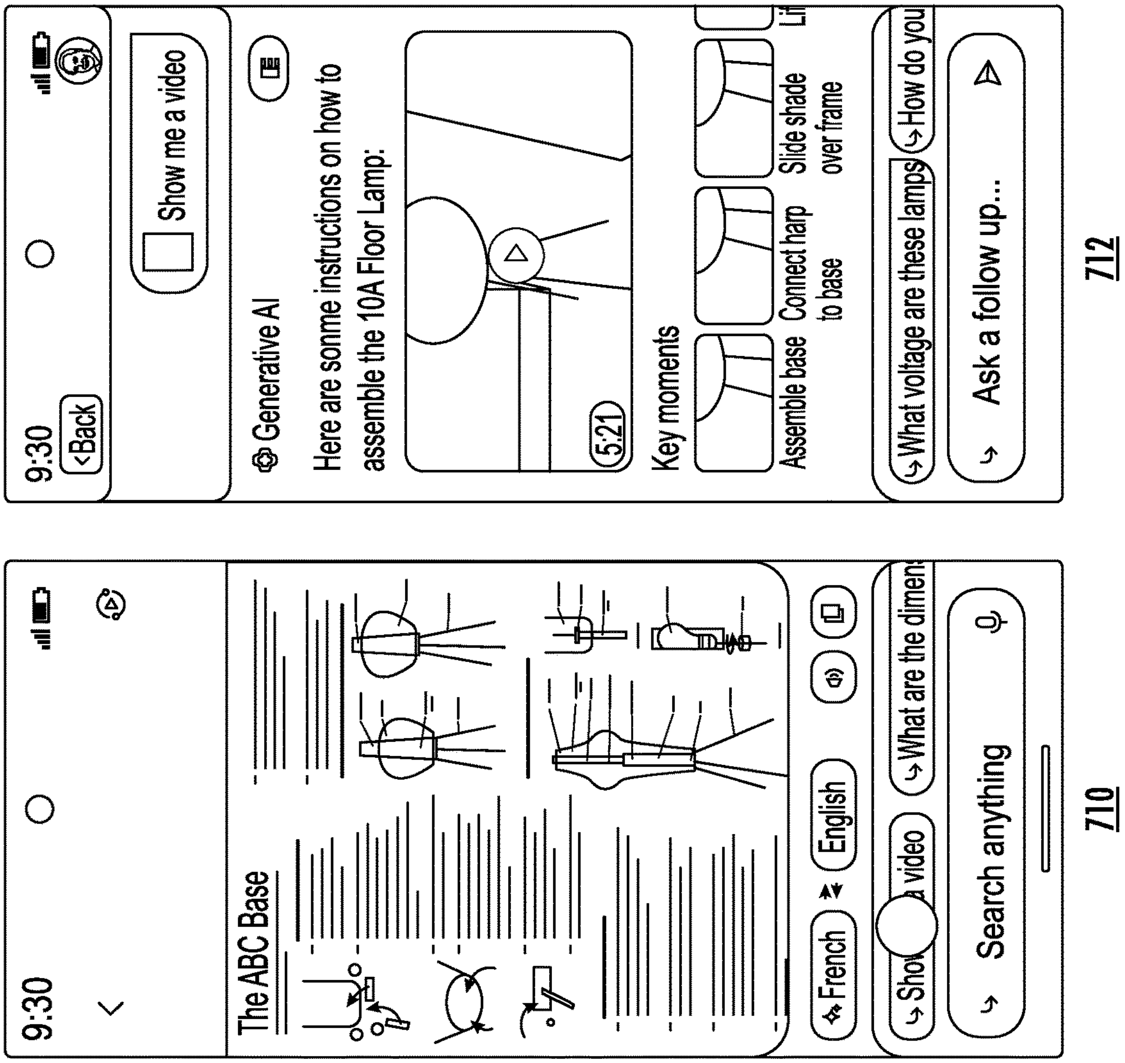

FIGS. 7A-7B depict illustrations of an example on-device display data processing interface according to example embodiments of the present disclosure. For example, FIG. 7A depicts an illustration of the overlay interface being opened and utilized to process a displayed document 702. The displayed document 702 can include a manual for a product, a textbook, and/or another content item. A user may provide an input to open an overlay interface, which can open an input screen 704. The input screen 704 can include a filter over the display data, one or more action suggestions, one or more query suggestions, and a query input box.

A user may select an action suggestion to open an action interface (e.g., a translation interface 706). The action interface can be interacted with to perform one or more processing techniques, which can include translation, object detection, optical character recognition, data augmentation, object segmentation, classification, annotation, parsing, and/or other data processing techniques.

For a translation interface 706, language options can be provided. In some implementations, the languages may be automatically determined based on determining the language of the displayed document 702 and determining a native language of the user (e.g., based on user preferences and/or settings). The translation interface 706 may include a text-to-speech option, a copy option, one or more query suggestions, and/or a query input box.

The translation can be performed based on the user inputs to generate a translated document 708 in the desired language. Alternatively and/or additionally, other document augmentations can be performed (e.g., format adjustments). The translation may be performed with one or more translation models, which may be stored on-device.

FIG. 7B depicts an illustration of a query suggestion for the translated document being selected (e.g., at 710 a selection is obtained). The query suggestion can be processed with the translated document 708 to determine visual search results 712 that are responsive to the multimodal query. The visual search results 712 can include a model-generated response that summarizes one or more web resources responsive to the query. In some implementations, the visual search results 712 can include images, articles, videos, and/or other data. The visual search results 712 may be provided with updated query suggestions that include predicted follow-up queries.

The visual search interface in the operating system of the computing device can be utilized to perform application suggestions based on visual searches. For example, visual search data can be processed to predict actions that may be of interest to the user based on the visual search data. The action predictions can be based on user-specific data, entity-action correlation, global historical data, and/or other data. The action predictions can be utilized to determine one or more applications on a computing device that can perform the actions. The visual search interface in the operating system can then provide options to navigate to and/or interface with the applications to perform the suggested actions.

Figure 8:
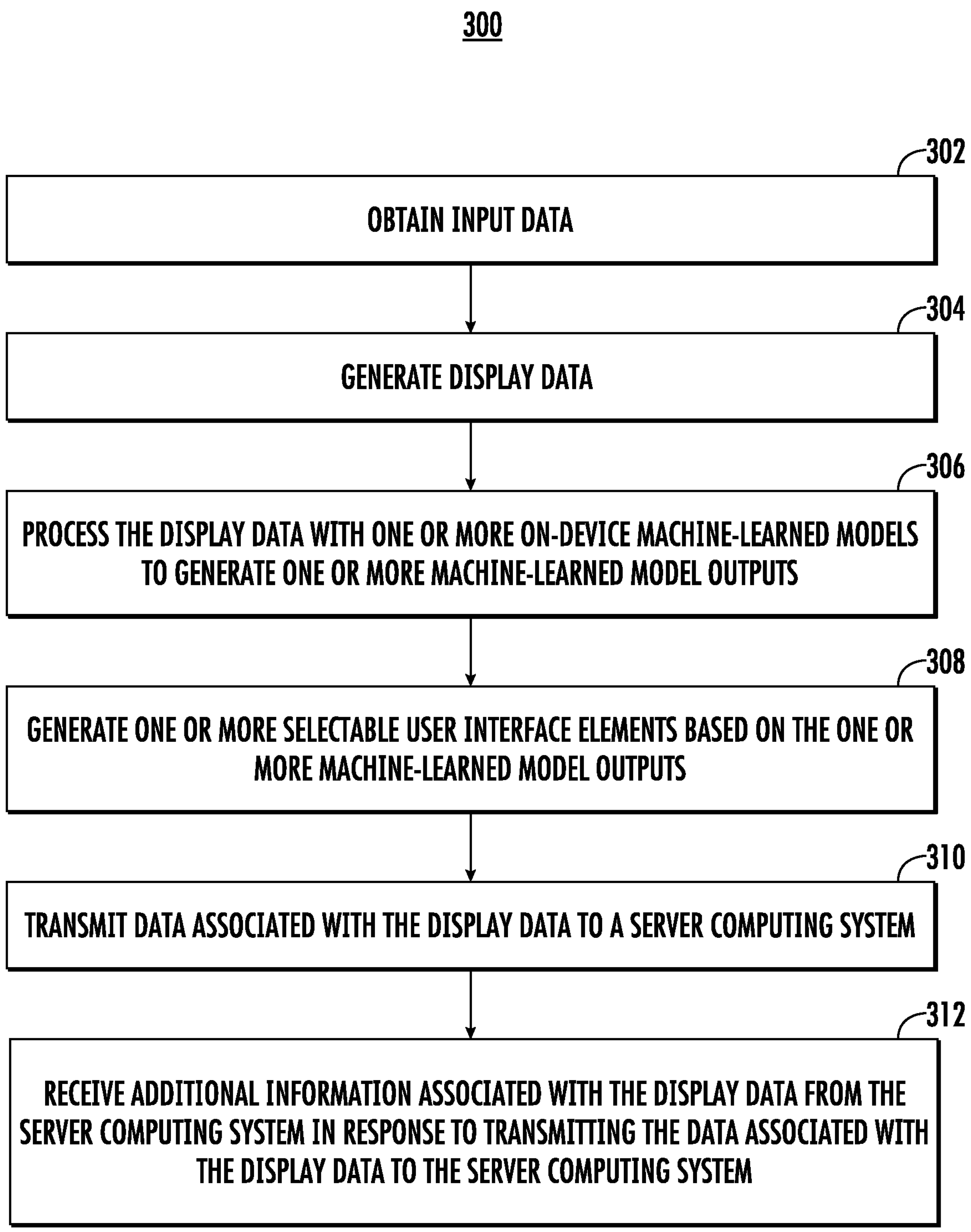
FIG. 8 depicts a flow chart diagram of an example method to perform display data processing according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain input data. The input data can be descriptive of a request to open an overlay visual search interface. The input data can be descriptive of a user selection and/or a user gesture. For example, a user may provide a diagonal pull gesture. The overlay visual search interface can be opened across a plurality of surfaces of the computing device, which can include a plurality of different applications. The overlay visual search interface can be provided regardless of the application and/or data being provided for display.

At 304, the computing system can generate display data. The display data can be descriptive of the content currently being provided for display by the user computing device. In some implementations, generating the display data can include generating a screenshot. The display data can be descriptive of a screenshot and/or a data packet associated with content rendered for display.

At 306, the computing system can process the display data with one or more on-device machine-learned models to generate one or more machine-learned model outputs. The one or more on-device machine-learned models can include an object detection model, an optical character recognition model, a segmentation model, a region-of-interest model, a suggestion model, and/or one or more classification models. The one or more machine-learned model outputs can include one or more bounding boxes, one or more text strings, one or more segmentation masks, one or more region-of-interest values and/or annotations, one or more suggestions (e.g., one or more query suggestions and/or one or more action suggestions), and/or one or more classifications (e.g., one or more object classifications, one or more image classifications, one or more entity classifications, and/or one or more other classifications).

In some implementations, the display data can be processed with an object detection model to generate a plurality of bounding boxes associated with a plurality of detected objects. The display data and/or the plurality of bounding boxes can then be processed with a segmentation model to generate a plurality of segmentation masks associated with the silhouettes for the plurality of detected objects. The plurality of segmentation masks can be utilized to generate user interface indicators that indicate what objects are detected along with outlines for the detected objects. In some implementations, the display data can be processed with one or more classification models to generate one or more object classifications for objects depicted in the displayed content. Additionally and/or alternatively, the display data can be processed with an optical character recognition model to generate text data descriptive of text in the displayed content. The display data and/or the text data may be processed to determine one or more entities associated with the text and/or the objects in the displayed content. One or more user interface elements can be generated and provided to provide an indication of the determined entities to the user.

In some implementations, the display data, segmented image data, the bounding boxes, the text data, the classification data, and/or metadata can be processed with a suggestion model to generate one or more suggestions. The one or more suggestions can include one or more query suggestions and/or one or more action suggestions. The one or more query suggestions can be descriptive of a query suggested based on detected features in the display data and may include a multimodal query including at least a portion of the display data and a generated text string. The one or more action suggestions can be associated with suggested processing tasks, which can include transmitting data to another application, platform, and/or computing system.

At 308, the computing system can generate one or more selectable user interface elements based on the one or more machine-learned model outputs. The selectable user interface elements can include a detected object annotation, a preliminary classification, a suggested query, and/or a suggested action.

At 310, the computing system can transmit data associated with the display data to a server computing system. The data associated with the display data can include at least a portion of the display data, a segmented portion of the displayed content, a display data embedding, one or more bounding boxes, a multimodal query including at least a portion of the display data and a generated text query, and/or the one or more machine-learned model outputs. The server computing system may include one or more search engines, one or more generative models (e.g., a large language model, an image-to-text model, a text-to-image model, a vision language model, and/or other generative models), one or more classification models, and/or one or more augmentation models. The server computing system may process the data associated with the display data to determine one or more search results, generate one or more model-generated media content items, and/or one or more server outputs.

In some implementations, the data associated with the display data can be associated with a user input that selects a particular selectable user interface element. For example, a portion of the display data can be segmented and transmitted to the server computing system based on a user input. Alternatively and/or additionally, a user input may select a query suggestion, and the query associated with the suggestion can be transmitted to the server computing system.

At 312, the computing system can receive additional information associated with the display data from the server computing system in response to transmitting the data associated with the display data to the server computing system. The additional information can include one or more search results, one or more model-generated outputs, an augmented-reality rendering, updated suggestions, object annotations, and/or other information. The additional information can then be provided to the user for display. In some implementations, the additional information may be provided for display with at least a portion of the displayed content.

Figure 9:
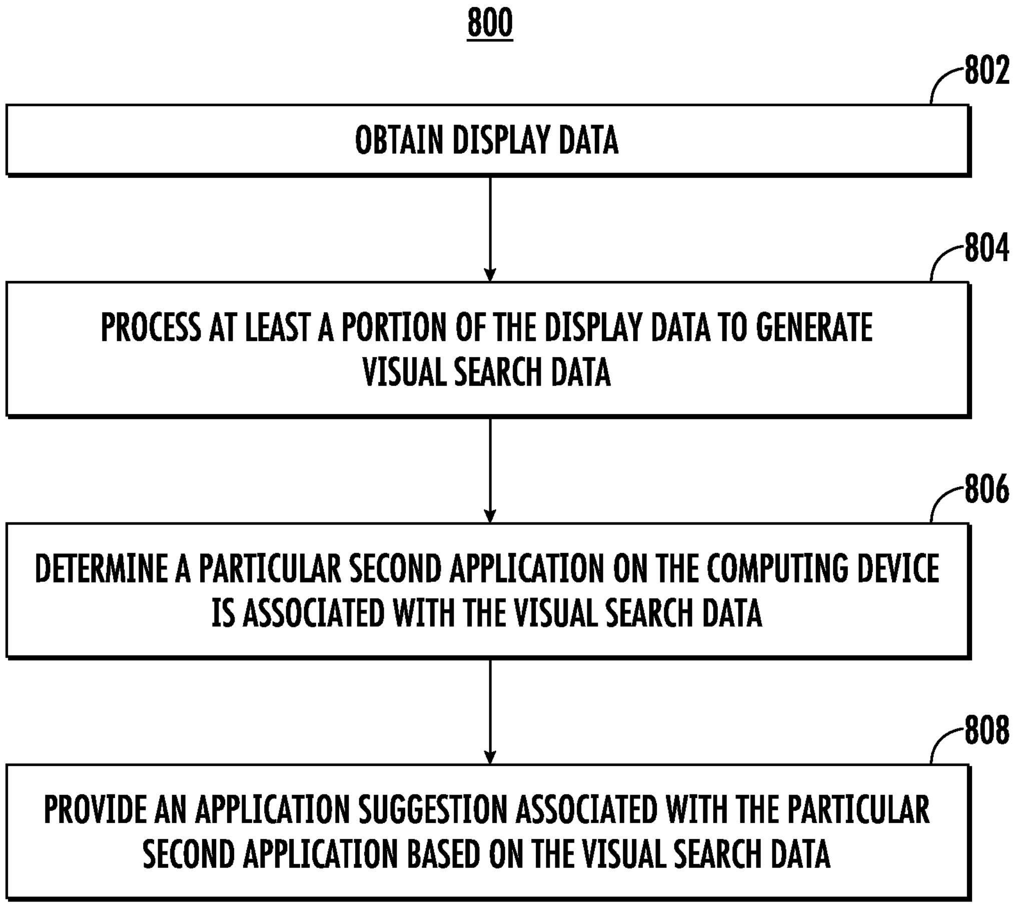
FIG. 9 depicts a flow chart diagram of an example method to perform a data push according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain display data. The display data can be descriptive of content currently presented for display in a first application on a user computing device. Obtaining the display data can include generating a screenshot. A screenshot can be descriptive of a plurality of pixels provided for display. In some implementations, the display data can be generated with a visual search application in the operating system. The visual search application can include an overlay application that is compatible to generate and process screenshots across a plurality of different applications on the user computing device. In some implementations, the display data can be obtained and processed based on a user input requesting a visual search overlay application. The display data can be descriptive of a plurality of pixels previously displayed before a visual search interface request was received. The display data can depict a first application interface with one or more content items (e.g., a social media interface with one or more social media posts in a social media application, an email interface with one or more messages in an email application, a news app interface with one or more news articles in a news application, etc.). The display data can include metadata associated with a context (e.g., time, an application currently provided for display, duration for display, and/or historical data). In some implementations, the display data can include one or more images, text data, audio data, one or more embeddings, latent representation data, and/or cryptographic data.

At 804, the computing system can process at least a portion of the display data to generate visual search data. The visual search data can include one or more visual search results. The one or more visual search results can be associated with detected features in the display data. The display data may be processed with one or more machine-learned models to generate one or more outputs associated with detected features. For example, the display data (e.g., one or more images of the display data) can be processed with an object detection model to generate one or more bounding boxes associated with the location of detected objects in the captured display. The one or more bounding boxes and the display data may be processed with a segmentation model to generate masks for each of the detected objects to segment the objects from the one or more images of the display data and/or generate detailed outlines of the objects that indicate object boundaries. In some implementations, the segmented objects may be processed with a search engine and/or one or more additional machine-learned models to generate the visual search data. The search engine may determine one or more visual search results based on detected features in the image segments, an embedding search (e.g., embedding neighbor determination), one or more object classifications, one or more image classifications, application classification, and/or multimodal search (e.g., search based on the image segment and text data (e.g., input text, metadata, text labels, etc.)). In some implementations, the display data can be processed with an optical character recognition model to identify text in the one or more images of the display data. The text can be utilized to condition the search.

In some implementations, the one or more visual search results can include reverse image search results. The one or more visual search results can be determined based on detected features. The one or more visual search results can include similar images to the one or more images of the display data, can include similar objects to detected objects in the display data, can include similar interfaces to detected user interface features in the display data, determined caption data, determined classifications, and/or other search result data. The visual search data may include an output of the one or more classification models, one or more augmentation models, and/or one or more generative vision language models. For example, the display data may be processed with a machine-learned vision language model to generate a predicted caption for the display data.

In some implementations, processing at least a portion of the display data to generate visual search data can include processing the display data with one or more on-device machine-learned models to generate a segmented portion of the display data. The segmented portion of the display data can include data descriptive of a set of features of the content presented for display. The computing system can transmit the segmented portion of the display data to a server computing system and receive visual search data from the server computing system. The visual search data can include one or more search results. The one or more search results can be associated with detected features in the segmented portion of the display data. The visual search data may include the one or more search results and a model-generated knowledge panel. In some implementations, the model-generated knowledge panel can include a summary of a topic associated with the segmented portion of the display data. The summary can be generated by processing web resource data with a language model. For example, one or more visual search results can be determined based on the segmented portion. Content items (e.g., articles, images, videos, audio, blogs, and/or social media posts) associated with the one or more visual search results can be processed with a generative language model (e.g., an autoregressive language model, which may include a large language model) to generate the summary in a natural language format. The one or more on-device machine-learned models can include an object detection model and a segmentation model stored on the user computing device.

Alternatively and/or additionally, processing the portion of the display data to generate the visual search data can include processing the display data with an object detection model to determine one or more objects are depicted in the display data and generating a segmented portion of the display data. The segmented portion can include the one or more objects. Processing the portion of the display data to generate the visual search data can include processing the segmented portion of the display data to generate the visual search data. The object detection model can generate one or more bounding boxes. The one or more bounding boxes can be descriptive of a location of the one or more objects within the content currently presented for display. In some implementations, generating the segmented portion of the display data can include processing the display data and the one or more bounding boxes with a segmentation model to generate the segmented portion of the display data. The object detection model and the segmentation model can be machine-learned models. The object detection model and the segmentation model may be stored on the user computing device. In some implementations, processing the portion of the display data to generate the visual search data can be performed on-device.

At 806, the computing system can determine a particular second application on the computing device is associated with the visual search data. For example, the computing system can process the visual search data with a machine-learned suggestion model to determine a second application is associated with the one or more visual search results. The second application can differ from the first application that depicted the content that was processed to generate the display data. The first application and second application can differ from the overlay application that performed the display data generation and processing. The machine-learned suggestion model can be trained to identify topics and/or entities associated with the visual search data. The identified entities and/or topics can then be leveraged to determine an action associated with the given entity and/or topic. The actions can include messaging another user, opening a map application, purchasing a product, viewing an augmented-reality and/or virtual-reality asset, adding to notes, adding to a gallery database, and/or other actions. Based on the determined action, an application on the device can be determined to be associated with the visual search data based on that action being able to be performed by the application. The machine-learned suggestion model may be trained to process visual search data, determine a topic and/or entity classification, and then determine whether the classification is associated with the one or more applications on the device. The machine-learned suggestion model may be trained to generate a natural language suggestion and/or a multimodal suggestion (e.g., an icon and text) that indicates the application and a proposed action. The application suggestion may include a data packet and/or a prompt that can be transmitted to the second application if the application suggestion is selected.

In some implementations, the computing system can determine a plurality of candidate second applications are associated with the visual search data and can provide a plurality of application suggestions for display in a suggestion panel. The suggestion panel can include the plurality of application suggestions and one or more query suggestions. The one or more query suggestions can be determined based on the display data and/or the one or more visual search results.

At 808, the computing system can provide an application suggestion associated with the particular second application based on the visual search data. The application suggestion can be provided with an icon indicator of the application and an action suggestion. The application suggestion can be provided for display with the one or more visual search results.

In some implementations, the computing system can receive a selection of the application suggestion and transmit data to the second application based on the selection. For example, the computing system can obtain a selection of the application suggestion to transmit at least a portion of the visual search data to the particular second application and generate a model-generated content item (e.g., a visual search summary, a content item summary, an image caption, an augmented image, a generated table, etc.) based on the selection of the application suggestion. The model-generated content item can be generated with a generative model (e.g., a generative language model, a generative image model, etc.) based on the portion of the visual search data. The computing system can provide the model-generated content item to the particular second application. In some implementations, the generative model can include a generative language model that generates a natural language output based on processing features of input data. The first application associated with content provided for display when the display data was generated and the particular second application can differ. The particular second application may include a messaging application, and the model-generated content item may include a model-composed message to a second user. The model-generated content item can be generated with a generative language model. Alternatively and/or additionally, the model-generated content item can include a model-generated list that organizes a plurality of user-selected visual search results. The model-generated list may be generated with a generative language model that organizes the plurality of user-selected visual search results and generates natural language outputs for each of the plurality of user-selected visual search results. Providing the model-generated content item to the particular second application can include transmitting the model-generated content item to the second application via an application programming interface.

In some implementations, obtaining the selection of the application suggestion to transmit at least the portion of the visual search data to the second application can include determining a plurality of application-transmission actions associated with the visual search data. The plurality of application-transmission actions can be associated with a plurality of candidate second applications to transmit data associated with the visual search data. Obtaining the selection of the application suggestion to transmit at least the portion of the visual search data to the second application can include providing a plurality of selectable options based on the plurality of application-transmission actions. The plurality of selectable options can be associated with the plurality of application-transmission actions. The plurality of selectable options can include the application suggestion. The plurality of application-transmission actions can include the particular second application. Additionally and/or alternatively, obtaining the selection of the application suggestion to transmit at least the portion of the visual search data to the second application can include receiving a selection of the application suggestion. The application suggestion can be associated with the particular second application.

In some implementations, generating the model-generated content item based on the selection of the option can include processing the visual search data and data associated with the particular second application to determine a suggested prompt, receiving input selecting the suggested prompt, and processing the suggested prompt and the visual search data with the generative model to generate the model-generated content item. The model-generated content item can then be transmitted to the second application.

Additionally and/or alternatively, the computing system can determine a plurality of application suggestions. For example, the computing system can process the visual search data to determine a plurality of candidate second applications that are associated with the one or more search results, obtain a selection of a particular application suggestion to transmit at least a portion of the visual search data to a particular second application of the plurality of candidate second applications, obtain a model-generated content item based on the selection of the particular application suggestion, and provide the model-generated content item to the particular second application. The model-generated content item may have been generated with a generative model based on the portion of the visual search data.

Figure 10:
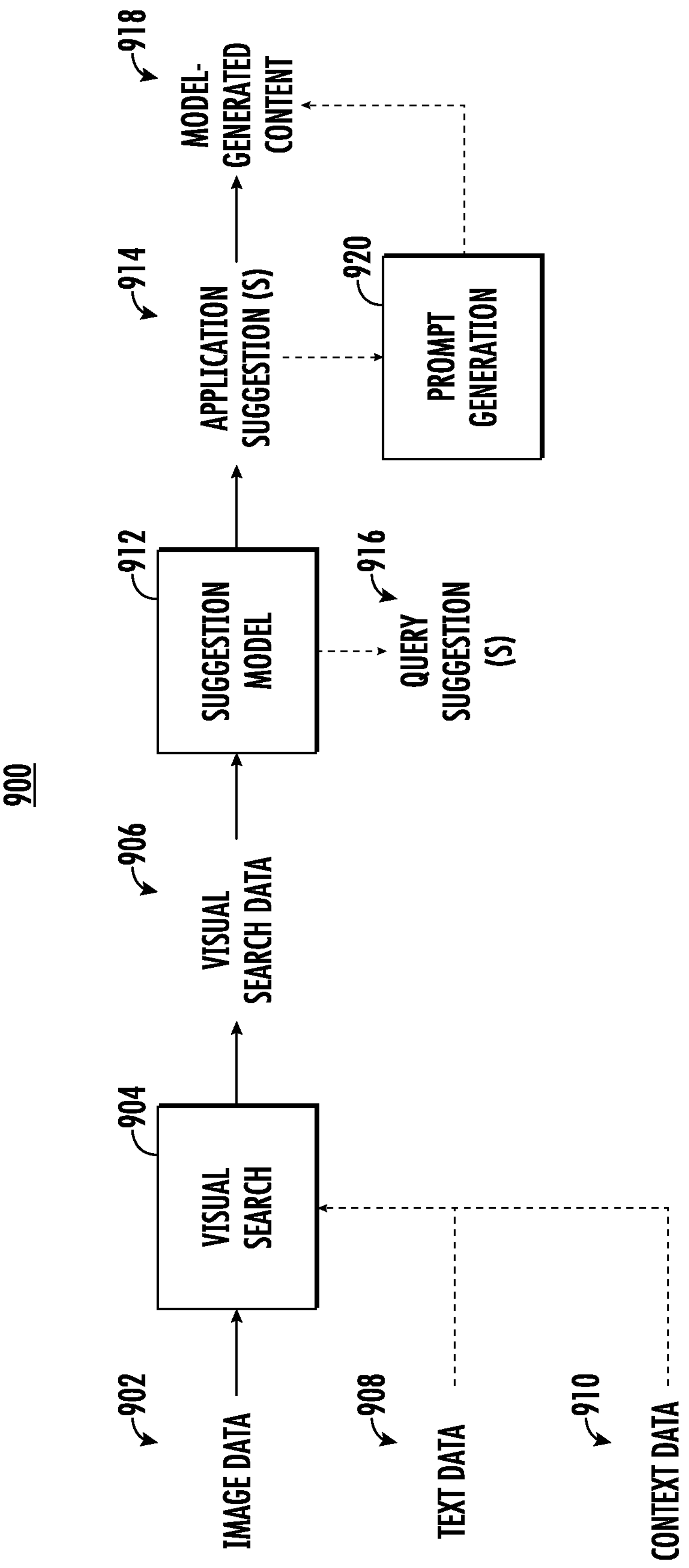
FIG. 10 depicts a block diagram of an example application suggestion system according to example embodiments of the present disclosure.

FIG. 10 depicts a block diagram of an example application suggestion system 900 according to example embodiments of the present disclosure. In particular, the application suggestion system 900 can process image data 902 to determine and/or generate visual search data 906 that can then be processed to determine one or more application suggestions 914.

For example, image data 902 can be obtained. The image data 902 can be descriptive of content previously provided for display by a computing device. The image data 902 can include one or more images and may be descriptive of one or more objects. The image data 902 can be descriptive of a previously displayed application, which can include the application interface and one or more content items.

The image data can be processed to perform visual search 904 to generate visual search data 906. Visual search 904 can include object detection, optical character recognition, image segmentation, object classification, generative model processing, and/or search engine processing. The visual search 904 may include processing the image data 902 with text data 908 and/or context data 910 to determine one or more visual search results, which may be associated with one or more web resources. The text data 908 may include user input text, predicted text, a selected text suggestion, extracted text, and/or text labels. The context data 910 can include metadata. In some implementations, the context data 910 can be associated with a time, a location, search history, browsing history, application history, user profile data, a personalized model, and/or other contexts.

The visual search data 906 can be descriptive of one or more visual search results associated with the image data 902. The one or more visual search results can include images, text, audio, videos, and/or other search result data. The visual search data 906 may include one or more object classifications and/or one or more image classifications. The visual search data 906 may include a model-generated response that may be generated by processing one or more web resources associated with the one or more visual search results to generate a natural language response to the image query.

The visual search data 906 can be processed with a suggestion model 912 to determine one or more application suggestions 914 and/or one or more query suggestions 916. The one or more query suggestions 916 can include suggested follow-up queries based on the contents of the one or more visual search results and/or based on a topic and/or sub-topic determination associated with the image data 902 and/or the one or more search results. The one or more application suggestions 914 can include applications on the computing device determined to be associated with the image data 902 based on the visual search data 906. For example, the visual search data 906 may be processed to determine one or more topics, entities, and/or tasks associated with the one or more visual search results. Based on the one or more determined topics, entities and/or tasks, an application associated with the one or more visual search results can be determined.

In some implementations, one or more of the application suggestions 914 can be selected to transmit at least a portion of the visual search data 906 to a second application. Additionally and/or alternatively, the visual search data 906 and/or the one or more application suggestions 914 can be processed with a generative model to generate one or more model-generated content items 918 to transmit to a second application. The model-generated content item 918 may be generated by processing the application suggestion 914 and/or the visual search data 906 with a prompt generation model 920 to generate a prompt that is then processed with the generative model to generate the model-generated content item 918. The model-generated content item 918 can be descriptive of a summary and/or a representation of at least a portion of the visual search data 906 and may be configured and/or formatted based on the particular second application.

The visual search interface in the operating system may be utilized to interface with one or more applications on the computing device to aggregate data for the user. The aggregated data may be processed with one or more machine-learned models to generate an output that organizes the data in a format that conveys the information in a digestible manner.

Figure 11:
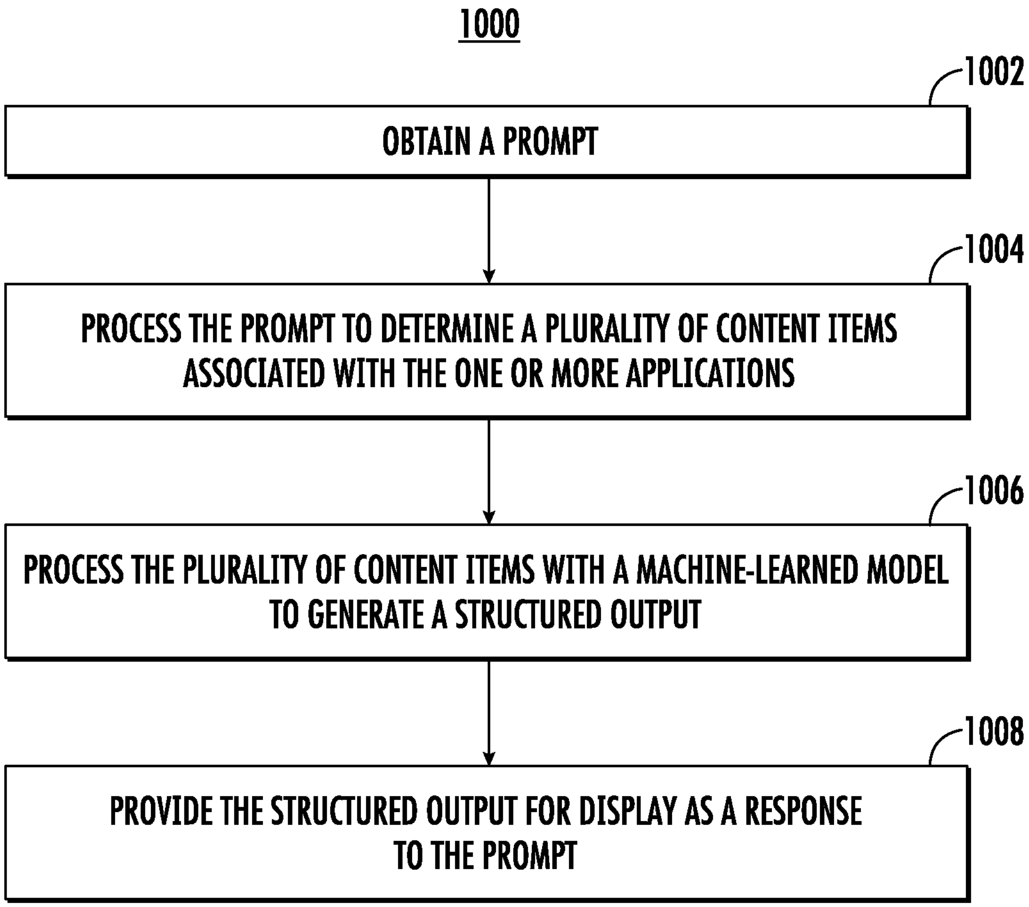
FIG. 11 depicts a flow chart diagram of an example method to perform a data call according to example embodiments of the present disclosure.

FIG. 11 depicts a flow chart diagram of an example method to perform according to example embodiments of the present disclosure. Although FIG. 11 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure.

At 1002, a computing system can obtain a prompt. The prompt can be obtained by a computing device. The prompt can be descriptive of a request for information from one or more applications on the computing system and/or a particular computing device. The prompt can be obtained via an overlay interface. The overlay interface can be provided by the operating system. In some implementations, the prompt can include a multimodal prompt. The multimodal prompt can include text data and image data. The prompt may include an application call that indicates a particular application to access and obtain data from for the information retrieval. Alternatively and/or additionally, the one or more applications to access and search may be determined by identifying a topic, task, and/or entity associated with the request. In some implementations, the prompt can include text data, image data, audio data, latent encoding data, and/or context data. The prompt may include image data and text data that is descriptive of a task to perform with the image (e.g., search a particular social media application, a particular message application, and/or a particular image storage application for images with the chair in this image). The prompt may be descriptive of an application call to a plurality of applications to aggregate information associated with a particular topic (e.g., a room remodeling, clothes wish list, travel itinerary, story ideas, etc.).

At 1004, the computing system can process the prompt to determine a plurality of content items associated with the one or more applications. The plurality of content items can be determined by accessing data associated with the one or more applications on the computing device. In some implementations, the plurality of content items can include one or more multimodal content items (e.g., an email with text and one or more images, a product listing with images and text, and/or a video listing with a video and caption). The plurality of content items can be obtained from a plurality of applications on the computing device. One or more first content items may be obtained from a first application, and one or more second content items may be obtained from a second application. The first application and the second application can differ from an application that obtained the prompt. The one or more applications can include one or more messaging applications. In some implementations, the plurality of content items can include a plurality of messages determined to be associated with the prompt. The one or more applications may be determined based on processing the prompt with an application interface model that can determine the one or more particular applications that are associated with the prompt. The application interface model can process the prompt to generate an application call that can be utilized to interface with the one or more particular applications to access and obtain the plurality of content items. The application calls may be performed using one or more application programming interfaces. The one or more application programming interfaces may be implemented via the operating system of the computing device.

At 1006, the computing system can process the plurality of content items with a machine-learned model to generate a structured output. The structured output can include information from the plurality of content items distilled in a structured data format (e.g., a natural language output (e.g., an article, a story, a poem, etc.), an informational graphic (e.g., a table, Venn diagram, etc.), and/or a media content item (e.g., a video, an image, etc.)). The structured output can include formatting that differs from a native format of the plurality of content items. The structured output can include multimodal data. The machine-learned model can include a generative model (e.g., a generative language model, a generative text-to-image model, a generative vision language model, and/or a generative graph model).

In some implementations, the computing system can determine a plurality of objects associated with the plurality of content items and obtain a plurality of object details associated with the plurality of objects. The structured output can be generated based on the plurality of objects and the plurality of object details. Additionally and/or alternatively, the structured output can include a graphical representation. The graphical representation may include object data and detail data. The object data can identify the plurality of objects. The detail data can be descriptive of the plurality of object details. In some implementations, the structured output can include a plurality of object images associated with the plurality of objects. The structured output can include text descriptive of the plurality of object details.

At 1008, the computing system can provide the structured output for display as a response to the prompt. The structured output can be provided via the overlay interface. The structured output can be provided for display at the computing device. The structured output can be provided for display with the prompt and may include one or more options for storing, transmitting, and/or augmenting the structured output.

In some implementations, the computing system can obtain, at the computing device, a second prompt. The second prompt can be descriptive of a follow-up request to obtain additional information associated with the structured content. The computing system can process the second prompt and the structured output to determine additional content that is responsive to the follow-up request. The additional content can be determined based on determining the structured output is associated with one or more entities and determining the additional content is associated with the one or more entities. In some implementations, processing the second prompt and the structured output to determine the additional content can include determining one or more second applications are associated with the second prompt and obtaining the additional content by interfacing with the one or more second applications. The additional content can include additional details on the contents of the structured output, which can include location data for products listed in a model-generated table.

Additionally and/or alternatively, the computing system can generate a second structured output based on the additional content. Generating the second structured output based on the additional content can include processing the additional content to generate a graphical representation associated with the additional content. The plurality of content items can be associated with a plurality of different products. The structured output can include a table. In some implementations, the table can include a structured representation of details for the plurality of different products. The additional content can include one or more locations associated with the plurality of different products. The second structured output can include a graphical map with one or more indicators of the one or more locations.

In some implementations, the computing system can provide, at the computing device, the second structured output for display as a response to the second prompt. The second structured output may be displayed with the structured output and/or may replace the display location of the structured output. The second structured output may be provided for display with the prompt and may include one or more options for storing, transmitting, and/or augmenting the second structured output.

In some implementations, the computing system can determine the structured output is associated with one or more second applications. The computing system can generate an application suggestion based on the one or more second applications, obtain a selection of the application suggestion, and generate a data packet. The data packet can be descriptive of the structured output. The computing system can provide the data packet to the one or more second applications.

In some implementations, the computing system can obtain input data. The input data can be descriptive of a selection to input the structured output into a second application. The computing system can provide the structured output to the second application in response to the selection.

Alternatively and/or additionally, the computing system can obtain an augmentation input. The augmentation input can be descriptive of a request to adjust the structured output. The computing system can process the augmentation input and the structured output to generate an augmented structured output. The augmented structured output can include the structured output with one or more portions augmented. Processing the augmentation input and the structured output to generate the augmented structured output can include obtaining revision data based on the augmentation input and replacing a subset of the structured output with the revision data to generate the augmented structured output. The revision data can include manually input data, data obtained from the web, and/or data obtained from one or more applications on the computing device.

Figure 12:
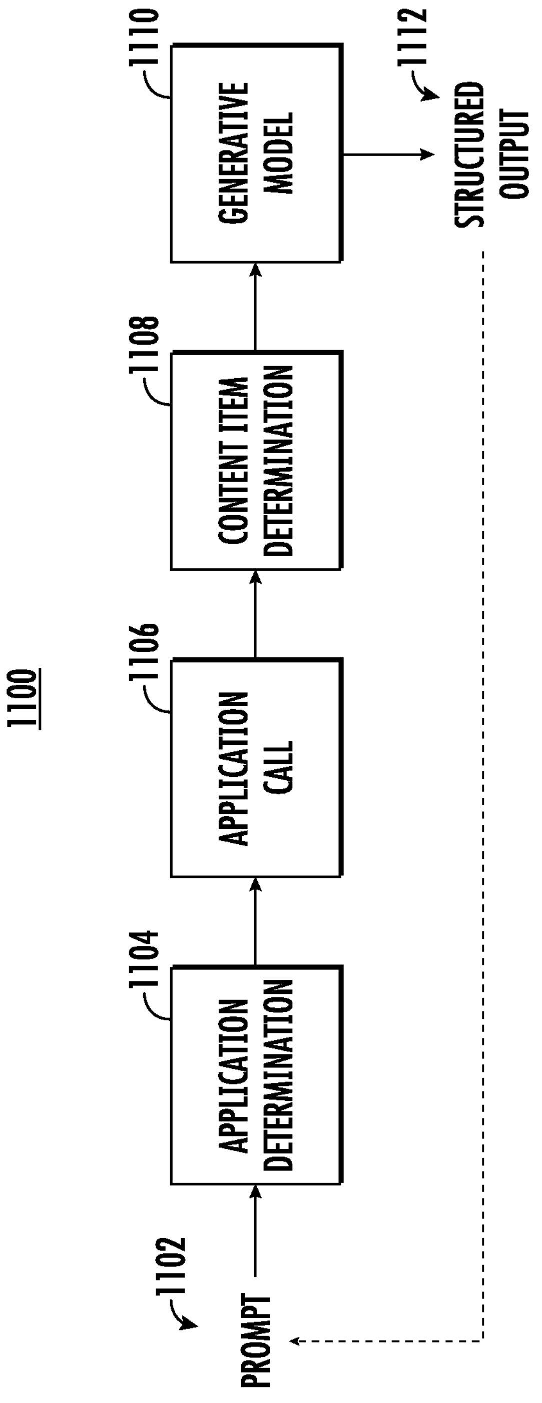
FIG. 12 depicts a block diagram of an example data aggregation system according to example embodiments of the present disclosure.

FIG. 12 depicts a block diagram of an example data aggregation system 1100 according to example embodiments of the present disclosure. In particular, the data aggregation system 1100 can process a prompt 1102, perform an application call 1106 to obtain content items from one or more applications, and generate a structured output 1112 based on the content items.

For example, a prompt 1102 can be obtained. The prompt 1102 can include a text string descriptive of a request for information. The prompt 1102 can include an indication of a particular application to obtain data from and/or may be an open request to be processed by the data aggregation system 1100 to determine which applications to pull data from for data aggregation. In some implementations, the prompt 1102 can include a multimodal prompt (e.g., text data and image data, audio data and image data, embedding data and text data, metadata and image data, etc.).

The prompt 1102 can be processed with an application determination block 1104 to determine one or more applications to access and search to obtain one or more content items. The applications may be determined based on determining the prompt is associated with one or more topics, tasks, and/or entities associated with one or more particular applications. Alternatively and/or additionally, the prompt 1102 can be parsed to determine the request is associated with a particular application (e.g., an explicit request and/or an implicit request). The one or more applications may include messaging applications (e.g., email, text, group chats, etc.), work management applications, storage applications (e.g., document management applications, media content item gallery applications, etc.), browser applications, search applications, notes applications, streaming applications, and/or other applications.

An application call 1106 can then be generated and performed based on the application determination. The application call 1106 may be facilitated by an overlay interface implemented in the operating system. In some implementations, the application call 1106 may be performed via an application programming interface and/or one or more other application interfacing systems. Content item determination 1108 can be performed based on the application call 1106. The content item determination 1108 can be utilized to determine a plurality of content items of the one or more applications are associated with the prompt 1102. Content item determination 1108 can include a key word search, an embedding search, an image search, data parsing, metadata search, etc.

The one or more content items can then be processed with a generative model 1110 to generate a structured output 1112 that includes information from the one or more content items. The structured output 1112 can include a natural language output, a graphical representation, a model-generated media content item, code, and/or other data. In some implementations, the format of the structured output 1112 can be based on the request of the prompt 1102. Alternatively and/or additionally, the format of the structured output 1112 may be based on determining a task, topic, and/or entity associated with the prompt 1102 and/or the content items.

In some implementations, the structured output 1112 may be provided with one or more action suggestions. For example, an augmentation option, a new prompt option, and/or a structured output interaction option may be provided to the user for selection. The augmentation option can be associated with an option to augment at least a portion of the structured output 1112, which can include adding new information based on manual user input, another application call, a web search, and/or other data acquisition. The augmentation may include a format change, a style change, data deletion, and/or content expansion (e.g., generating a long-form version of the structured output 1112 based on additional generative model 1110 processing). The new prompt option can include processing the structured output 1112 and/or a second prompt with the data aggregation system 1100 to generate a second structured output. The structured output interaction option can include storing the structured output 1112, transmitting the structured output 1112 to one or more applications and/or one or more users, and/or interacting with a user interface element of the structured output 1112.

Figure 13A:
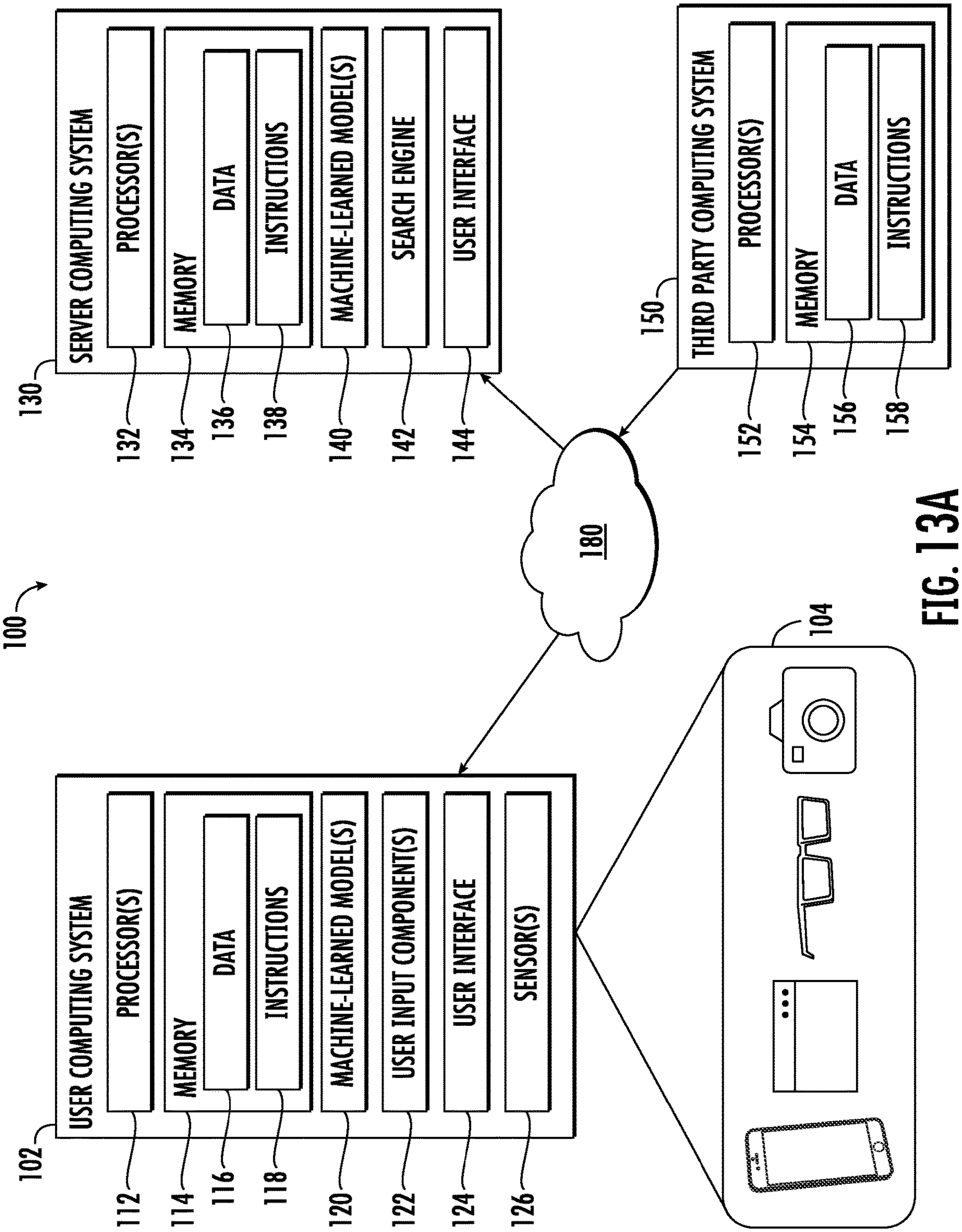
FIG. 13A depicts a block diagram of an example computing system that performs visual search and content generation at the operating system level according to example embodiments of the present disclosure.

FIG. 13A depicts a block diagram of an example computing system 100 that performs visual search and content snippet generation according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Machine-learned model(s) can be or include one or multiple machine-learned models or model components. Example machine-learned models can include neural networks (e.g., deep neural networks). Example machine-learned models can include non-linear models or linear models. Example machine-learned models can use other architectures in lieu of or in addition to neural networks. Example machine-learned models can include decision tree based models, support vector machines, hidden Markov models, Bayesian networks, linear regression models, k-means clustering models, etc.

Example neural networks can include feed-forward neural networks, recurrent neural networks (RNNs), including long short-term memory (LSTM) based recurrent neural networks, convolutional neural networks (CNNs), diffusion models, generative-adversarial networks, or other forms of neural networks. Example neural networks can be deep neural networks. Some example machine-learned models can leverage an attention mechanism such as self-attention. For example, some example machine-learned models can include multi-headed self-attention models.

Machine-learned model(s) can include a single or multiple instances of the same model configured to operate on data from input(s). Machine-learned model(s) can include an ensemble of different models that can cooperatively interact to process data from input(s). For example, machine-learned model(s) can employ a mixture-of-experts structure. See, e.g., Zhou et al., *Mixture-of-Experts with Expert Choice Routing,* ARXIV: 2202.09368v2 (Oct. 14, 2022).

Input(s) can generally include or otherwise represent various types of data. Input(s) can include one type or many different types of data. Output(s) can be data of the same type(s) or of different types of data as compared to input(s). Output(s) can include one type or many different types of data.

Example data types for input(s) or output(s) include natural language text data, software code data (e.g., source code, object code, machine code, or any other form of computer-readable instructions or programming languages), machine code data (e.g., binary code, assembly code, or other forms of machine-readable instructions that can be executed directly by a computer's central processing unit), assembly code data (e.g., low-level programming languages that use symbolic representations of machine code instructions to program a processing unit), genetic data or other chemical or biochemical data, image data, audio data, audiovisual data, haptic data, biometric data, medical data, financial data, statistical data, geographical data, astronomical data, historical data, sensor data generally (e.g., digital or analog values, such as voltage or other absolute or relative level measurement values from a real or artificial input, such as from an audio sensor, light sensor, displacement sensor, etc.), and the like. Data can be raw or processed and can be in any format or schema.

In multimodal inputs or outputs, example combinations of data types include image data and audio data, image data and natural language data, natural language data and software code data, image data and biometric data, sensor data and medical data, etc. It is to be understood that any combination of data types in an input or an output can be present.

An example input can include one or multiple data types, such as the example data types noted above. An example output can include one or multiple data types, such as the example data types noted above. The data type(s) of input can be the same as or different from the data type(s) of output. It is to be understood that the example data types noted above are provided for illustrative purposes only. Data types contemplated within the scope of the present disclosure are not limited to those examples noted above.

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or be part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

An example machine-learned model can include a generative model (e.g., a large language model, a foundation model, a vision language model, an image generation model, a text-to-image model, an audio generation model, and/or other generative models).

Training and/or tuning the machine-learned model can include obtaining a training instance. A set of training data can include a plurality of training instances divided between multiple datasets (e.g., a training dataset, a validation dataset, or testing dataset). A training instance can be labeled or unlabeled. The runtime inferences can form training instances when a model is trained using an evaluation of the model's performance on that runtime instance (e.g., online training/learning). Example data types for the training instance and various tasks associated therewith are described throughout the present disclosure.

Training and/or tuning can include processing, using one or more machine-learned models, the training instance to generate an output. The output can be directly obtained from the one or more machine-learned models or can be a downstream result of a chain of processing operations that includes an output of the one or more machine-learned models.

Training and/or tuning can include receiving an evaluation signal associated with the output. The evaluation signal can be obtained using a loss function. Various determinations of loss can be used, such as mean squared error, likelihood loss, cross entropy loss, hinge loss, contrastive loss, or various other loss functions. The evaluation signal can be computed using known ground-truth labels (e.g., supervised learning), predicted or estimated labels (e.g., semi- or self-supervised learning), or without labels (e.g., unsupervised learning). The evaluation signal can be a reward (e.g., for reinforcement learning). The reward can be computed using a machine-learned reward model configured to generate rewards based on output(s) received. The reward can be computed using feedback data describing human feedback on the output(s).

Training and/or tuning can include updating the machine-learned model using the evaluation signal. For example, values for parameters of the machine-learned model(s) can be learned, in some embodiments, using various training or learning techniques, such as, for example, backwards propagation. For example, the evaluation signal can be backpropagated from the output (or another source of the evaluation signal) through the machine-learned model(s) to update one or more parameters of the model(s) (e.g., based on a gradient of the evaluation signal with respect to the parameter value(s)). For example, system(s) containing one or more machine-learned models can be trained in an end-to-end manner. Gradient descent techniques can be used to iteratively update the parameters over a number of training iterations. In some implementations, performing backwards propagation of errors can include performing truncated backpropagation through time. Training and/or tuning can include implementing a number of generalization techniques (e.g., weight decays, dropouts, etc.) to improve the generalization capability of the models being trained.

In some implementations, the above training loop can be implemented for training a machine-learned model from an initialized state to a fully trained state (e.g., when the model exhibits a desired performance profile, such as based on accuracy, precision, recall, etc.).

In some implementations, the above training loop can be implemented for particular stages of a training procedure. For instance, in some implementations, the above training loop can be implemented for pre-training a machine-learned model. Pre-training can include, for instance, large-scale training over potentially noisy data to achieve a broad base of performance levels across a variety of tasks/data types. In some implementations, the above training loop can be implemented for fine-tuning a machine-learned model. Fine-tuning can include, for instance, smaller-scale training on higher-quality (e.g., labeled, curated, etc.) data. Fine-tuning can affect all or a portion of the parameters of a machine-learned model. For example, various portions of the machine-learned model can be "frozen" for certain training stages. For example, parameters associated with an embedding space can be "frozen" during fine-tuning (e.g., to retain information learned from a broader domain(s) than present in the fine-tuning dataset(s)). An example fine-tuning approach includes reinforcement learning. Reinforcement learning can be based on user feedback on model performance during use.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model (s) can process the image data to generate an upscaled image data output. As another example, the machine-learned model (s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some implementations, the task can be a generative task, and the one or more machine-learned models (e.g., 120 and/or 140) can be configured to output content generated in view of one or more inputs. For instance, the inputs can be or otherwise represent data of one or more modalities that encodes context for generating additional content.

In some implementations, the task can be a text completion task. The machine-learned models can be configured to process the inputs that represent textual data and to generate the outputs that represent additional textual data that completes a textual sequence that includes the inputs. For instance, the machine-learned models can be configured to generate the outputs to complete a sentence, paragraph, or portion of text that follows from a portion of text represented by inputs.

In some implementations, the task can be an instruction following task. The machine-learned models can be configured to process the inputs that represent instructions to perform a function and to generate the outputs that advance a goal of satisfying the instruction function (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the instructions (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the instructions (e.g., natural language responses, programming language responses, machine language responses, etc.). One or more outputs can be iteratively or recursively generated to sequentially process and accomplish steps toward accomplishing the requested functionality. For instance, an initial output can be executed by an external system or be processed by the machine-learned models to complete an initial step of performing a function. Multiple steps can be performed, with a final output being obtained that is responsive to the initial instructions.

In some implementations, the task can be a question answering task. The machine-learned models can be configured to process the inputs that represent a question to answer and to generate the outputs that advance a goal of returning an answer to the question (e.g., at least a step of a multi-step procedure to perform the function). The outputs can represent data of the same or of a different modality as the inputs. For instance, the inputs can represent textual data (e.g., natural language instructions for a task to be performed) and the machine-learned models can process the inputs to generate the outputs that represent textual data responsive to the question (e.g., natural language responses, programming language responses, machine language responses, etc.). The inputs can represent image data (e.g., image-based instructions for a task to be performed, optionally accompanied by textual instructions) and the machine-learned models can process the inputs to generate the outputs that represent textual data responsive to the question (e.g., natural language responses, programming language responses, machine language responses, etc.). One or more outputs can be iteratively or recursively generated to sequentially process and accomplish steps toward answering the question. For instance, an initial output can be executed by an external system or be processed by the machine-learned models to complete an initial step of obtaining an answer to the question (e.g., querying a database, performing a computation, executing a script, etc.). Multiple steps can be performed, with a final output being obtained that is responsive to the question.

In some implementations, the task can be an image generation task. The machine-learned models can be configured to process the inputs that represent context regarding a desired portion of image content. The context can include text data, image data, audio data, etc. Machine-learned models can be configured to generate the outputs that represent image data that depicts imagery related to the context. For instance, the machine-learned models can be configured to generate pixel data of an image. Values for channels associated with the pixels in the pixel data can be selected based on the context (e.g., based on a probability determined based on the context).

In some implementations, the task can be an audio generation task. Machine-learned models can be configured to process the inputs that represent context regarding a desired portion of audio content. The context can include text data, image data, audio data, etc. The machine-learned models can be configured to generate the outputs that represent audio data related to the context. For instance, the machine-learned models can be configured to generate waveform data in the form of an image (e.g., a spectrogram). Values for channels associated with pixels of the image can be selected based on the context. The machine-learned models can be configured to generate waveform data in the form of a sequence of discrete samples of a continuous waveform. Values of the sequence can be selected based on the context (e.g., based on a probability determined based on the context).

In some implementations, the task can be a data generation task. Machine-learned models can be configured to process the inputs that represent context regarding a desired portion of data (e.g., data from various data domains, such as sensor data, image data, multimodal data, statistical data, etc.). The desired data can be, for instance, synthetic data for training other machine-learned models. The context can include arbitrary data types. The machine-learned models can be configured to generate the outputs that represent data that aligns with the desired data. For instance, the machine-learned models can be configured to generate data values for populating a dataset. Values for the data objects can be selected based on the context (e.g., based on a probability determined based on the context).

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 13B:
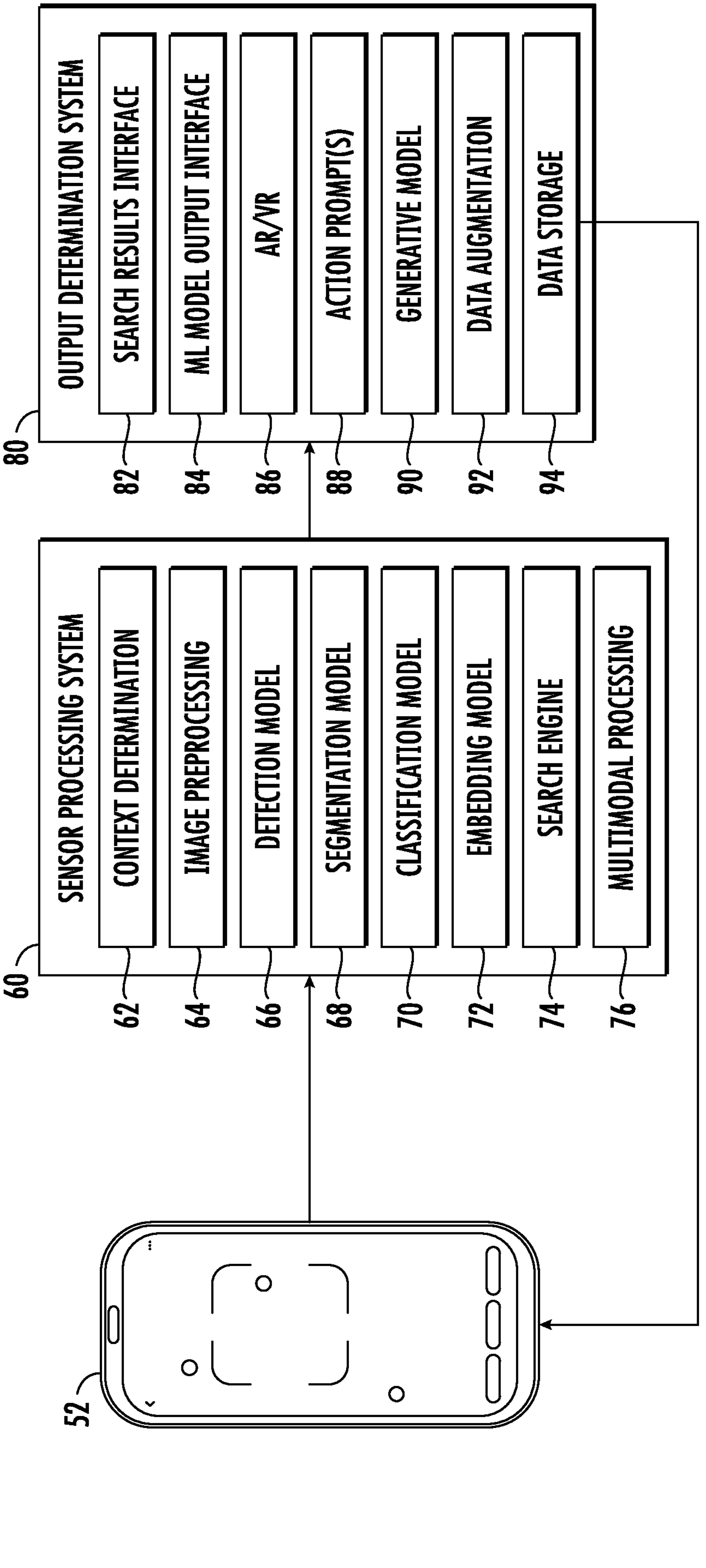
FIG. 13B depicts a block diagram of an example computing system that performs visual search and content generation at the operating system level according to example embodiments of the present disclosure.

FIG. 13B depicts a block diagram of an example computing system 50 that performs visual search and content snippet generation according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The one or more generative models 90 can include language models (e.g., large language models and/or vision language models), image generation models (e.g., text-to-image generation models and/or image augmentation models), audio generation models, video generation models, graph generation models, and/or other data generation models (e.g., other content generation models). The one or more generative models 90 can include one or more transformer models, one or more convolutional neural networks, one or more recurrent neural networks, one or more feedforward neural networks, one or more generative adversarial networks, one or more self-attention models, one or more embedding models, one or more encoders, one or more decoders, and/or one or more other models. In some implementations, the one or more generative models 90 can include one or more autoregressive models (e.g., a machine-learned model trained to generate predictive values based on previous behavior data) and/or one or more diffusion models (e.g., a machine-learned model trained to generate predicted data based on generating and processing distribution data associated with the input data).

The one or more generative models 90 can be trained to process input data and generate model-generated content items, which may include a plurality of predicted words, pixels, signals, and/or other data. The model-generated content items may include novel content items that are not the same as any pre-existing work. The one or more generative models 90 can leverage learned representations, sequences, and/or probability distributions to generate the content items, which may include phrases, storylines, settings, objects, characters, beats, lyrics, and/or other aspects that are not included in pre-existing content items.

The one or more generative models 90 may include a vision language model. The vision language model can be trained, tuned, and/or configured to process image data and/or text data to generate a natural language output. The vision language model may leverage a pre-trained large language model (e.g., a large autoregressive language model) with one or more encoders (e.g., one or more image encoders and/or one or more text encoders) to provide detailed natural language outputs that emulate natural language composed by a human.

The vision language model may be utilized for zero-shot image classification, few shot image classification, image captioning, multimodal query distillation, multimodal question and answering, and/or may be tuned and/or trained for a plurality of different tasks. The vision language model can perform visual question answering, image caption generation, feature detection (e.g., content monitoring (e.g. for inappropriate content)), object detection, scene recognition, and/or other tasks.

The vision language model may leverage a pre-trained language model that may then be tuned for multimodality. Training and/or tuning of the vision language model can include image-text matching, masked-language modeling, multimodal fusing with cross attention, contrastive learning, prefix language model training, and/or other training techniques. For example, the vision language model may be trained to process an image to generate predicted text that is similar to ground truth text data (e.g., a ground truth caption for the image). In some implementations, the vision language model may be trained to replace masked tokens of a natural language template with textual tokens descriptive of features depicted in an input image. Alternatively and/or additionally, the training, tuning, and/or model inference may include multi-layer concatenation of visual and textual embedding features. In some implementations, the vision language model may be trained and/or tuned via jointly learning image embedding and text embedding generation, which may include training and/or tuning a system to map embeddings to a joint feature embedding space that maps text features and image features into a shared embedding space. The joint training may include image-text pair parallel embedding and/or may include triplet training. In some implementations, the images may be utilized and/or processed as prefixes to the language model.

The one or more generative models 90 may be stored on-device and/or may be stored on a server computing system. In some implementations, the one or more generative models 90 can perform on-device processing to determine suggested searches, suggested actions, and/or suggested prompts. The one or more generative models 90 may include one or more compact vision language models that may include less parameters than a vision language model stored and operated by the server computing system. The compact vision language model may be trained via distillation training. In some implementations, the visional language model may process the display data to generate suggestions. The display data can include a single image descriptive of a screenshot and/or may include image data, metadata, and/or other data descriptive of a period of time preceding the current displayed content (e.g., the applications, images, videos, messages, and/or other content viewed within the past 30 seconds). The user computing device may generate and store a rolling buffer window (e.g., 30 seconds) of data descriptive of content displayed during the buffer. Once the time has elapsed, the data may be deleted. The rolling buffer window data may be utilized to determine a context, which can be leveraged for query, content, action, and/or prompt suggestion.

In some implementations, the generative models 90 can include machine-learned sequence processing models. An example system can pass inputs to sequence processing models. Sequence processing models can include one or more machine-learned components. Sequence processing models can process the data from inputs to obtain an input sequence. Input sequence can include one or more input elements obtained from inputs. The sequence processing model can process the input sequence using prediction layers to generate an output sequence. The output sequence can include one or more output elements generated based on input sequence. The system can generate outputs based on output sequence.

Sequence processing models can include one or multiple machine-learned model components configured to ingest, generate, or otherwise reason over sequences of information. For example, some example sequence processing models in the text domain are referred to as "Large Language Models," or LLMs. See, e.g., PaLM 2 Technical Report, Google, https://ai.google/static/documents/palm2techreport.pdf (n.d.). Other example sequence processing models can operate in other domains, such as image domains, see, e.g., Dosovitskiy et al., *An Image is Worth* 16×16 *Words: Transformers for Image Recognition at Scale*, arXiv: 2010.11929v2 (Jun. 3, 2021), audio domains, see, e.g., Agostinelli et al., *MusicLM: Generating Music From Text*, arXiv: 2301.11325v1 (Jan. 26, 2023), biochemical domains, see, e.g., Jumper et al., Highly accurate protein structure prediction with AlphaFold, 596 Nature 583 (Aug. 26, 2021), by way of example. Sequence processing models can process one or multiple types of data simultaneously. Sequence processing models can include relatively large models (e.g., more parameters, computationally expensive, etc.), relatively small models (e.g., fewer parameters, computationally lightweight, etc.), or both.

In general, sequence processing models can obtain an input sequence using data from inputs. For instance, input sequence can include a representation of data from inputs 2 in a format understood by sequence processing models. One or more machine-learned components of sequence processing models can ingest the data from inputs, parse the data into pieces compatible with the processing architectures of sequence processing models (e.g., via "tokenization"), and project the pieces into an input space associated with prediction layers (e.g., via "embedding").

Sequence processing models can ingest the data from inputs and parse the data into a sequence of elements to obtain input sequence. For example, a portion of input data from inputs can be broken down into pieces that collectively represent the content of the portion of the input data. The pieces can provide the elements of the sequence.

In some implementations, processing the input data can include tokenization. For example, a tokenizer may process a given portion of an input source and output a series of tokens (e.g., corresponding to input elements) that represent the portion of the input source. Various approaches to tokenization can be used. For instance, textual input sources can be tokenized using a byte-pair encoding (BPE) technique. See, e.g., Kudo ct al., *SentencePiece: A simple and*

*language independent subword tokenizer and detokenizer for Neural Text Processing*, Proceedings of the 2018 Conference on Empirical Methods in Natural Language Processing (System Demonstrations), pages 66-71 (Oct. 31-Nov. 4, 2018), https://aclanthology.org/D18-2012.pdf. Image-based input sources can be tokenized by extracting and serializing patches from an image.

In general, arbitrary data types can be serialized and processed into an input sequence.

Prediction layers can predict one or more output elements based on the input elements. Prediction layers can include one or more machine-learned model architectures, such as one or more layers of learned parameters that manipulate and transform the inputs to extract higher-order meaning from, and relationships between, input elements. In this manner, for instance, example prediction layers can predict new output elements in view of the context provided by input sequence.

Prediction layers can evaluate associations between portions of input sequence and a particular output element. These associations can inform a prediction of the likelihood that a particular output follows the input context. For example, consider the textual snippet, "The carpenter's toolbox was small and heavy. It was full of _______." Example prediction layers can identify that "It" refers back to "toolbox" by determining a relationship between the respective embeddings. Example prediction layers can also link "It" to the attributes of the toolbox, such as "small" and "heavy." Based on these associations, prediction layers can, for instance, assign a higher probability to the word "nails" than to the word "sawdust."

A transformer is an example architecture that can be used in prediction layers. See, e.g., Vaswani et al., *Attention Is All You Need*, arXiv: 1706.03762v7 (Aug. 2, 2023). A transformer is an example of a machine-learned model architecture that uses an attention mechanism to compute associations between items within a context window. The context window can include a sequence that contains input sequence and potentially one or more output elements. A transformer block can include one or more attention layers and one or more post-attention layers (e.g., feedforward layers, such as a multi-layer perceptron).

Prediction layers can include other machine-learned model architectures in addition to or in lieu of transformer-based architectures. For example, recurrent neural networks (RNNs) and long short-term memory (LSTM) models can also be used, as well as convolutional neural networks (CNNs). In general, prediction layers can leverage various kinds of artificial neural networks that can understand or generate sequences of information.

Output sequence can include or otherwise represent the same or different data types as input sequence. For instance, input sequence can represent textual data, and output sequence can represent textual data. The input sequence can represent image, audio, or audiovisual data, and output sequence can represent textual data (e.g., describing the image, audio, or audiovisual data). It is to be understood that prediction layers, and any other interstitial model components of sequence processing models, can be configured to receive a variety of data types in input sequences and output a variety of data types in output sequences.

The output sequence can have various relationships to an input sequence. Output sequence can be a continuation of input sequence. The output sequence can be complementary to the input sequence. The output sequence can translate, transform, augment, or otherwise modify input sequence. The output sequence can answer, evaluate, confirm, or otherwise respond to input sequence. The output sequence can implement (or describe instructions for implementing) an instruction provided via an input sequence.

The output sequence can be generated autoregressively. For instance, for some applications, an output of one or more prediction layers can be passed through one or more output layers (e.g., softmax layer) to obtain a probability distribution over an output vocabulary (e.g., a textual or symbolic vocabulary) conditioned on a set of input elements in a context window. In this manner, for instance, the output sequence can be autoregressively generated by sampling a likely next output element, adding that element to the context window, and re-generating the probability distribution based on the updated context window, and sampling a likely next output element, and so forth.

The output sequence can also be generated non-autoregressively. For instance, multiple output elements of the output sequence can be predicted together without explicit sequential conditioning on each other. See, e.g., Saharia et al., Non-Autoregressive Machine Translation with Latent Alignments, arXiv: 2004.07437v3 (Nov. 16, 2020).

The output sequence can include one or multiple portions or elements. In an example content generation configuration, the output sequence can include multiple elements corresponding to multiple portions of a generated output sequence (e.g., a textual sentence, values of a discretized waveform, computer code, etc.). In an example classification configuration, the output sequence can include a single element associated with a classification output. For instance, an output "vocabulary" can include a set of classes into which an input sequence is to be classified. For instance, a vision transformer block can pass latent state information to a multilayer perceptron that outputs a likely class value associated with an input image.

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

Aspects of the present disclosure can be utilized to provide a visual search system and/or content generation system to more intelligently process a visual query to provide improved search results, including search results which are more personalized or user-driven or user-defined and/or to understand an input and generate a content snippet. Specifically, a computer visual search system can leverage free-form user input that selects one or more visual features depicted in an image. The search system can use the selected visual features to perform or refine a visual search to return results that are more specifically relevant to the selected visual features (e.g., as opposed to the image as a whole or specific semantic objects depicted in the image). Thus, a search system can provide a user with improved visual search results which are more directly relevant to specific, user-selected visual features.

According to one example aspect, a visual search system can leverage free-form user selection of visual features to provide more personalized search results. In one example use, the visual search system can use the free-form user selection of visual features to return a combined set of content responding to multiple visual features responsive to visual search queries. In particular, because visual search queries enable a more expressive and fluid modality of search input, both understanding the granularity and object (s) of user intent is a challenging task.

To provide an example, imagine that a user submits as a visual query a dress. There is a significant amount of variation in what the user intent could be in an image of a dress. The user could be interested in dresses which have one or more characteristics in common with the dress in the query image, such as length, color, sleeve type, collar style, fabric pattern, or some combination thereof. Thus, determining by a computing system which specific visual aspects a user is interested in given an image is a challenging problem. Conversely, understanding the intended granularity of a user's query is challenging. Continuing the dress example, a visual query that includes a dress with a brand logo on it may be intended to search for dresses that look like the dress in the image or other articles of clothing which are entirely different but produced by the same brand.

The present disclosure resolves these challenges by enabling the return of content responsive to visual features indicated as points of interest by user free-form input. In particular, in the context of a visual search query that includes an image depicting one or more objects, the computing system can receive a free-form user input to a user interface. More particularly, the free-form user input to the user interface can select a particular sub-portion of the image. The particular sub-portion can comprise one or more visual features. A visual search query can be constructed or refined based on the user input. For example, the visual search query can include the particular sub-portion of the object, for example, the particular sub-portion of the object selected by the free-form user input.

Furthermore, the computing system can receive from the visual search system a set of visual search results. The visual search results can be responsive to visual features, such as visual features included in the particular sub-portion of the one or more objects in the image. The computing system can then provide one or more of the set of visual search results to a user. To continue the example above, while certain existing systems may return content related only to dresses that look nearly identical to the dress in the image, if the user input has selected the sleeves of the dress in the query image then the proposed system may return content related to dresses that are different in color and shape but have the same style of sleeves.

Various techniques can be used to enable the free-form user input of particular sub-portions of an image containing one or more visual features. In one example, an initial query image provided or selected by the user can be displayed within a user interface. Even more particularly, the image can be displayed on a touch sensitive display device. Thus, the free-form user input can be received by the touch sensitive display device.

In one example, the free-form user input to the user interface can be illustrated using a swathe of translucent color overlayed on a particular sub-portion of the object. The particular sub-portion of the object can be selected by free-form user input. Selecting the particular sub-portion of the object by free-form user input can indicate that the particular sub-portion of the one or more objects depicted by the image has been selected by the user. Specifically, a user can drag a tactile object (e.g., finger, stylus, etc.) over the image provided for display within the user interface and, in response, the user interface can overlay the swathe of translucent color wherever the tactile object touches (e.g., in a highlighting manner). Alternatively, a user can use any method of interacting with a display within a user interface (e.g., a mouse) to overlay the swathe of translucent color using any method known in the art (e.g., click and drag). Continuing the example from above, the user can drag a finger across an image of a dress's sleeve to overlay a swathe of translucent color over the sleeve of the dress. Thus, the visual query may provide visual search results of dresses with the same style of sleeve.

In another example, the free-form user input to the user interface can be a user input that selects a subset of pixels. In particular, the subset of pixels can be selected by the user from a plurality of pixels. The pixels can be specific image pixels or groups of image pixels that are grouped together. More particularly, the plurality of pixels can be derived from dividing the image depicting one or more objects into the plurality of pixels. Even more particularly, the subset of pixels selected by the user from the plurality of pixels can comprise at least two groups of selected pixels which are separate from each other. Stated differently, the subset of pixels selected by the user from the plurality of pixels can comprise at least two groups of selected pixels which are non-adjacent to each other. The particular subset of pixels can be selected by free-form user input. Selecting the particular sub-portion of the object by free-form user input can indicate that the particular sub-portion of the one or more objects depicted by the selected pixels in the image has been selected by the user.

Specifically, in some implementations, a user can drag a tactile object (e.g., finger, stylus, etc.) over the image provided for display within the user interface to indicate which pixels are part of the sub-portion of the image containing the visual feature of interest (e.g., pixels may indicate being selected by changing colors). Alternatively, a user can use any method of interacting with a display within a user interface (e.g., a mouse) to indicate which pixels should be selected using any method known in the art (e.g., click and drag).

Continuing the example from above, the user can drag a finger across an image of both of a dress's sleeves to select the pixels over both sleeves of the dress and nothing in between. Thus, the visual query may provide visual search results of dresses with the same style of sleeve. As another example, the user can drag a finger across an image of both of a dress's sleeves and a bow to select the pixels over both sleeves and the bow of the dress where the sleeves and the bow are not connected by any pixels. Thus, the visual query may provide visual search results of dresses with the same style of sleeve and a bow.

In another example, the free-form user input to the user interface can be a line drawn in a loop around a particular sub-portion of the object. The particular sub-portion of the object can be selected by free-form user input. Selecting the particular sub-portion of the object by free-form user input can indicate that the particular sub-portion of the one or more objects depicted by the image has been selected by the user. Specifically, a user can drag a tactile object (e.g., finger, stylus, etc.) over the image provided for display within the user interface to draw a line wherever the tactile object touches (e.g., as if drawing with a pen or pencil, click and slide to increase size of circle, etc.). Alternatively, a user can use any method of interacting with a display within a user interface (e.g., a mouse) to draw a loop using any method known in the art (e.g., click and drag, click and slide, etc.). Continuing the example from above, the user can drag a finger around an image of a dress's sleeve to draw a loop over the sleeve of the dress. Thus, the visual query may provide visual search results of dresses with the same style of sleeve.

In another example, one or more initial visual feature suggestions may be provided by the computing system. In particular, one or more initial visual features may be indicated as suggested visual features for the user to select. The one or more initial visual features may be indicated in any method suitable (e.g., marker icon overlay on visual feature, loop around visual feature, etc.)

Furthermore, in some implementations, an input mode toggle may be available on the user interface, wherein the input mode toggle may allow a user to choose whether to remain in the initial visual feature suggestion mode or switch (e.g., by touching, sliding, or otherwise engaging the toggle) to a free-form user selection mode. The computing system can receive a user selection of an input mode toggle. Responsive to the user selection of the input mode toggle, the computing system can place the user interface in a free-form user selection mode.

Thus, example techniques are provided which enable a visual search system to leverage user input such as free-form selection of visual features to more intelligently process a visual query and return content based on the free-form selection of visual features provided by the visual query that the user provides.

According to another aspect, the computer-implemented visual search system can return content for specific visual features while retaining features of the object in the image of a visual query as a whole responsive to a visual search query. It can be difficult to search, especially in visual queries, for objects with a general essence or semantic meaning of the object in the original query but particularly focusing on specific visual features. In particular, a user may desire to retain some aspects of an object as a whole while also focusing on particular visual features specifically when making a visual query. For example, a user may submit an image of a dress and indicate particular interest in the sleeves. However, rather than returning results of shirts, dresses, jumpsuits, and rompers with those particular sleeves, the user may desire to search for only dresses with the particular sleeves. It can be difficult for the fluid visual search to layer such subtleties of user desire and produce results.

Some example implementations of the present disclosure can resolve these challenges by generating and ranking search results by a first set of results and a second set of results and returning a combined set of content. Specifically, the computing system can obtain a visual search query. The search query can comprise an image that depicts a particular sub-portion of an object that has been selected by a user (e.g., by free-form, preselected suggestion, etc.). The computing system can access visual embeddings associated with candidate results to identify a first set of results associated with the object overall. More particularly, the first set of results can be associated with visual features of the object overall. The computing system can also access visual embeddings associated with candidate results to identify a second set of results associated with the particular sub-portion of the object. More particularly, the second set of results can be associated with visual features of the particular sub-portion.

The computing device can select based on the visual search query a combined set of content that includes search results from both the first set of results and the second set of results. The computing device can return the combined set of content as search results in response to the visual search query. As one example, the combined set can include items at an intersection of the first and second sets of results. In another example, top ranked items from each set can be included in the combined set. In yet another example, respective scores from the first and second sets can be summed to generate a ranking for inclusion in the combined set. To continue the example given above, the visual search system can use the first set of results and the second set of results to return content containing only dresses with the particular style of sleeves rather than any arbitrary article of clothing with the particular style of sleeves.

In one example, the combined set of content can be ranked by the object overall embedding first and the particular sub-portion embedding second. Alternatively, the combined set of content can be ranked by the particular sub-portion embedding first and the object overall embedding second. Continuing the example given above, the combined set of content may prioritize results with the particular sleeves indicated by the user, or the combined set of content may prioritize results that are dresses. Additionally, the results can be filtered such that only content with embeddings indicating likeness to both the overall and to the particular sleeves are available to return, however the content may be ranked based on the overall embedding likeness, particular sub-portion likeness, or some average of the two. When averaging the two likenesses together, the average can be more heavily weighted towards either the overall or particular sub-portion embedding similarity.

Figure 14:
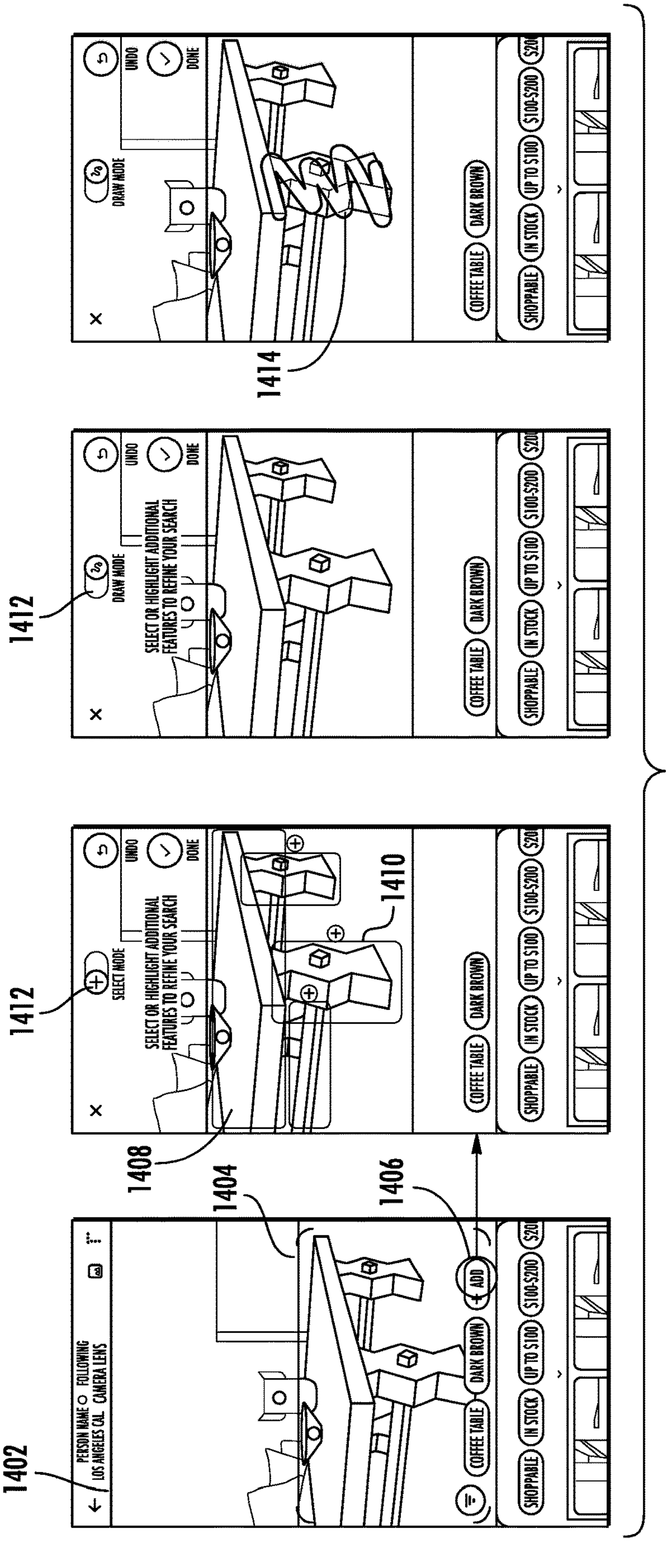
FIG. 14 illustrates an example user interface illustrating steps a user may take to perform a free-form selection of a visual feature to a visual query, in accordance with some embodiments.

FIG. 14 illustrates an example implementation of the method described in FIG. 16. 1402 illustrates a first image a user can submit as precursor to a visual query. The user can then specify a second portion of the image that the user wishes to perform a visual query on 1404. The user interface may include a switch, toggle, or other user interface element such as an "add" button 1406 to indicate that the user wishes to proceed with the visual query with the constraints placed 1404.

Once the visual query is submitted, the user interface may alter the image framing (e.g., to enlarge the portion of the image the user indicated as wanting to perform an image search on 1408). The user interface can then provide one or more initial visual feature suggestions 1410. If the user does not wish to proceed with any of the initial visual feature suggestions 1410 provided, the user can select an input mode toggle button 1412 that can place the user interface in a free-form user selection mode instead. Once the user interface has been placed in the free-form user selection mode, the user can provide user input that selects a particular sub-portion of the image. In response, the user interface can display a swathe of translucent color 1414 to overlay on the particular sub-portion of the object to indicate interest in the visual feature underneath the swathe of translucent color to integrate into the visual search (e.g., the coffee table leg).

Figure 15:
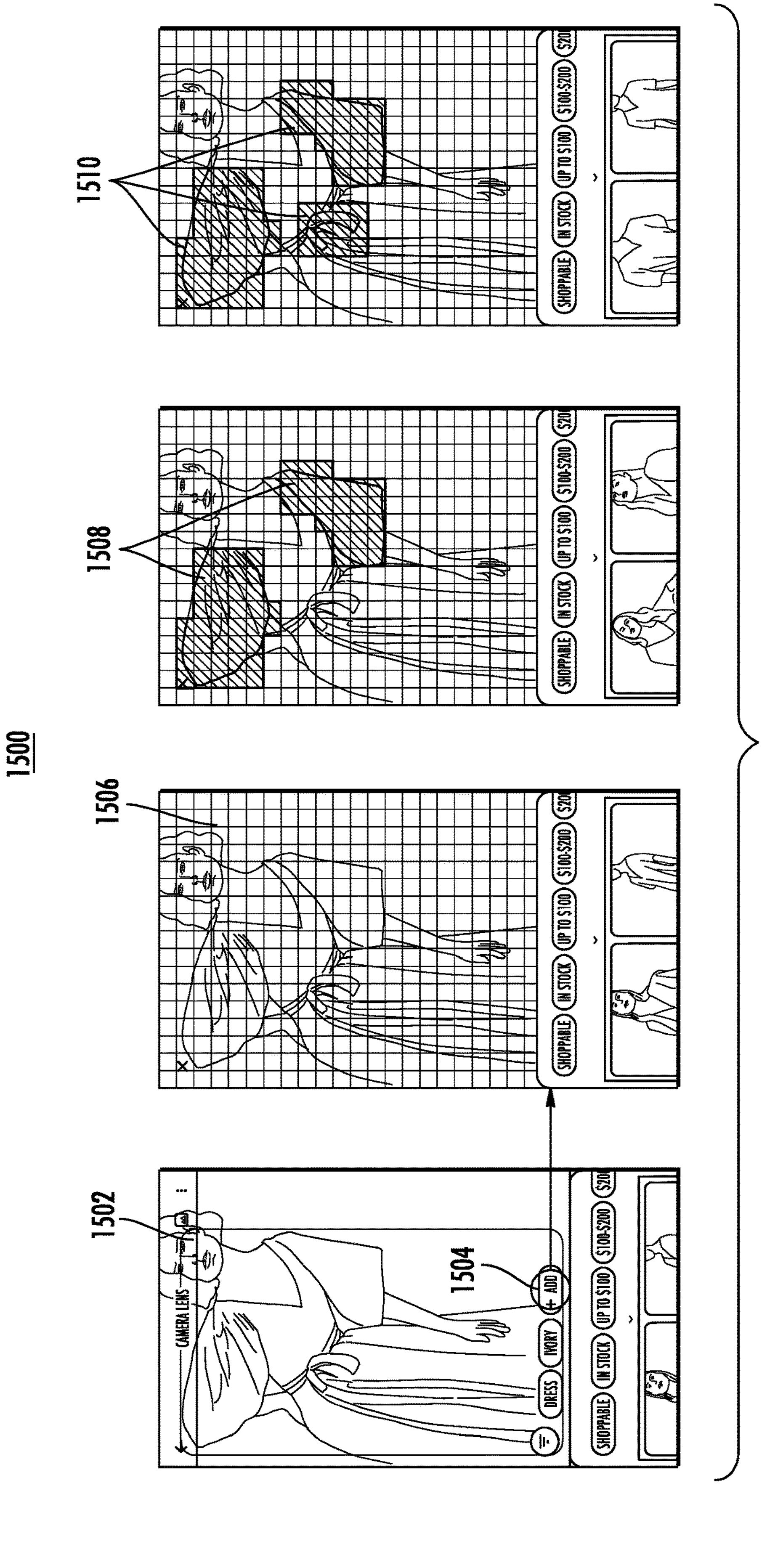
FIG. 15 illustrates an example user interface illustrating steps a user may take to perform a free-form selection of a visual feature to a visual query, in accordance with some embodiments.

In some implementations, the particular sub-portion of the one or more objects can be indicated by a subset of pixels selected by the user from a plurality of pixels that make up an image (e.g., provided by the camera 1824 of FIG. 18) such as illustrated by FIG. 15. Similarly to what was illustrated by FIG. 14, it can be seen that the user can first submit a first image as a precursor to the visual query constraining the raw image to a section of the image 1502 before selecting a toggle or other user interface element such as an "add" button 1504 to indicate that the user wishes to proceed with the visual query with the constraints placed 1502. FIG. 15 illustrates how the user interface can then be placed in a pixelated grid structure 1506. The user can then select which pixels contain visual features that the user wishes to integrate into the visual search in particular 1508 (e.g., the puffed sleeves). 1510 illustrates that more than one feature may be selected (e.g., puffed sleeves and bow) as well so that more than one visual feature is incorporated into the visual search. Furthermore, none of the selected pixels need to be adjacent to another.

FIG. 16 depicts a flow chart diagram of an example method 1600 to provide more personalized search results according to example embodiments of the present disclosure. Although FIG. 16 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 1602, a computing system can provide an image that depicts one or more subjects for display. For example, a computing system (e.g., user computing device 1802 and visual search system 1804 in FIG. 18) can provide an image (e.g., from the camera 1824 of FIG. 18) for display to a user (e.g., on a touch sensitive device such as a phone, tablet, computer, etc.).

Figure 18:
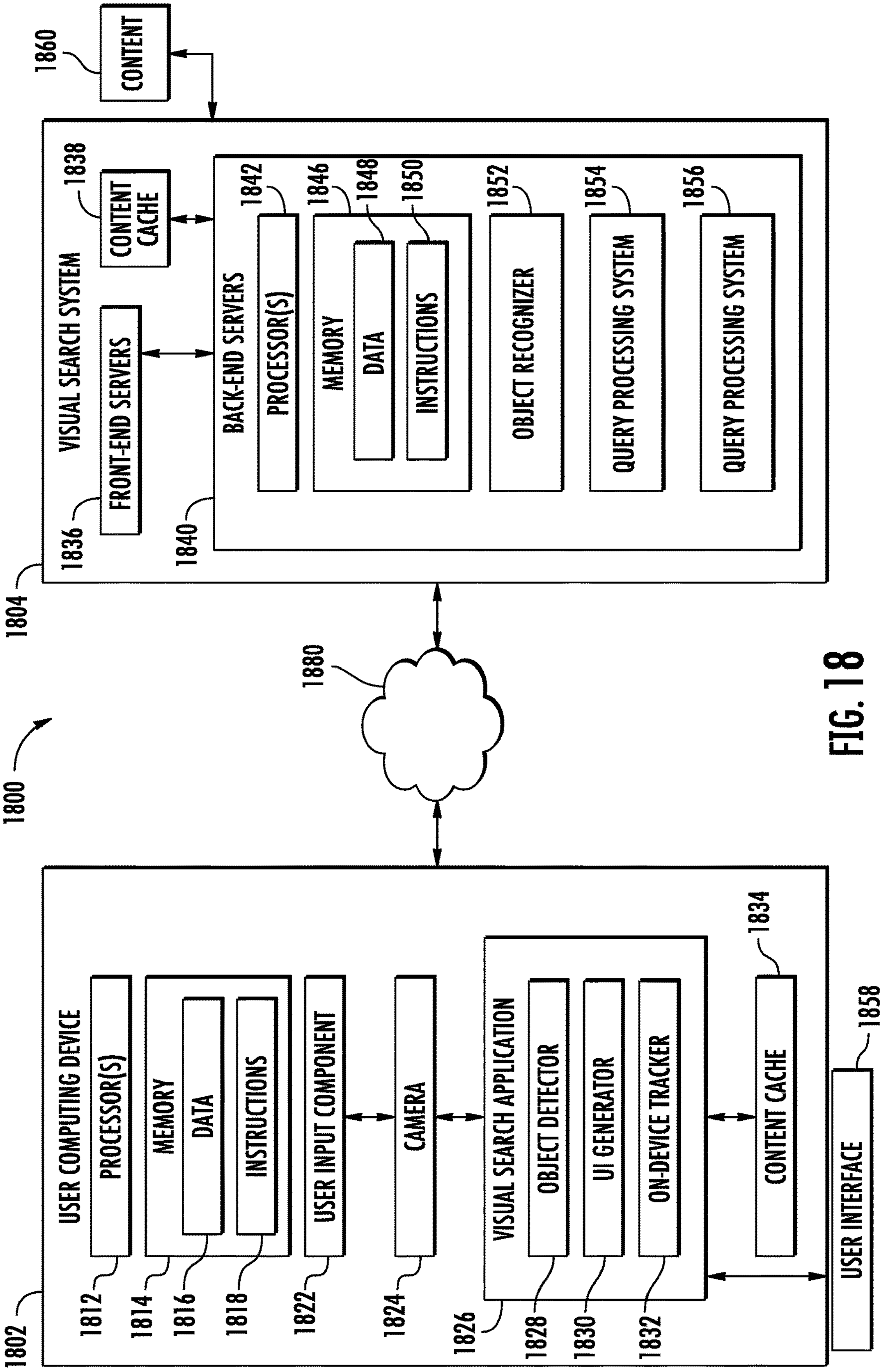
FIG. 18 depicts a block diagram of an example computing system according to example embodiments of the present disclosure.

At 1604, the computing system can receive a free-form user input to the user interface that selects a particular sub-portion of the one or more objects depicted by the image (e.g., user input component 1822 may include the free-form user input overlayed on the image as illustrated by FIG. 14 provided by the camera 1824 of FIG. 18). The particular sub-portion can comprise one or more visual features (e.g., visual features can include decorative features of furniture, particular cuts of sleeves on clothing items, etc.)

At 1606, the computing system can provide a visual search query that comprises the particular sub-portion of the object selected by the free-form user input (e.g., the visual search query can be received by the visual search system 1804 to be processed by the query processing system 1854 of FIG. 18).

At 1608, the computing system can receive (e.g., from the visual search system 1804 of FIG. 18), a set of visual search results (e.g., content 1860 of FIG. 18) responsive to visual features included in the particular sub-portion of the one or more objects (e.g., content including a particular furniture decorative feature indicated by free-form user overlay of a swathe of translucent color on an image provided by the camera 1824).

Figure 17:
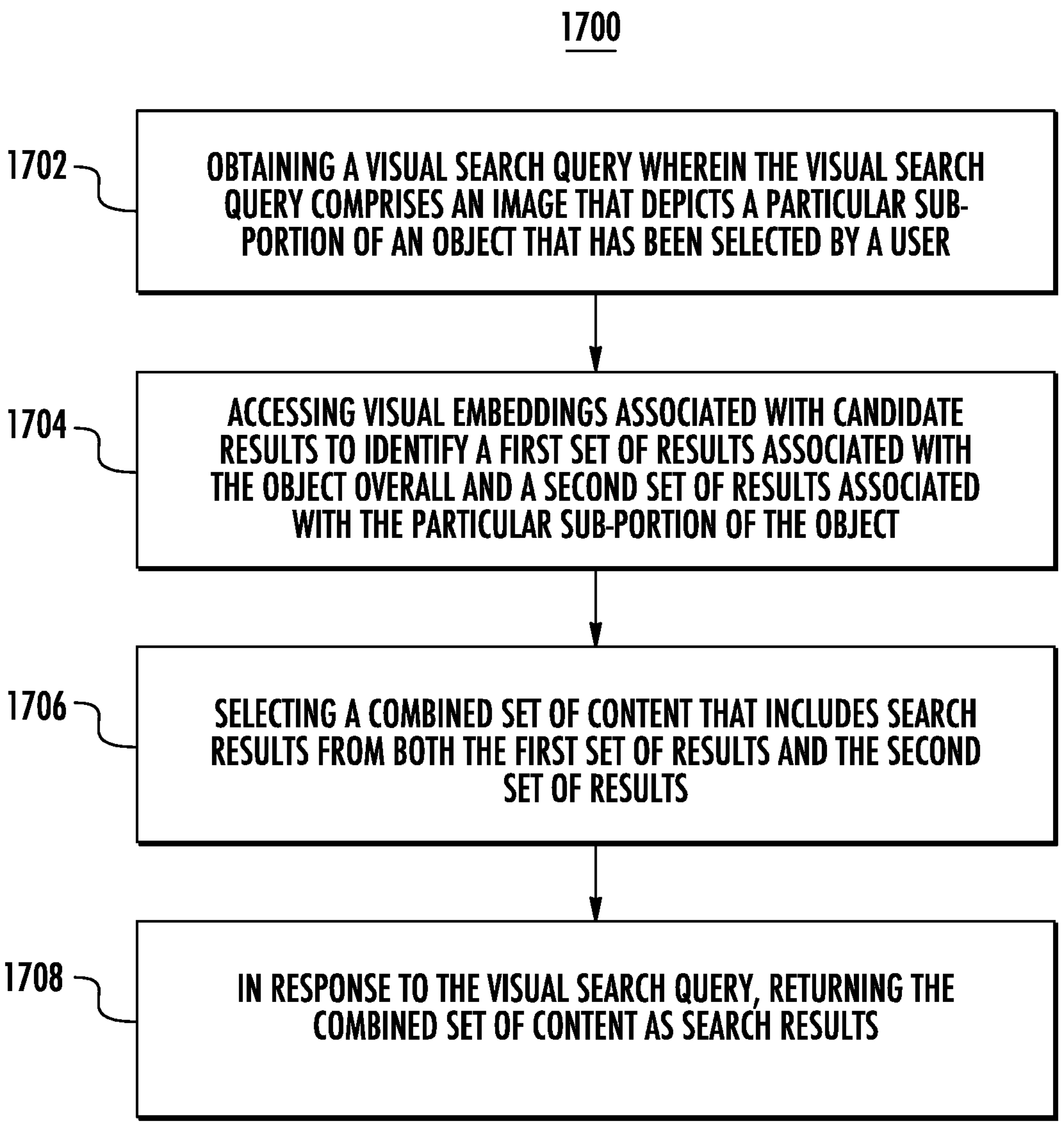
FIG. 17 depicts a flow chart diagram of an example method to perform a more personalized and/or intelligent visual search using a combined set of content including results associated with the object overall and results associated with a particular sub-portion of the object, according to example embodiments of the present disclosure.

FIG. 17 depicts a flow chart diagram of an example method 1700 to provide more personalized search results according to example embodiments of the present disclosure. Although FIG. 17 depicts steps performed in a particular order for purposes of illustration and discussion, the methods of the present disclosure are not limited to the particularly illustrated order or arrangement. The various steps of the method 1700 can be omitted, rearranged, combined, and/or adapted in various ways without deviating from the scope of the present disclosure.

At 1702, a computing system can obtain a visual search query (e.g., the visual search system 1804 of FIG. 18). The visual search query can comprise an image that depicts a particular sub-portion of an object that has been selected by a user (e.g., the user input component 1822 of FIG. 18). More particularly, the selected sub portion can include free-form user overlay of a swathe of translucent color on an image as illustrated in FIG. 14 (e.g., provided by the camera 1824 of FIG. 18). As another example, the selected sub portion can leverage a subset of pixels selected by the user from a plurality of pixels that make up an image (e.g., provided by the camera 1824 of FIG. 18) such as illustrated by FIG. 15.

At 1704, the computing system can access visual embeddings. More particularly, the computing system can access visual embeddings associated with candidate results (e.g., the object recognizer 1852 of FIG. 18). The visual embedding associated with candidate results can be embedding associated with candidate results can be used to identify a first set of results associated with the object overall (e.g., a dress that is of midi length) and a second set of results associated with the particular sub-portion of the object (e.g., puffed sleeves).

At 1706, the computing system can select a combined set of content that includes search results from both the first set of results and the second set of results (e.g., the ranking system 1856 of FIG. 18). More particularly, the combined set of content can be ranked, prioritizing results associated with the object overall, the first set, and the particular sub-portion, the second set to be ranked earlier. Even more particularly, content can be ranked to prioritize results that are from the first set of results over the second set of results or vice versa.

At 1708, the computing system can return the combined set of content as search results (e.g., as content 1860 of FIG. 18). More particularly, the combined set of content can be returned as search results in response to the visual search query.

FIG. 18 depicts a block diagram of an example computing system 1800 that performs personalized and/or intelligent searches in response to at least in part visual queries according to example embodiments of the present disclosure. The computing system 1800 includes a user computing device 1802 and a visual search system 104 that are communicatively coupled over a network 1880.

The user computing device 1802 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 1802 includes one or more processors 1812 and a memory 1814. The one or more processors 1812 can be any suitable processing device (e.g., a processor core, a microprocessor, an ASIC, a FPGA, a controller, a microcontroller, etc.). and can be one processor or a plurality of processors that are operatively connected. The memory 1814 can include one or more non-transitory computer-readable storage mediums, such as RAM, ROM, EEPROM, EPROM, flash memory devices, magnetic disks, etc., and combinations thereof. The memory 1814 can store data 1816 and instructions 1818 which are executed by the processor 1812 to cause the user computing device 1802 to perform operations.

In some implementations, the visual search application 1826 of a user computing device 1802 presents content related to objects recognized in a viewfinder of a camera 1824 of the user computing device 1802. Alternatively, objects can be recognized which are currently displayed on a user interface 1858 of the device 1802. For example, the search application 1826 can analyze images included in a webpage currently being shown in a browser application of the device 1802.

The visual search application 1826 can be a native application developed for a particular platform. The visual search application 1826 can control the camera 1824 of the user computing device 1802. For example, the visual search application 1826 may be a dedicated application for controlling the camera, a camera-first application that controls the camera 1824 for use with other features of the application, or another type of application that can access and control the camera 1824. The visual search application 1826 can present the viewfinder of the camera 1824 in user interfaces 1858 of the visual search application 1826.

In general, the visual search application 1826 enables a user to view content (e.g., information or user experiences) related to objects depicted in the viewfinder of the camera 1824 and/or view content related to objects depicted in images stored on the user computing device 1802 or stored at another location accessible by the user computing device 1802. The viewfinder is a portion of the display of the user computing device 1802 that presents a live image of what is in the field of the view of the camera's lens. As the user moves the camera 1824 (e.g., by moving the user computing device 1802), the viewfinder is updated to present the current field of view of the lens.

The visual search application 1826 can, in some implementations, an object detector 1828, a user interface generator 1830, and/or an on-device tracker 1832. The object detector 1828 can detect objects in the viewfinder using edge detection and/or other object detection techniques. In some implementations, the object detector 1828 includes a coarse classifier that determines whether an image includes an object in one or more particular classes (e.g., categories) of objects. For example, the coarse classifier may detect that an image includes an object of a particular class, with or without recognizing the actual object.

The coarse classifier can detect the presence of a class of objects based on whether or not the image includes (e.g., depicts) one or more features that are indicative of the class of objects. The coarse classifier can include a light-weight model to perform a low computational analysis to detect the presence of objects within its class(es) of objects. For example, the coarse classifier can detect, for each class of objects, a limited set of visual features depicted in the image to determine whether the image includes an object that falls within the class of objects. In a particular example, the coarse classifier can detect whether an image depicts an object that is classified in one or more of classes including but not limited to: text, barcode, landmark, people, food, media object, plant, etc. For barcodes, the coarse classifier can determine whether the image includes parallel lines with different widths. Similarly, for machine-readable codes (e.g., QR codes, etc.), the coarse classifier can determine whether the image includes a pattern indicative of the presence of a machine-readable code.

The coarse classifier can output data specifying whether a class of object has been detected in the image. The coarse classifier can also output a confidence value that indicates the confidence that the presence of a class of object has been detected in the image and/or a confidence value that indicates the confidence that an actual object, e.g., a cereal box, is depicted in the image.

The object detector 1828 can receive image data representing the field of view of the camera 1824 (e.g., what is being presented in the viewfinder) and detect the presence of one or more objects in the image data. If at least one object is detected in the image data, the visual search application 1826 can provide (e.g., transmit) the image data to a visual search system 1804 over the network 1880. As described below, the visual search system 1804 can recognize objects in the image data and provide content related to the objects to the user computing device 1802.

Although the visual search application 1826 is shown in FIG. 18 as being included in the device 1802, in other implementations some or all of the functionality of the visual search application 1826 can be implemented at the visual search system 1804.

The visual search system 1804 includes one or more front-end servers 1836 and one or more back-end servers 1840. The front-end servers 1836 can receive image data from user computing devices, e.g., the user computing device 1802 (e.g., from the visual search application 1826). The front-end servers 1836 can provide the image data to the back-end servers 140. The back-end servers 1840 can identify content related to objects recognized in the image data and provide the content to the front-end servers 1836. In turn, the front-end servers 1836 can provide the content to the mobile device from which the image data was received.

The back-end servers 1840 includes one or more processor(s) 1842 and a memory 1846. The one or more processor (s) 1842 can be any suitable processing device (e.g., a processor core, a microprocessor, an ASIC, a FPGA, a controller, a microcontroller, etc.). and can be one processor or a plurality of processors that are operatively connected. The memory 1846 can include one or more non-transitory computer-readable storage mediums, such as RAM, ROM, EEPROM, EPROM, flash memory devices, magnetic disks, etc., and combinations thereof. The memory 1846 can store data 1848 and instructions 1850 which are executed by the processor(s) 1842 to cause the visual search system 1804 to perform operations. The back-end servers 1840 can also include object recognizer 1852, a query processing system 1854, and a ranking system 1856. The object recognizer 1852 can process image data received from mobile devices (e.g., user computing device 1802, etc.) and recognize objects, if any, in the image data. As an example, the object recognizer 1852 can use computer vision and/or other object recognition techniques (e.g., edge matching, pattern recognition, greyscale matching, gradient matching, etc.) to recognize objects in the image data.

In some implementations, the visual search system 1804 includes or is otherwise implemented by one or more server computing devices. In instances in which the visual search system 104 includes plural server computing devices, such server computing devices can operate according to sequential computing architectures, parallel computing architectures, or some combination thereof.

In some implementations, the query processing system 1854 includes multiple processing systems. One example system can allow the system to identify a plurality of candidate search results. For instance, the system can identify a plurality of candidate search results upon first receiving a visual query image. On the other hand, the system can identify a plurality of search results after further processing by the system has already been done. Specifically, the system can identify a plurality of search results based on a more targeted query that the system has generated. Even more particularly, a system can generate a plurality of candidate search results when the system first receives a visual query image and then regenerate a plurality of candidate search results after further processing, based on a more targeted query that the system has generated.

As another example, the query processing system 1854 can include a system related to a combined set of content. More particularly, the combined set of content can refer to multiple items that are responsive to a first set of content related to the object presented in the image as a whole and a second set of content related to the particular visual feature of interest selected by a user in the visual search query.

In some implementations, the ranking system 1856 can be used in multiple different points of the visual search system process to rank the candidate search results. One example application is to generate a ranking of the search results after the plurality of search results is first identified. On the other hand, the initial search results may be only preliminary, and the ranking system 1856 can generate a ranking of the search results after the query processing system has created a more targeted query. Even more particularly, the ranking system 156 can generate a ranking of the plurality of candidate search results when the system first identifies a set of candidate search results and then again after a more targeted query has been made (e.g., the preliminary ranking may be used to determine what combinations of whole object and specific visual feature are most likely). The ranking that is created by the ranking system 1856 can be used to determine the final output of the candidate search results to the user by determining what order the search results will be output in, and/or whether the candidate search result will be output or not.

The multiple processing systems contained in the query processing system 1854 can be used in any combination with each other and in any order to process the visual queries submitted by users in the most intelligent way in order to provide the user with the most intelligent results. Furthermore, the ranking system 1856 can be used in any combination with the query processing system 1854.

After the content is selected, the content can be provided to the user computing device 1802 from which the image data was received, stored in a content cache 1838 of the visual search system 1804, and/or stored at the top of a memory stack of the front-end servers 1836. In this way, the content can be quickly presented to the user in response to the user requesting the content. If the content is provided to the user computing device 1802, the visual search application 1826 can store the content in a content cache 1834 or other fast access memory. For example, the visual search application 1826 can store the content for an object with a reference to the object so that the visual search application 1826 can identify the appropriate content for the object in response to determining to present the content for the object.

In some implementations, the visual search system 1804 includes the object detector 1828, e.g., rather than the visual search application 1826. In such examples, the visual search application 1826 can transmit image data to the visual search system 1804 continuously, e.g., in a stream of images, while the visual search application 1826 is active or while the user has the visual search application 1826 in a request content mode. The request content mode can allow the visual search application 1826 to send image data to the visual search system 1804 continuously in order to request content for objects recognized in the image data. The visual search system 1804 can detect objects in the image, process the image (e.g., select visual indicators for the detected objects), and send the results (e.g., visual indicators) to the visual search application 1826 for presentation in the user interface (e.g., viewfinder). The visual search system 1804 can also continue processing the image data to recognize the objects, select content for each recognized object, and either cache the content or send the content to the visual search application 1826.

In some implementations, the visual search application 1826 includes an on-device object recognizer that recognizes objects in image data. In this example, the visual search application 1826 can recognize the objects, and either request content for the recognized objects from the visual search system 1804 or identify the content from an on-device content data store. The on-device object recognizer can be a lightweight object recognizer that recognizes a more limited set of objects or that uses less computationally expensive object recognition techniques than the object recognizer 1852 of the visual search system 1804. This enables mobile devices with less processing power than typical servers to perform the object recognition process. In some implementations, the visual search application 1826 can use the on-device recognizer to make an initial identification of an object and provide the image data to the visual search system 1804 (or another object recognition system) for confirmation. The on-device content data store may also store a more limited set of content than the content data storage unit 1860 or links to resources that include the content to preserve data storage resources of the user computing device 1802.

The user computing device 1802 can also include one or more user input components 1822 that receive user input. For example, the user input component 1822 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The network 1880 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 18 illustrates one example computing system that can be used to implement the present disclosure. Other different distributions of components can be used as well. For example, some or all of the various aspects of the visual search system can instead be located and/or implemented at the user computing device 1802.

Figure 19:
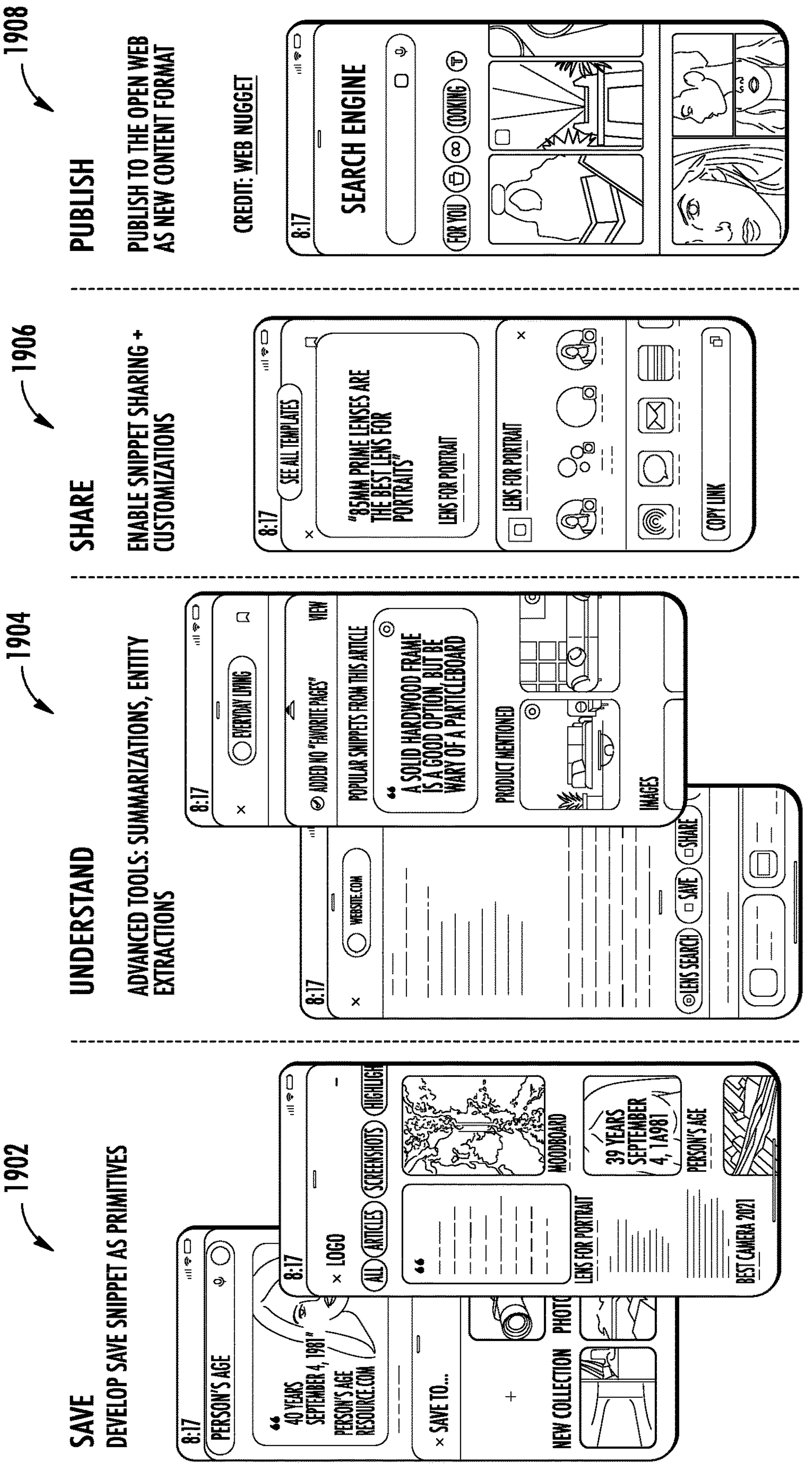
FIG. 19 depicts an illustration of an example content snippet packet generation and collection addition interface according to example embodiments of the present disclosure.

FIG. 19 depicts an illustration of an example content snippet packet generation and collection addition interface 1900 according to example embodiments of the present disclosure. The systems and methods disclosed herein can be utilized to generate and save content snippet packets. The content snippet packets can be added to collections and may be searchable for later use. The content snippet packets can include generated graphical cards. In some implementations, the selected content item can be processed by one or more machine-learned models to generate a summarization of the content item, which can be utilized to generate the graphical card. The graphical card can be customizable. The graphical card may include a background color and/or a background image determined based on the source web page. Alternatively and/or additionally, the background color and/or the background image may be user selected. Similarly, the font may be automatically determined, predetermined, and/or user selected.

At 1902, a content snippet packet (including a graphical representation) is generated based on a selected portion of the web page. The generated content snippet packet is then added to an "Inspo" collection of media content items and content snippet packets.

At 1904, a summary is generated for a portion of a web page and a graphical card is generated based on the semantic understanding and/or a determined entity. The generated graphical card can be saved as part of a generated content snippet packet and can be added to a collection. The collection may be associated with a particular entity and/or a particular type of entity.

At 1906, different options for sharing and/or customizing a generated content snippet packet is provided for display. For example, the template, the text, and/or the background of the graphical representation can be customized. The sharing options can include adding to a collection, adding to notes, sending via text message, sending via email, copying, and/or air dropping.

At 1908, the content snippet packets can be published to social media and/or may be published to a localized search interface. For example, a user may utilize a search application, which can surface a plurality of web search results responsive to the query and/or may surface one or more generated content snippet packets responsive to the query (e.g., generated content snippet packets of the particular user and/or generated content snippet packets of associated users (e.g., friends or users proximate to the particular user)).

The generated content snippet packets can then be shared via messaging applications, social media applications, and/or a variety of other methods. In some implementations, the content snippet packet can be published to the web and may be utilized as a new format of web search results.

Figure 20:
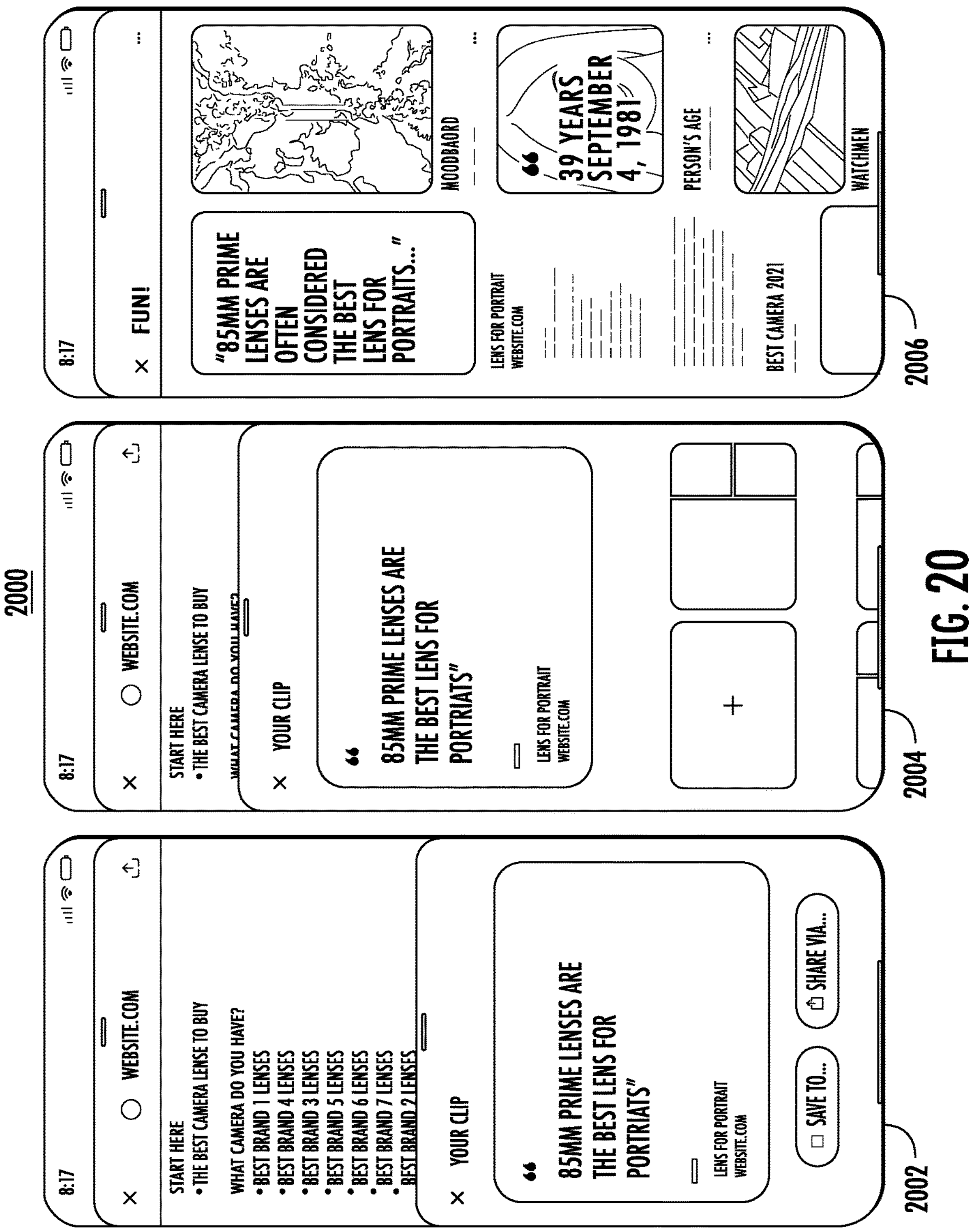
FIG. 20 depicts an illustration of an example collection addition interface according to example embodiments of the present disclosure.

FIG. 20 depicts an illustration of an example collection addition interface 2000 according to example embodiments of the present disclosure. The collection addition interface can provide the content item and/or a graphical representation of the content snippet packet (e.g., a graphical card) for display. In response to a save element being selected, a plurality of collections can be provided for display. A user can then add the content snippet packet to a particular collection. The content snippet packet can then be stored in the particular collection.

The particular collection can then be opened, and a graphical representation of the generated content snippet packet can be provided for display alongside other graphical representations associated with other content snippet packets. The collection addition interface 2000 may include displaying the graphical card (at a first size) for display upon content snippet packet generation 2002. The pop-up window 2004 for collection addition can then be provided for display upon selection of a user interface element. When the content snippet packet is added to a particular collection, the collection 2006 may then be provided for display with a plurality of thumbnails descriptive of the different content snippet packets in the collection including a thumbnail descriptive of the generated graphical card (at a second size).

Figure 21A:
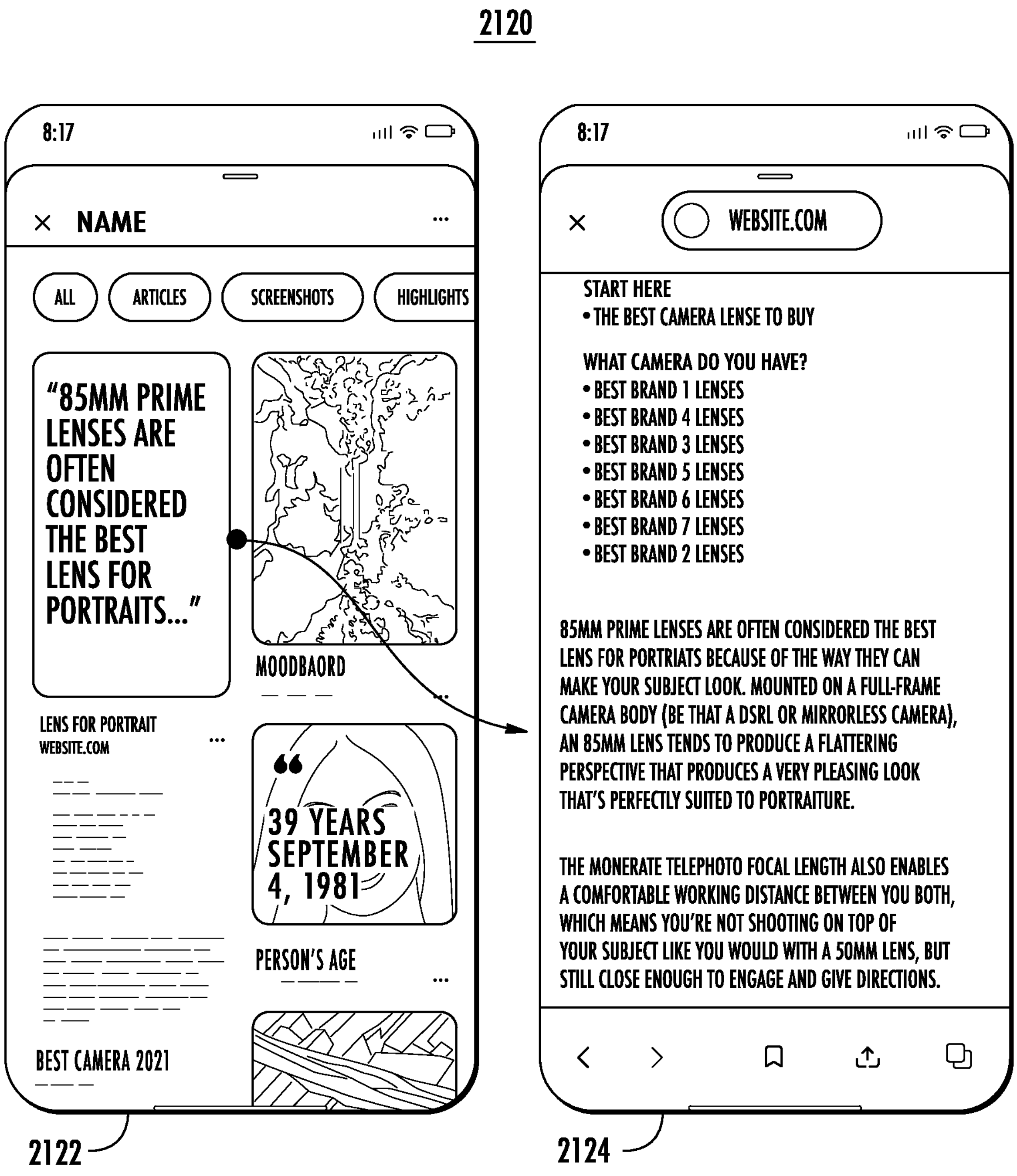
FIG. 21A depicts an illustration of an example content snippet packet interaction according to example embodiments of the present disclosure.

FIG. 21A depicts an illustration of an example content snippet packet interaction 2120 according to example embodiments of the present disclosure. Once a content snippet packet is generated, the content snippet packet can be interacted with to navigate to the web page associated with the content item. The location data of the content snippet packet can be utilized to navigate to the particular portion of the web page that contains the source of the content item. The content item can be highlighted when displayed. For example, a graphical card of 2122 can be selected. The address data and location data of the content snippet packet associated with the graphical card can then be obtained. The address data and the location data can then be utilized to open the web page of 2124 to the exact location of the one or more content items of the selected content snippet packet with the one or more content items highlighted.

Figure 21B:
FIG. 21B depicts an illustration of an example content snippet packet search according to example embodiments of the present disclosure.

FIG. 21B depicts an illustration of an example content snippet packet search 2140 according to example embodiments of the present disclosure. The generated content snippet packet can be provided as a search result when searching locally and/or when searching the web. For example, a user can input a search query, which can be processed to determine a plurality of suggested queries and a plurality of suggested content snippet packets, which can be provided for display (e.g., as shown in 2142) as further inputs may be received.

Figure 22:
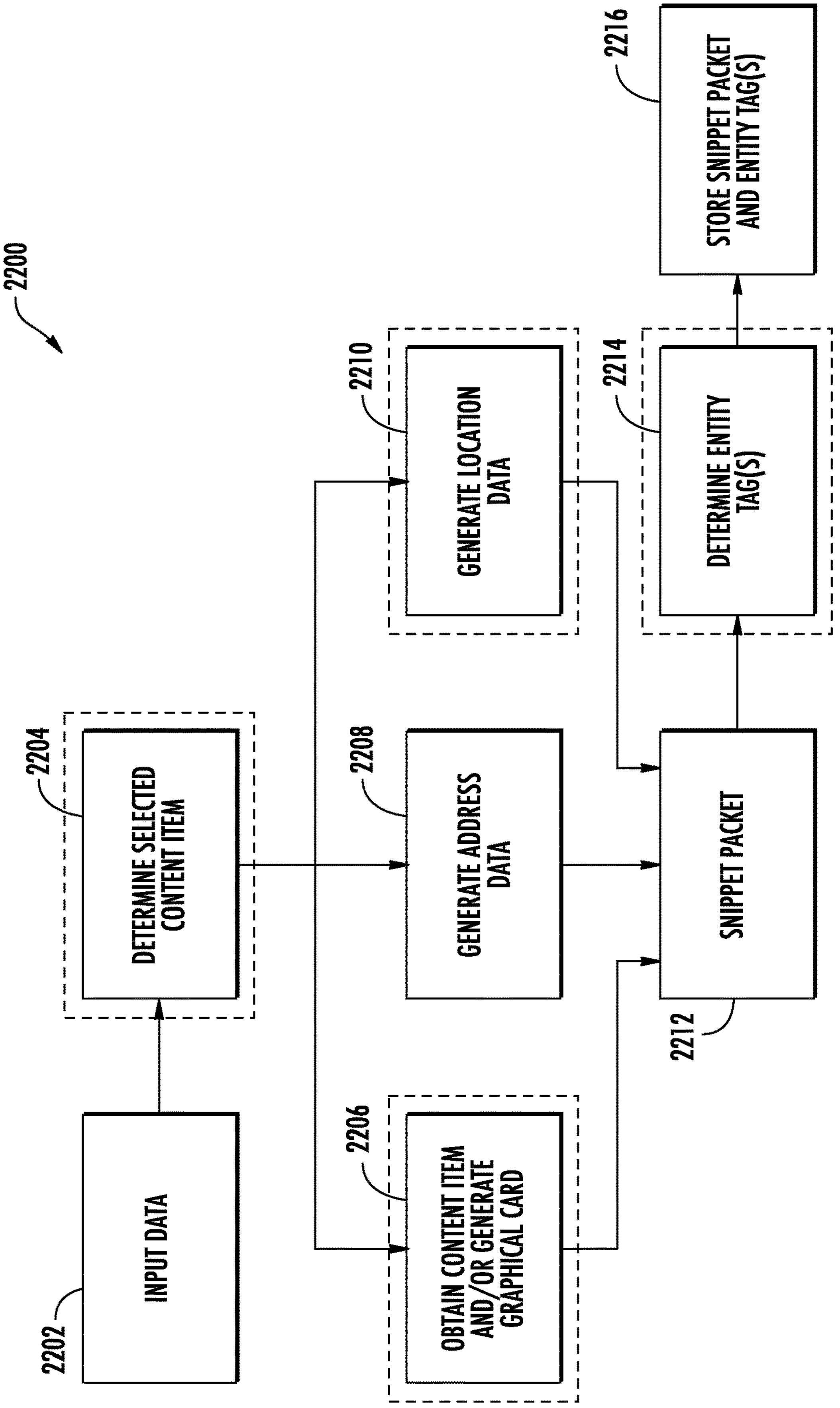
FIG. 22 depicts a block diagram of an example content snippet packet generation system according to example embodiments of the present disclosure.

FIG. 22 depicts a block diagram of an example content snippet packet generation system 2200 according to example embodiments of the present disclosure. The content snippet packet generation system 2200 can include obtaining input data 2202 (e.g., input data descriptive of a selection of one or more content items). The input data 2202 can be processed to determine a selected content item 2204. Based on the determined selection, the content item can be obtained, and a graphical card 2206 can be generated. Address data 2208 can be generated and/or obtained. The address data 2208 can include uniform resource locator data. Location data 2210 can be generated and/or obtained. The location data 2210 can include text fragment data that can include a scroll position, a start of the content item, and an end of a content item that can be utilized to find and highlight the content item within the source page. The graphical card 2206, the content item, the address data 2208, and the location data 2210 can be utilized to generate the content snippet packet 2212. The content snippet packet 2212 can be processed (e.g., with a generative model (e.g., an LLM) and/or other machine-learned models) to determine one or more entity tags 2214 for the content snippet packet 2212 based on the content item and/or based on the source of the content item. The entity tag 2214 can include relationship data that links the content snippet packet 2212 with other content snippet packets associated with the same entity. The content snippet packet 2212 with the entity tag(s) 2214 can then be stored 2216 (e.g., locally and/or on a server computing system).

One or more of the determinations and/or one or more of the generations can be performed based at least in part on one or more machine-learned models. For example, determining the selected content item 2204, obtaining the content item and/or generating a graphical card 2206, generating location data 2210, and/or determining entity tags 2214 can be performed by one or more machine-learned models.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, the system comprising:

one or more processors; and one or more non-transitory computer-readable media that collectively store instructions that, when executed by the one or more processors, cause the computing system to perform operations, the operations comprising:

obtaining, via an overlay interface at the operating system level of a user computing device, content provided for display, wherein the content comprises a plurality of different visual features, wherein the overlay interface is configured to obtain content across a plurality of different applications provided by the user computing device;

obtaining, via the overlay interface, a user input, wherein the user input is descriptive of a selection of a sub-portion of the content, wherein the sub-portion of the content comprises at least a subset of visual features of the plurality of visual features;

generating a selected content dataset, wherein the selected content dataset comprises visual data and source data, wherein the visual data is descriptive of particular visual features associated with the sub-portion of the content, and wherein the source data is descriptive of a source of the content;

processing the selected content dataset with a generative model to determine a content grouping for the selected content dataset, wherein the content grouping is descriptive of one or more other content snippets determined to be associated with the selected content dataset; and storing the selected content dataset with the content grouping.

2. The system of claim 1, wherein the user input comprises a gesture input associated with a region of the content provided for display;

wherein the operation further comprise:

processing the region of the content provided for display to determine the gesture input is associated with a selection of the sub-portion of the content, wherein the sub-portion of the content comprises a set of visual features of interest.

3. The system of claim 2, wherein the sub-portion is determined based on a semantic understanding of the region, and wherein the set of visual features of interest are associated with an object within the region.

4. The system of claim 2, wherein the gesture input comprises a lasso gesture that encloses sub-portion of the content.

5. The system of claim 2, wherein the gesture input comprises a scribble gesture that covers at least a subset of the sub-portion of the content.

6. The system of claim 1, wherein generating the selected content dataset comprises:

processing the content with a segmentation model to generate segmented image data descriptive of the sub-portion of the content;

obtaining source information associated with an application provided for display and the content source; and generating the selected content dataset that comprises the segmented image data, the source information, and metadata associated with a user context.

7. The system of claim 6, wherein the user context is descriptive of a particular user associated with the user input, a time of dataset generation, and user viewing history associated with the content.

8. The system of claim 1, wherein storing the selected content dataset with the content grouping comprises storing the selected content dataset with user search history data; and wherein the operations further comprise:

tuning a machine-learned personalization model based on the content grouping and the user search history data, wherein the machine-learned personalization model is associated with a particular user.

9. The system of claim 8, wherein the operations further comprise:

determining, with the machine-learned personalization model, a suggested content item based on the content grouping; and providing the suggested content item for display.

10. The system of claim 1, wherein the visual data comprises a bitmap associated with at least a subset of the sub-portion of the content.

11. A computer-implemented method, the method comprising:

obtaining, by a computing system comprising one or more processors and via an overlay interface at the operating system level of a user computing device, contextual data associated with a user, wherein the contextual data is descriptive of a context associated with a user computing device, wherein the overlay interface is configured to obtain content across a plurality of different applications provided by the user computing device;

processing, by the computing system, the contextual data with a generative model to determine a particular content snippet is associated with the context, wherein the particular content snippet was generated by:

obtaining, by the computing system and via the overlay interface, a user input, wherein the user input is descriptive of a selection of a sub-portion of content provided for display, wherein the sub-portion of the content comprises at least a subset of visual features of the content provided for display; and generating, by the computing system and via the overlay interface, a selected content dataset, wherein the selected content dataset comprises visual data and source data, wherein the visual data is descriptive of particular visual features associated with the sub-portion of the content, and wherein the source data is descriptive of a source of the content; and providing, by the computing system and via the overlay interface, the particular content snippet for display.

12. The method of claim 11, wherein processing, by the computing system, the contextual data with the generative model to determine the particular content snippet of a plurality of content snippets associated with the context comprises:

determining, by the computing system and with the generative model, a proactive candidate search intent associated with the context, wherein the proactive candidate search intent is descriptive of a suggested search that is predicted to be relevant to the user based on the contextual data, wherein the generative model comprises an autoregressive language model;

determining, by the computing system, a content grouping comprises content responsive to the proactive candidate search intent, wherein the content grouping comprises the particular content snippet, wherein the content grouping comprises a plurality of previously generated content snippets with a determined association.

13. The method of claim 12, wherein the content grouping was generated by:

obtaining, by the computing system, a plurality of content snippets associated with the user;

processing, by the computing system, the plurality of content snippets with the generative model to determine the particular content snippet and one or more additional content snippets are associated with a shared topic; and generating, by the computing system, the content grouping comprising the particular content snippet and the one or more additional content snippets based on the shared topic.

14. The method of claim 13, wherein the shared topic is determined based on determining the particular content snippet and the one or more additional content snippets comprise content are associated with a particular entity.

15. The method of claim 11, wherein the contextual data comprises search history data associated with the user.

16. The method of claim 11, further comprising:

obtaining, by the computing system, a search query;

processing, by the computing system, the search query and the contextual data with the generative model to determine the particular content snippet and to generate a model-generated response;

processing, by the computing system, the search query and the contextual data with a search engine to determine a plurality of web search results; and providing, by the computing system, a search results interface for display, wherein the search results interface comprises the model-generated response to the search query, the particular content snippet, and at least a subset of the plurality of web search results.

17. One or more non-transitory computer-readable media that collectively store instructions that, when executed by one or more computing devices, cause the one or more computing devices to perform operations, the operations comprising:

providing content for display, wherein the content comprises a plurality of different visual features;

obtaining, via an overlay interface at the operating system level of a user computing device, a user input and display data descriptive of the content provided for display, wherein the user input is descriptive of a selection of a sub-portion of the content, wherein the sub-portion of the content comprises at least a subset of visual features of the plurality of visual features, wherein the overlay interface is configured to obtain content across a plurality of different applications provided by the user computing device;

generating a selected content dataset, wherein the selected content dataset comprises visual data and source data, wherein the visual data is descriptive of particular visual features associated with the sub-portion of the content, and wherein the source data is descriptive of a source of the content;

obtaining a plurality of other content snippets associated with a user;

processing the selected content dataset and the plurality of other content snippets with a generative model to generate a content grouping, wherein the content grouping comprises the selected content dataset and one or more additional content snippets of the plurality of other content snippets; and storing the content grouping comprising the selected content dataset and the one or more additional content snippets.

18. The one or more non-transitory computer-readable media of claim 17, wherein the operations further comprise:

before obtaining the user input:

obtaining interface invocation input, wherein the interface invocation input is associated with a request to invoke the overlay interface.

19. The one or more non-transitory computer-readable media of claim 18, wherein the interface invocation input comprises a long press gesture input.

20. The one or more non-transitory computer-readable media of claim 18, wherein the overlay interface comprises a user interface for segmenting and processing visual content provided for display across the plurality of different applications.

* * * * *